US012220697B2

(12) United States Patent
Breinlinger et al.

(10) Patent No.: US 12,220,697 B2
(45) Date of Patent: Feb. 11, 2025

(54) MICROFLUIDIC DEVICE WITH PROGRAMMABLE SWITCHING ELEMENTS

(71) Applicant: BERKELEY LIGHTS, INC., Emeryville, CA (US)

(72) Inventors: Keith J. Breinlinger, Emeryville, CA (US); Johannes Paul Sluis, Emeryville, CA (US)

(73) Assignee: Bruker Cellular Analysis, Emeryville, CA (US)

(*) Notice: Subject to any disclaimer, the term of this patent is extended or adjusted under 35 U.S.C. 154(b) by 846 days.

(21) Appl. No.: 17/321,974

(22) Filed: May 17, 2021

(65) Prior Publication Data

US 2021/0339249 A1 Nov. 4, 2021

Related U.S. Application Data

(63) Continuation of application No. PCT/US2019/062063, filed on Nov. 18, 2019.
(Continued)

(51) Int. Cl.

| | |
|---|---|
| ***B01L 3/00*** | (2006.01) |
| ***B03C 5/00*** | (2006.01) |
| ***B03C 5/02*** | (2006.01) |

(52) U.S. Cl.
CPC ..... *B01L 3/502715* (2013.01); *B01L 3/50273* (2013.01); *B01L 3/502761* (2013.01); *B03C 5/005* (2013.01); *B03C 5/026* (2013.01); *B01L 2200/0652* (2013.01); *B01L 2300/0645* (2013.01); *B01L 2400/0424* (2013.01)

(58) Field of Classification Search
CPC .......... B01L 3/502715; B01L 3/50273; B01L 3/502761; B01L 2200/0652; B01L 2300/0645; B01L 2400/0424; B01L 2200/147; B01L 3/502792; B03C 5/005; B03C 5/026; B03C 2201/26
See application file for complete search history.

(56) References Cited

U.S. PATENT DOCUMENTS 6,294,063 B1 9/2001 Becker et al.
6,379,929 B1 4/2002 Burns et al.
(Continued)

FOREIGN PATENT DOCUMENTS

CN 101405083 4/2009
CN 106255888 12/2016
(Continued)

OTHER PUBLICATIONS

PCT International Search Report for PCT/US2019/062063, Applicant: Berkeley Lights, Inc., dated Mar. 18, 2020 (19 pages).
(Continued)

*Primary Examiner* — Jennifer Wecker
*Assistant Examiner* — Jonathan Bortoli
(74) *Attorney, Agent, or Firm* — Vista IP Law Group, LLP

(57) ABSTRACT

Microfluidic devices having a circuit substrate with a control unit, a switching mechanism associated with a dielectrophoresis (DEP) electrode, and a memory unit are described. Switching instructions may be received, stored, and retrieved by the control unit and used to control the DEP electrode via the switching mechanism. Systems comprising the described microfluidic devices and methods of controlling the described microfluidic devices are included herein.

29 Claims, 26 Drawing Sheets

Related U.S. Application Data

(60) Provisional application No. 62/769,482, filed on Nov. 19, 2018.

(56) References Cited

U.S. PATENT DOCUMENTS

| | | | |
|---|---|---|---|
| 6,942,776 | B2 | 9/2005 | Medoro |
| 6,958,132 | B2 | 10/2005 | Chiou et al. |
| 6,977,033 | B2 | 12/2005 | Becker et al. |
| 7,090,759 | B1 | 8/2006 | Seul |
| 7,612,355 | B2 | 11/2009 | Wu et al. |
| 7,727,771 | B2 | 6/2010 | Chiou et al. |
| 7,956,339 | B2 | 6/2011 | Ohta et al. |
| 8,037,903 | B2 | 10/2011 | Wang et al. |
| 8,093,064 | B2 | 1/2012 | Shah et al. |
| 8,581,167 | B2 | 11/2013 | Lean et al. |
| 9,079,189 | B2 | 7/2015 | Garcia et al. |
| 9,144,806 | B2 | 9/2015 | Chen et al. |
| 9,239,328 | B2 | 1/2016 | Chang et al. |
| 9,533,306 | B2 | 1/2017 | Chiou et al. |
| 2002/0031813 | A1 | 3/2002 | Ozkan et al. |
| 2003/0008364 | A1 | 1/2003 | Wang et al. |
| 2003/0224528 | A1 | 12/2003 | Chiou et al. |
| 2004/0072278 | A1 | 4/2004 | Chou et al. |
| 2004/0191789 | A1 | 9/2004 | Manaresi et al. |
| 2004/0231987 | A1 | 11/2004 | Sterling et al. |
| 2005/0112548 | A1 | 5/2005 | Segawa et al. |
| 2005/0175981 | A1 | 8/2005 | Voldman et al. |
| 2005/0264351 | A1 | 12/2005 | Armit |
| 2005/0274612 | A1 | 12/2005 | Segawa et al. |
| 2006/0091015 | A1 | 5/2006 | Lau |
| 2006/0175192 | A1 | 8/2006 | Lin |
| 2007/0095669 | A1 | 5/2007 | Lau et al. |
| 2008/0006535 | A1 | 1/2008 | Paik et al. |
| 2008/0124252 | A1 | 5/2008 | Marchand et al. |
| 2008/0283401 | A1 | 11/2008 | Peach |
| 2008/0302732 | A1 | 12/2008 | Soh et al. |
| 2009/0170186 | A1 | 7/2009 | Wu et al. |
| 2009/0184331 | A1 | 7/2009 | Omi et al. |
| 2009/0218223 | A1 | 9/2009 | Manaresi et al. |
| 2010/0000620 | A1 | 1/2010 | Fouillet et al. |
| 2010/0003666 | A1 | 1/2010 | Lee et al. |
| 2010/0021038 | A1 | 1/2010 | Schulz |
| 2010/0101960 | A1 | 4/2010 | Ohta et al. |
| 2010/0206731 | A1 | 8/2010 | Lau et al. |
| 2011/0096331 | A1 | 4/2011 | Jung et al. |
| 2011/0117634 | A1 | 5/2011 | Halamish et al. |
| 2011/0220505 | A1 | 9/2011 | Wang et al. |
| 2012/0024708 | A1 | 2/2012 | Chiou et al. |
| 2012/0073740 | A1 | 3/2012 | Hsieh |
| 2012/0118740 | A1 | 5/2012 | Garcia et al. |
| 2012/0325665 | A1 | 12/2012 | Chiou et al. |
| 2013/0026040 | A1 | 1/2013 | Cheng et al. |
| 2013/0062205 | A1 | 3/2013 | Hadwen et al. |
| 2013/0118901 | A1 | 5/2013 | Pollack et al. |
| 2013/0118905 | A1 | 5/2013 | Morimoto et al. |
| 2013/0171546 | A1 | 7/2013 | White et al. |
| 2013/0171628 | A1 | 7/2013 | Di Carlo et al. |
| 2013/0190212 | A1 | 7/2013 | Handique et al. |
| 2013/0204076 | A1 | 8/2013 | Han et al. |
| 2013/0261021 | A1 | 10/2013 | Bocchi et al. |
| 2014/0116881 | A1 | 5/2014 | Chapman et al. |
| 2014/0124370 | A1 | 5/2014 | Short et al. |
| 2014/0153079 | A1 | 7/2014 | Hsieh |
| 2014/0299472 | A1 | 10/2014 | Chang et al. |
| 2014/0378339 | A1 | 12/2014 | Lammertyn et al. |
| 2015/0107995 | A1 | 4/2015 | Sista et al. |
| 2015/0151298 | A1 | 6/2015 | Hobbs et al. |
| 2015/0151307 | A1 | 6/2015 | Breinlinger et al. |
| 2015/0165436 | A1 | 6/2015 | Chapman et al. |
| 2015/0166326 | A1 | 6/2015 | Chapman et al. |
| 2015/0306598 | A1 | 10/2015 | Khandros et al. |
| 2015/0306599 | A1 | 10/2015 | Khandros et al. |
| 2015/0377831 | A1 | 12/2015 | Wheeler et al. |
| 2016/0043810 | A1 | 2/2016 | Quinlan et al. |
| 2016/0158748 | A1 | 6/2016 | Wu et al. |
| 2016/0184821 | A1 | 6/2016 | Hobbs et al. |
| 2016/0199837 | A1 | 7/2016 | Breinlinger et al. |
| 2016/0312165 | A1 | 10/2016 | Lowe, Jr. et al. |
| 2017/0043343 | A1 | 2/2017 | Khandros et al. |
| 2017/0173580 | A1 | 6/2017 | Lowe, Jr. et al. |
| 2017/0226453 | A1 | 8/2017 | Yang et al. |
| 2018/0298318 | A1 | 10/2018 | Kurz et al. |
| 2019/0060907 | A1 | 2/2019 | Bao et al. |
| 2019/0240665 | A1 | 8/2019 | Lionberger et al. |
| 2019/0275516 | A1 | 9/2019 | Lowe, Jr. et al. |
| 2020/0171501 | A1 | 6/2020 | McEwen et al. |

FOREIGN PATENT DOCUMENTS

| | | | |
|---|---|---|---|
| CN | 107257711 | | 10/2017 |
| EP | 3229958 | A1 | 10/2017 |
| EP | 3473699 | A1 | 4/2019 |
| JP | 2004135512 | A | 5/2004 |
| KR | 20100008222 | A | 1/2010 |
| KR | 20130128937 | | 11/2013 |
| WO | WO 2002088702 | A2 | 11/2002 |
| WO | WO 2004012848 | A2 | 2/2004 |
| WO | WO 2005100541 | A2 | 10/2005 |
| WO | WO 2007107910 | | 9/2007 |
| WO | WO 2008119066 | A1 | 10/2008 |
| WO | WO 2009053907 | A1 | 4/2009 |
| WO | WO 2010115167 | A2 | 10/2010 |
| WO | WO 2012072823 | A1 | 6/2012 |
| WO | WO 2013148745 | A1 | 10/2013 |
| WO | WO 2014036915 | A1 | 3/2014 |
| WO | WO 2014167858 | A1 | 10/2014 |
| WO | WO 2015092064 | A1 | 6/2015 |
| WO | WO 2015164846 | | 10/2015 |
| WO | WO 2016090295 | | 6/2016 |
| WO | WO 2017/021328 | | 2/2017 |
| WO | WO 2017021328 | A1 | 2/2017 |

OTHER PUBLICATIONS

Extended European Search Report for EP Patent Appln. No. 19886555.2 dated Jul. 29, 2022.

Foreign OA for CN Patent Appln. No. 201980089554.4 dated Nov. 1, 2022.

Foreign Search Report for CN Patent Appln. No. 201980089554.4 dated Nov. 1, 2022.

KR20130128937A, Chung (machine translation), Nov. 27, 2013, 11 pages.

Valley et al., "A unified platform for optoelectrowetting and optoelectronic tweezers", Lab on a Chip 11:1292-97, Feb. 22, 2011.

Valley et al., "An Integrated Platform for Light-Induced Dielectro-Phoresis and Electrowetting," International Conference on Miniaturized Systems for Chemistry and Life Sciences (2010).

Valley et al., "Optoelectronic Tweezers as a Tool for Parallel Single-Cell Manipulation and Stimulation," IEEE Transactions on Biomedical Circuits and Systems, vol. 3, No. 6 (Dec. 2009), pp. 424-431.

Xu, Guoling et al,. "Recent Trends in Dielectrophoresis," Informacije MIDEM, 2010, vol. 40, Issue No. 4, pp. 253-262.

PCT International Search Report and Written Opinion for International Application No. PCT/US2019/062063, Applicant Berkeley Lights, Inc., dated Mar. 18, 2020 (19 pages).

Fuchs et al., "Electronic sorting and recovery of single live cells from microlitre sized samples" Lab on a Chip 6:121-26 (2006).

Furuta, Tsutomu et al., "Wetting Mode Transition of Water Droplets by Electrowetting on Highly Hydrophobic Surfaces Coated with Two Different Silanes", Chemistry Letters 41.1 (2011): 23-25.

Hsu, HY et al., "Sorting of Differentiated Neurons Using Phototransistor-Based Optoelectronic Tweezers for Cell Replacement Therapy of Neurodegenerative Diseases", Transducers 2009, Denver, CO USA Jun. 2009, download dated Nov. 23, 2009 from IEEE Xplore, 4 pages.

Issadore et al., "A Microfluidic Microprocessor: Controlling Biomimetic Containers and Cells Using Hybrid Integrated Circuit/MicrofluidicChips", Lab on a Chip (2010), 10, pp. 2937-2943.

(56) References Cited

OTHER PUBLICATIONS

Manaresi et al., "A CMOS Chip for Individual Cell Manipulation and Detection," IEEE Journal of Solid-State Circuits, vol. 38, No. 12 (Dec. 2003), pp. 2297-2305.
Papageorgiou, D.P. et al. "Superior performance of multilayered fluoropolymer films in low voltage electrowetting" Journal of Colloid Interface Science, Oct. 25, 2011, vol. 368, No. 1, pp. 592-598.
Chiou, Y., "Massively Parallel Optical Manipulation of Single Cells, Micro- and Nano-particles on Optoelectronic Devices," University of California at Berkeley, Fall 2005.
Chiou, Y., et al., "Massively Parallel Manipulation of Single Cells and Microparticles Using Optical Images," Nature Letters, vol. 436, Jul. 21, 2005.
WO2014167858A1_Omote (Panasonic) Machine Translation, Oct. 16, 2014, 21 pages.
KR20100008222A_Kyun (KIPO computer-generated English language translation), Jan. 5, 2010, 10 pages.
JP2004135512A_SEGAWA (Sony) Machine Generated English Translation, May 13, 2004.
International Search Report and Written Opinion for Singapore Appln. No. 11202104544W dated Oct. 6, 2022.

System Clock/
Timing Signal
Switching
Control Signal
402a
402b
400b
326
Power
Ground
402d
402e Electrical System Clock/Timing
Signal
Electrical Switching
Control Signal
Optical Output Data
Signal (Including Initialization Signal)
404a
404b
404d

MICROFLUIDIC DEVICE WITH PROGRAMMABLE SWITCHING ELEMENTS

RELATED APPLICATION DATA

The patent application is a continuation of International Patent Application No. PCT/US2019/062, filed Nov. 18, 2019, which claims priority to U.S. provisional application No. 62/769,482, entitled "MICROFLUIDIC DEVICE WITH PROGRAMMABLE SWITCHING ELEMENTS," filed on Nov. 19, 2018, each of which applications is herein incorporated by reference in its entirety.

FIELD

The present disclosures pertain generally to opto-electric microfluidic devices.

BACKGROUND

"Microfluidic devices" (or "microfluidic apparatuses") are devices that include one or more discrete microfluidic circuits configured to hold a fluid, each microfluidic circuit comprised of fluidically interconnected circuit elements, including but not limited to region(s), flow path(s), channel(s), chamber(s), and/or pen(s), and at least one port configured to allow the fluid (and, optionally, micro-objects suspended in the fluid) to flow into and/or out of the microfluidic device. Typically, a microfluidic circuit of a microfluidic device will include a flow region, which may include a microfluidic channel, and at least one chamber, and will be configured to have a first end fluidically connected with a first port (e.g., an inlet) in the microfluidic device and a second end fluidically connected with a second port (e.g., an outlet) in the microfluidic device. Such microfluidic devices can be convenient platforms for processing micro-objects such as biological cells. Micro-objects (e.g., individual biological cells) in a microfluidic device can be selected and moved by selectively generating localized electrokinetic forces in the device.

By way of example, U.S. Pat. No. 9,403,172 ("the '172 patent"), which is fully incorporated herein by reference, discloses a microfluidic apparatus that includes a circuit substrate, a chamber, a first electrode, a second electrode, a switch mechanism and photosensitive elements. Dielectrophoresis (DEP) electrodes are located at different locations on a surface of the circuit substrate. The chamber is configured to contain a fluidic medium on the surface of the circuit substrate, wherein the first electrode is in electrical contact with the medium, and the second electrode is electrically insulated from the medium. The respective switch mechanisms are located between a different corresponding one of the DEP electrodes and the second electrode, wherein each switch mechanism is switchable between an off state in which the corresponding DEP electrode is deactivated and an on state in which the corresponding DEP electrode is activated. The photosensitive elements are configured to provide an output signal for controlling a different corresponding one of the switch mechanisms in accordance with a beam of light directed onto the photosensitive element. As described in the '172 patent, the microfluidic device is controlled by applying alternating current (AC) power to a first electrode and a second electrode of the microfluidic device, where the first electrode is in electrical contact with a medium in a chamber on an inner surface of a circuit substrate of the microfluidic device, and the second electrode is electrically insulated from the medium. Respective DEP electrodes on the inner surface of the circuit substrate are activated by directing a light beam onto a corresponding photosensitive element in the circuit substrate, providing, in response to the light beam, an output signal from the photosensitive element, and switching, in response to the output signal, a switch mechanism in the circuit substrate from an off state in which the DEP electrode is deactivated to an on state in which the DEP electrode is activated.

It is known to use a "nest" type system for maintaining, isolating, assaying and/or culturing biological micro-objects (e.g., cells) contained in a microfluidic device mounted on the nest. Such nests may be designed to simultaneously mount multiple microfluidic devices. The nest is typically provided with a single imaging device that includes a light source and a camera used to both "image" the respective microfluidic device(s) to obtain a present image of the location of the respective micro-objects from which a plan to manipulate/move the objects is calculated, and to actively manipulate/move the objects by actively switching ON/OFF respective switching elements located on the device, as described, for example, in the '172 patent. However, only a single field of view ("FOV") of the imaging device can have active opto-electrical processing ("OEP") of the micro-objects at a given time; that is, only when imaging device's light source is "ON" will any of the switching elements be activated on the device. Thus, when the imaging device is not viewing a particular FOV, there can be no active OEP within said FOV, because there is no light source available to do this. Moreover, while the time needed to image a single FOV and determine "what to do" may take only approximately one second, or even less, the ensuing process of using the light source of the imaging device to operate the respective switching elements within the FOV to carry out the plan may take upwards of ninety seconds per FOV. Thus, in a nest system that is used to control (by way of example) four microfluidic devices using a single imaging device (camera/light) source, with each of the microfluidic devices having approximately twenty FOVs, only 1/80th of the combined total active area of the four devices may be operated at a time. This inefficiency gets proportionately greater as the respective microfluidic devices themselves get larger and have a greater number of FOVs per device and/or as nests are constructed to mount and control more than four devices and/or as the imaging needed requires finer resolution and the FOV shrinks (i.e. requiring more FOVs to cover the same area). Accordingly, there is a need for microfluidic devices and opti-electrical control systems that address these limitations and allow for greater device processing efficiency.

SUMMARY

The present disclosure relates to microfluidic devices having a circuit substrate with a control unit, a switching mechanism associated with a dielectrophoresis (DEP) electrode, and a memory unit. Embodiments of such devices disclosed herein provide for switching instructions to be received, stored, and retrieved by the control unit and used to control the DEP electrode via the switching mechanism. Systems comprising the microfluidic devices and methods of controlling the microfluidic devices are also described herein.

In certain embodiments, a microfluidic device comprises a circuit substrate made of a semiconductor material in which circuit elements can be formed, the circuit substrate comprising a surface; and a chamber defined in part by said circuit substrate surface, wherein said chamber is configured to contain a fluidic medium. In some such devices a first electrode is disposed to be in electrical contact with said fluidic medium; a second electrode is disposed to be electrically insulated from said fluidic medium; and dielectrophoresis (DEP) electrodes at different locations on or proximate to said circuit substrate surface are each disposed to be in electrical contact with said fluidic medium. Switch mechanisms, are each disposed between a different corresponding one of said DEP electrodes and said second electrode, wherein each said switch mechanism is switchable between an OFF state in which said corresponding DEP electrode is electrically isolated from said second electrode and an ON state in which said corresponding DEP electrode is electrically connected with said second electrode. In such embodiments control circuits are each operatively connected with a corresponding photosensitive element and a corresponding one or more of said switch mechanisms, wherein each said corresponding photosensitive element is configured to generate an output signal comprising instructions for controlling said corresponding one or more said switch mechanisms in response to a modulated light beam directed onto said photosensitive element. Each said control circuit comprises or is associated with a memory configured to at least temporarily store said output signal from said corresponding one of said photosensitive elements. Each said control circuit is configured to control whether each said one or more corresponding switch mechanisms is in said OFF state or said ON state for each time interval of a succession of time intervals based on said instructions in the stored output signal.

Systems including a microfluidic device as described herein are also disclosed. In some embodiments such systems further include a light emitting device, wherein one or both of the light emitting device and the microfluidic device are movable relative to the other one such that the light emitting device may be selectively positioned at each of a plurality of fields of view of the circuit substrate surface. In some examples the light emitting device comprises light emitting elements, each configured to direct a respective modulated light beam onto a corresponding one of said photosensitive elements located within a given field of view of the circuit substrate surface at which the light emitting device is positioned.

In certain described embodiments of systems including the described microfluidic devices, the system may be configured to automatically (a) move one or both of the microfluidic device and the light emitting device relative to the other one so as to position the light emitting device at a first field of view of the circuit substrate surface, (b) direct respective modulated light beams transmitted by said light emitting elements onto said corresponding ones of said photosensitive elements located within the first field of view, (c) deliver an initialization pulse/signal to control circuits corresponding to said photosensitive elements located within the first field of view to thereby synchronize said corresponding control circuits with respective output signals generated by said photosensitive elements, (d) move one or both of the microfluidic device and the light emitting device relative to the other one so as to position the light emitting device at a next field of view of the circuit substrate surface, (e) direct respective modulated light beams transmitted by said light emitting elements onto said corresponding ones of said photosensitive elements located within the next first field of view, (f) deliver an initialization pulse/signal to control circuits corresponding to said photosensitive elements located within the next field of view to thereby synchronize said corresponding control circuits with respective output signals generated by said photosensitive elements, and (g) repeat (d) to (f) until the respective modulated light beams have been directed onto said corresponding photosensitive elements located in all fields of view of the circuit substrate surface.

Examples of methods of controlling the microfluidic devices are also described herein. Some examples relate a method of controlling a microfluidic device that comprises a semiconductor circuit substrate and a chamber containing a fluidic medium disposed on a surface of said circuit substrate, wherein a dielectrophoresis (DEP) electrode is disposed on or proximate to said circuit substrate surface in electrical contact with said fluidic medium. A method of controlling such a microfluidic device as described includes (a) applying alternating current (AC) power to a first electrode and a second electrode of said microfluidic device, wherein said first electrode is in electrical contact with said fluidic medium and said second electrode is electrically insulated from said fluidic medium; (b) directing a modulated light beam onto a photosensitive element in said circuit substrate, wherein said photosensitive element generates, in response to said light beam, an output signal comprising instructions for controlling said DEP; (c) storing, at least temporarily, said output signal in a memory located within said circuit substrate, and (d) controlling, based on said instructions contained in said stored output signal, a switch mechanism located within said circuit substrate so that said switch mechanism is in one of an OFF state, in which said DEP electrode is electrically isolated from said second electrode, or an ON state, in which said DEP electrode is electrically connected with said second electrode, for each time interval of a succession of time intervals.

In other embodiments of a method of controlling a microfluidic device, wherein the microfluidic device comprises a circuit substrate and a chamber containing a fluidic medium disposed on a surface of said circuit substrate, and wherein dielectrophoresis (DEP) electrodes are disposed on or proximate to said circuit substrate surface in electrical contact with said fluidic medium, the method comprises: (a) positioning a light emitting device at a first field of view of the circuit substrate surface, the light emitting device comprising light emitting elements; (b) directing respective modulated light beams from said light emitting elements onto corresponding photosensitive elements located on or proximate to the circuit substrate surface within the first field of view, wherein each said photosensitive element generates an output signal comprising instructions for controlling a corresponding DEP electrode in response to the respective modulated light beam; (c) delivering an initialization pulse/signal to respective control circuits corresponding to said photosensitive elements located in said first field of view to thereby synchronize said control circuits with the output signals generated by said photosensitive elements; and (d) storing, at least temporarily, said output signals in respective memories of or associated with said control circuits. In certain such embodiments, the method may further comprise (e) applying alternating current (AC) power to a first electrode and a second electrode of said microfluidic device, wherein said first electrode is in electrical contact with said fluidic medium and said second electrode is electrically insulated from said fluidic medium; and (f) controlling, based on said instructions contained in said respective stored output signals, switch mechanisms located within said circuit substrate so that each said switch mechanism is in one of an OFF state, in which a DEP electrode corresponding to said switch mechanism is isolated from said second electrode, or an ON state, in which said corresponding DEP electrode is electrically connected with said second electrode, for each time interval of a succession of time intervals. In some such embodiments the method may further comprise: (g) positioning the light emitting device at a next field of view of the circuit substrate surface; (h) directing respective modulated light beams from said light emitting elements onto corresponding photosensitive elements located on or proximate to the circuit substrate surface within the next field of view, wherein each said photosensitive element generates an output signal comprising instructions for controlling a corresponding DEP electrode in response to the respective modulated light beam; (i) delivering an initialization pulse/signal to respective control circuits corresponding to said photosensitive elements located in said next field of view to thereby synchronize said control circuits with the output signals generated by said photosensitive elements; (j) storing, at least temporarily, said output signals in respective memories of or associated with said control circuits; and (k) repeating steps (g)-(j) until respective modulated light beams have been directed onto said corresponding photosensitive elements located in all fields of view of the circuit substrate surface.

In still other embodiments of a method of controlling a microfluidic device, the microfluidic device comprises a circuit substrate and a chamber containing a fluidic medium and micro-objects disposed on a surface of said circuit substrate, wherein dielectrophoresis (DEP) electrodes are disposed on or proximate to said circuit substrate surface in electrical contact with said fluidic medium. In such embodiments, the method comprises (a) positioning an image acquisition device at a first field of view (FOV) of the circuit substrate surface; (b) acquiring image data of the first FOV of the substrate including micro-objects disposed thereon using the image acquisition device; (c) processing the image data to generate a plan for selectively activating the DEP electrodes in order to move the micro-objects imaged in the first FOV; (d) positioning a light emitting device at the first FOV, the light emitting device comprising light emitting elements; (e) directing respective modulated light beams from said light emitting elements onto corresponding photosensitive elements located on or proximate to the circuit substrate surface within the first FOV, wherein each said photosensitive element generates an output signal in response to the respective modulated light beam, said output signal comprising instructions for controlling selective activation of a corresponding DEP electrode located within the first FOV in accordance with the determined plan; (f) delivering an initialization pulse/signal to respective control circuits corresponding to said photosensitive elements located in said first FOV to thereby synchronize said control circuits with the output signals generated by said photosensitive elements; and (g) in response to said initialization pulse/signal, storing, at least temporarily, said output signals in respective memories of or associated with said control circuits corresponding to said photosensitive elements located in said first FOV.

Other and further aspects and features of the disclosed embodiments will become apparent from the ensuing detailed description in view of the accompanying drawings.

BRIEF DESCRIPTION OF THE DRAWINGS

The drawings illustrate the design and utility of embodiments of the disclosed inventions, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments of the disclosed inventions and are not therefore to be considered limiting of its scope.

DETAILED DESCRIPTION

Figure 1:
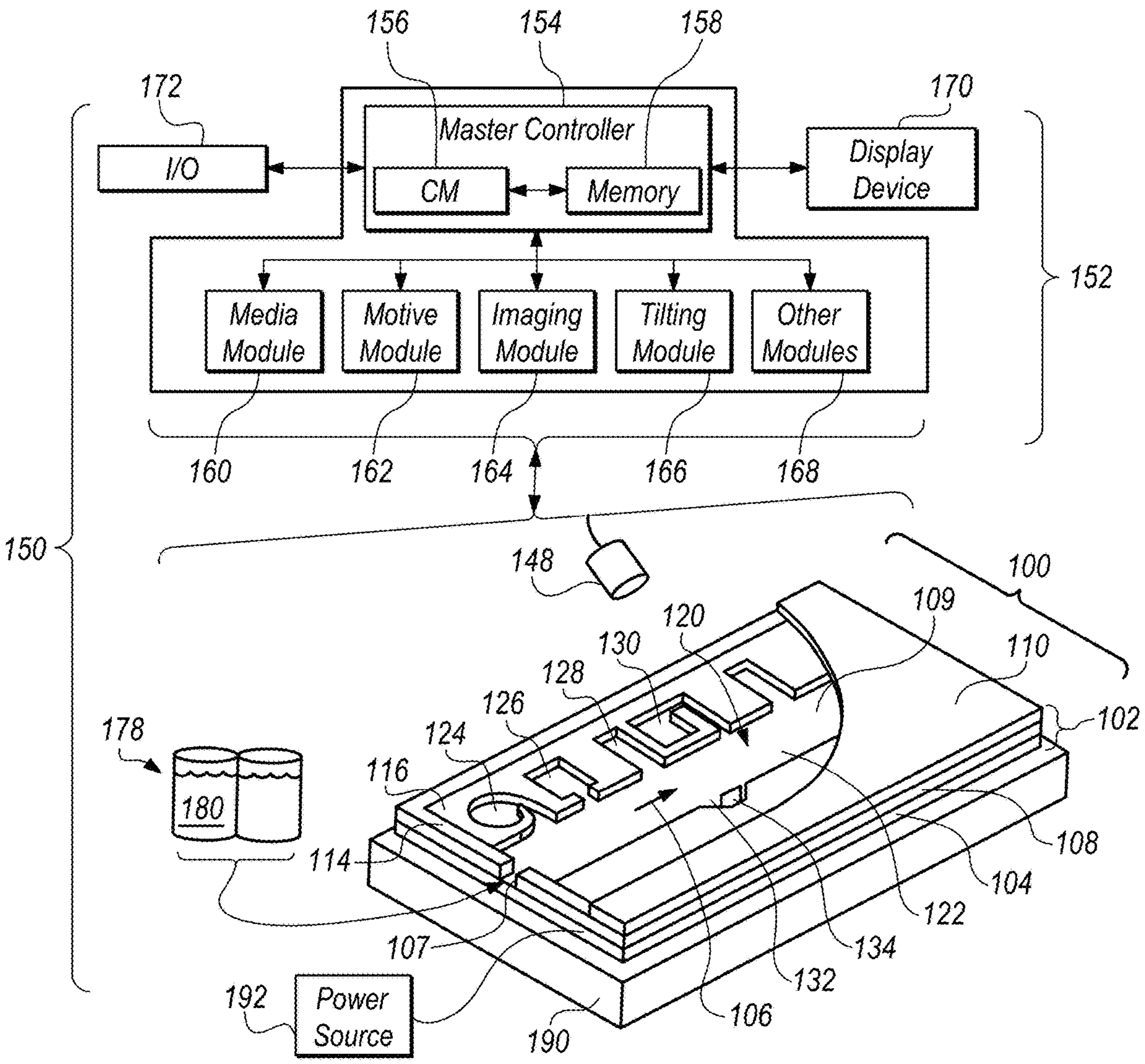
FIG. 1 is a perspective, partially cutaway, view of a microfluidic device and a block diagram of a microfluidic control system constructed in accordance with one embodiment of the present invention.

This specification describes exemplary embodiments and applications of the disclosure. The disclosure, however, is not limited to these exemplary embodiments and applications or to the manner in which the exemplary embodiments and applications operate or are described herein. Moreover, the figures may show simplified or partial views, and the dimensions of elements in the figures may be exaggerated or otherwise not in proportion. In addition, as the terms "on," "attached to," "connected to," "coupled to," or similar words are used herein, one element (e.g., a material, a layer, a substrate, etc.) can be "on," "attached to," "connected to," or "coupled to" another element regardless of whether the one element is directly on, attached to, connected to, or coupled to the other element or there are one or more intervening elements between the one element and the other element. Also, unless the context dictates otherwise, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements. Section divisions in the specification are for ease of review only and do not limit any combination of elements discussed.

Where dimensions of microfluidic features are described as having a width or an area, the dimension typically is described relative to an x-axial and/or y-axial dimension, both of which lie within a plane that is parallel to the substrate and/or cover of the microfluidic device. The height of a microfluidic feature may be described relative to a z-axial direction, which is perpendicular to a plane that is parallel to the substrate and/or cover of the microfluidic device. In some instances, a cross sectional area of a microfluidic feature, such as a channel or a passageway, may be in reference to a x-axial/z-axial, a y-axial/z-axial, or an x-axial/y-axial area.

As used herein, "substantially" means sufficient to work for the intended purpose. The term "substantially" thus allows for minor, insignificant variations from an absolute or perfect state, dimension, measurement, result, or the like such as would be expected by a person of ordinary skill in the field but that do not appreciably affect overall performance. When used with respect to numerical values or parameters or characteristics that can be expressed as numerical values, "substantially" means within ten percent.

The term "ones" means more than one.

As used herein, the term "plurality" can be 2, 3, 4, 5, 6, 7, 8, 9, 10, or more.

As used herein: μm means micrometer, $\mu m^3$ means cubic micrometer, pL means picoliter, nL means nanoliter, and μL (or uL) means microliter.

As used herein, the term "disposed" encompasses within its meaning "located."

As used herein, a "microfluidic device" or "microfluidic apparatus" is a device that includes one or more discrete microfluidic circuits configured to hold a fluid, each microfluidic circuit comprised of fluidically interconnected circuit elements, including but not limited to region(s), flow path(s), channel(s), chamber(s), and/or pen(s), and at least one port configured to allow the fluid (and, optionally, micro-objects suspended in the fluid) to flow into and/or out of the microfluidic device. Typically, a microfluidic circuit of a microfluidic device will include a flow region, which may include a microfluidic channel, and at least one chamber, and will hold a volume of fluid of less than about 1 mL, e.g., less than about 750, 500, 250, 200, 150, 100, 75, 50, 25, 20, 15, 10, 9, 8, 7, 6, 5, 4, 3, or 2 μL. In certain embodiments, the microfluidic circuit holds about 1-2, 1-3, 1-4, 1-5, 2-5, 2-8, 2-10, 2-12, 2-15, 2-20, 5-20, 5-30, 5-40, 5-50, 10-50, 10-75, 10-100, 20-100, 20-150, 20-200, 50-200, 50-250, or 50-300 μL. The microfluidic circuit may be configured to have a first end fluidically connected with a first port (e.g., an inlet) in the microfluidic device and a second end fluidically connected with a second port (e.g., an outlet) in the microfluidic device. In some embodiments a microfluidic device may have more than two ports, e.g. 3, 4, 5, 6 or more ports; a typical example may have two inlets and two outlets, e.g. for fluidically connecting to two microfluidic circuits on the same microfluidic device.

As used herein, a "nanofluidic device" or "nanofluidic apparatus" is a type of microfluidic device having a microfluidic circuit that contains at least one circuit element configured to hold a volume of fluid of less than about 1 μL, e.g., less than about 750, 500, 250, 200, 150, 100, 75, 50, 25, 20, 15, 10, 9, 8, 7, 6, 5, 4, 3, 2, 1 nL or less. A nanofluidic device may comprise a plurality of circuit elements (e.g., at least 2, 3, 4, 5, 6, 7, 8, 9, 10, 15, 20, 25, 50, 75, 100, 150, 200, 250, 300, 400, 500, 600, 700, 800, 900, 1000, 1500, 2000, 2500, 3000, 3500, 4000, 4500, 5000, 6000, 7000, 8000, 9000, 10,000, or more). In certain embodiments, one or more (e.g., all) of the at least one circuit elements is configured to hold a volume of fluid of about 100 pL to 1 nL, 100 pL to 2 nL, 100 pL to 5 nL, 250 pL to 2 nL, 250 pL to 5 nL, 250 pL to 10 nL, 500 pL to 5 nL, 500 pL to 10 nL, 500 pL to 15 nL, 750 pL to 10 nL, 750 pL to 15 nL, 750 pL to 20 nL, 1 to 10 nL, 1 to 15 nL, 1 to 20 nL, 1 to 25 nL, or 1 to 50 nL. In other embodiments, one or more (e.g., all) of the at least one circuit elements are configured to hold a volume of fluid of about 20 nL to 200 nL, 100 to 200 nL, 100 to 300 nL, 100 to 400 nL, 100 to 500 nL, 200 to 300 nL, 200 to 400 nL, 200 to 500 nL, 200 to 600 nL, 200 to 700 nL, 250 to 400 nL, 250 to 500 nL, 250 to 600 nL, or 250 to 750 nL.

A microfluidic device or a nanofluidic device may be referred to herein as a "microfluidic chip" or a "chip"; or "nanofluidic chip" or "chip".

A "microfluidic channel" or "flow channel" as used herein refers to flow region of a microfluidic device having a length that is significantly longer than both the horizontal and vertical dimensions. For example, the flow channel can be at least 5 times the length of either the horizontal or vertical dimension, e.g., at least 10 times the length, at least 25 times the length, at least 100 times the length, at least 200 times the length, at least 500 times the length, at least 1,000 times the length, at least 5,000 times the length, or longer. In some embodiments, the length of a flow channel is about 100,000 microns to about 500,000 microns, including any value therebetween. In some embodiments, the horizontal dimension is about 100 microns to about 1000 microns (e.g., about 150 to about 500 microns) and the vertical dimension is about 25 microns to about 200 microns, (e.g., from about 40 to about 150 microns). It is noted that a flow channel may have a variety of different spatial configurations in a microfluidic device, and thus is not restricted to a perfectly linear element. For example, a flow channel may be, or include one or more sections having, the following configurations: curve, bend, spiral, incline, decline, fork (e.g., multiple different flow paths), and any combination thereof. In addition, a flow channel may have different cross-sectional areas along its path, widening and constricting to provide a desired fluid flow therein. The flow channel may include valves, and the valves may be of any type known in the art of microfluidics. Examples of microfluidic channels that include valves are disclosed in U.S. Pat. Nos. 6,408,878 and 9,227,200, each of which is herein incorporated by reference in its entirety.

As used herein, the term “obstruction” refers generally to a bump or similar type of structure that is sufficiently large so as to partially (but not completely) impede movement of target micro-objects between two different regions or circuit elements in a microfluidic device. The two different regions/circuit elements can be, for example, the connection region and the isolation region of a microfluidic sequestration pen.

As used herein, the term “constriction” refers generally to a narrowing of a width of a circuit element (or an interface between two circuit elements) in a microfluidic device. The constriction can be located, for example, at the interface between the isolation region and the connection region of a microfluidic sequestration pen of the instant disclosure.

As used herein, the term “transparent” refers to a material that allows light in a specific frequency range (or spectrum) to pass through without substantially altering the light as it passes through the material. In typical embodiments as described herein the light of a specific frequency may be visible light, UV light, and/or IR light.

As used herein, the term “micro-object” refers generally to any microscopic object that may be isolated and/or manipulated in accordance with the present disclosure. Non-limiting examples of micro-objects include: inanimate micro-objects such as microparticles; microbeads (e.g., polystyrene beads, Luminex™ beads, or the like); magnetic beads; microrods; microwires; quantum dots, and the like; biological micro-objects such as cells; biological organelles; vesicles, or complexes; synthetic vesicles; liposomes (e.g., synthetic or derived from membrane preparations); lipid nanorafts, and the like; or a combination of inanimate micro-objects and biological micro-objects (e.g., microbeads attached to cells, liposome-coated micro-beads, liposome-coated magnetic beads, or the like). Beads may include moieties/molecules covalently or non-covalently attached, such as fluorescent labels, proteins, carbohydrates, antigens, small molecule signaling moieties, or other chemical/biological species capable of use in an assay. Lipid nanorafts have been described, for example, in Ritchie et al. (2009) “Reconstitution of Membrane Proteins in Phospholipid Bilayer Nanodiscs,” Methods Enzymol., 464:211-231.

As used herein, the term “cell” is used interchangeably with the term “biological cell.” Non-limiting examples of biological cells include eukaryotic cells, plant cells, animal cells, such as mammalian cells, reptilian cells, avian cells, fish cells, or the like, prokaryotic cells, bacterial cells, fungal cells, archae cells, protists, protozoan cells, or the like, cells dissociated from a tissue, such as muscle, cartilage, fat, skin, liver, lung, neural tissue, and the like, immunological cells, such as T cells, B cells, natural killer cells, macrophages, and the like, embryos (e.g., zygotes), oocytes, ova, sperm cells, hybridomas, cultured cells, cells from a cell line, cancer cells, infected cells, transfected and/or transformed cells, reporter cells, and the like. A mammalian cell can be, for example, from a human, a mouse, a rat, a horse, a goat, a sheep, a cow, a primate, or the like.

A colony of biological cells is “clonal” if all of the living cells in the colony that are capable of reproducing are daughter cells derived from a single parent cell. In certain embodiments, all the daughter cells in a clonal colony are derived from the single parent cell by no more than 10 divisions. In other embodiments, all the daughter cells in a clonal colony are derived from the single parent cell by no more than 14 divisions. In other embodiments, all the daughter cells in a clonal colony are derived from the single parent cell by no more than 17 divisions. In other embodiments, all the daughter cells in a clonal colony are derived from the single parent cell by no more than 20 divisions. The term “clonal cells” refers to cells of the same clonal colony.

As used herein, a “colony” of biological cells refers to 2 or more cells (e.g. about 2 to about 20, about 4 to about 40, about 6 to about 60, about 8 to about 80, about 10 to about 100, about 20 to about 200, about 40 to about 400, about 60 to about 600, about 80 to about 800, about 100 to about 1000, or greater than 1000 cells).

As used herein, the term “maintaining (a) cell(s)” refers to providing an environment comprising both fluidic and gaseous components and, optionally a surface, that provides the conditions necessary to keep the cells viable and/or expanding.

As used herein, the term “expanding,” when referring to cells, refers to increasing in cell number.

A “component” of a fluidic medium is any chemical or biochemical molecule present in the medium, including solvent molecules, ions, small molecules, antibiotics, nucleotides and nucleosides, nucleic acids, amino acids, peptides, proteins, sugars, carbohydrates, lipids, fatty acids, cholesterol, metabolites, or the like.

As used herein, “capture moiety” is a chemical or biological species, functionality, or motif that provides a recognition site for a micro-object. A selected class of micro-objects may recognize the in situ-generated capture moiety and may bind or have an affinity for the in situ-generated capture moiety. Non-limiting examples include antigens, antibodies, and cell surface binding motifs.

As used herein, “flowable polymer” is a polymer monomer or macromer that is soluble or dispersible within a fluidic medium (e.g., a pre-polymer solution). The flowable polymer may be input into a microfluidic flow region and flow with other components of a fluidic medium therein.

As used herein, “photoinitiated polymer” refers to a polymer (or a monomeric molecule that can be used to generate the polymer) that upon exposure to light, is capable of crosslinking covalently, forming specific covalent bonds, changing regiochemistry around a rigidified chemical motif, or forming ion pairs which cause a change in physical state, and thereby forming a polymer network. In some instances, a photoinitiated polymer may include a polymer segment bound to one or more chemical moieties capable of crosslinking covalently, forming specific covalent bonds, changing regiochemistry around a rigidified chemical motif, or forming ion pairs which cause a change in physical state. In some instances, a photoinitiated polymer may require a photoactivatable radical initiator to initiate formation of the polymer network (e.g., via polymerization of the polymer).

As used herein, “antibody” refers to an immunoglobulin (Ig) and includes both polyclonal and monoclonal antibodies; primatized (e.g., humanized); murine; mouse-human; mouse-primate; and chimeric; and may be an intact molecule, a fragment thereof (such as scFv, Fv, Fd, Fab, Fab' and $F(ab)'_2$ fragments), or multimers or aggregates of intact molecules and/or fragments; and may occur in nature or be produced, e.g., by immunization, synthesis or genetic engineering. An “antibody fragment,” as used herein, refers to fragments, derived from or related to an antibody, which bind antigen and which in some embodiments may be derivatized to exhibit structural features that facilitate clearance and uptake, e.g., by the incorporation of galactose residues. This includes, e.g., F(ab), $F(ab)'_2$, scFv, light chain variable region (VL), heavy chain variable region (VH), and combinations thereof.

As used herein in reference to a fluidic medium, “diffuse” and “diffusion” refer to thermodynamic movement of a component of the fluidic medium down a concentration gradient.

The phrase “flow of a medium” means bulk movement of a fluidic medium primarily due to any mechanism other than diffusion. For example, flow of a medium can involve movement of the fluidic medium from one point to another point due to a pressure differential between the points. Such flow can include a continuous, pulsed, periodic, random, intermittent, or reciprocating flow of the liquid, or any combination thereof. When one fluidic medium flows into another fluidic medium, turbulence and mixing of the media can result.

The phrase “substantially no flow” refers to a rate of flow of a fluidic medium that, averaged over time, is less than the rate of diffusion of components of a material (e.g., an analyte of interest) into or within the fluidic medium. The rate of diffusion of components of such a material can depend on, for example, temperature, the size of the components, and the strength of interactions between the components and the fluidic medium.

As used herein in reference to different regions within a microfluidic device, the phrase “fluidically connected” means that, when the different regions are substantially filled with fluid, such as fluidic media, the fluid in each of the regions is connected so as to form a single body of fluid. This does not mean that the fluids (or fluidic media) in the different regions are necessarily identical in composition. Rather, the fluids in different fluidically connected regions of a microfluidic device can have different compositions (e.g., different concentrations of solutes, such as proteins, carbohydrates, ions, or other molecules) that are in flux as solutes move down their respective concentration gradients and/or fluids flow through the microfluidic device.

As used herein, a “flow path” refers to one or more fluidically connected circuit elements (e.g. channel(s), region(s), chamber(s) and the like) that define, and are subject to, the trajectory of a flow of medium. A flow path is, thus, an example of a swept region of a microfluidic device. Other circuit elements (e.g., unswept regions) may be fluidically connected with the circuit elements that comprise the flow path without being subject to the flow of medium in the flow path.

As used herein, “isolating a micro-object” confines a micro-object to a defined area within the microfluidic device.

A microfluidic (or nanofluidic) device can comprise “swept” regions and “unswept” regions. As used herein, a “swept” region is comprised of one or more fluidically interconnected circuit elements of a microfluidic circuit, each of which experiences a flow of medium when fluid is flowing through the microfluidic circuit. The circuit elements of a swept region can include, for example, regions, channels, and all or parts of chambers. As used herein, an “unswept” region is comprised of one or more fluidically interconnected circuit elements of a microfluidic circuit, each of which experiences substantially no flux of fluid when fluid is flowing through the microfluidic circuit. An unswept region can be fluidically connected to a swept region, provided the fluidic connections are structured to enable diffusion but substantially no flow of media between the swept region and the unswept region. The microfluidic device can thus be structured to substantially isolate an unswept region from a flow of medium in a swept region, while enabling substantially only diffusive fluidic communication between the swept region and the unswept region. For example, a flow channel of a micro-fluidic device is an example of a swept region while an isolation region (described in further detail below) of a microfluidic device is an example of an unswept region.

The capability of biological micro-objects (e.g., biological cells) to produce specific biological materials (e.g., proteins, such as antibodies) can be assayed in such a microfluidic device. In a specific embodiment of an assay, sample material comprising biological micro-objects (e.g., cells) to be assayed for production of an analyte of interest can be loaded into a swept region of the microfluidic device. Ones of the biological micro-objects (e.g., mammalian cells, such as human cells) can be selected for particular characteristics and disposed in unswept regions. The remaining sample material can then be flowed out of the swept region and an assay material flowed into the swept region. Because the selected biological micro-objects are in unswept regions, the selected biological micro-objects are not substantially affected by the flowing out of the remaining sample material or the flowing in of the assay material. The selected biological micro-objects can be allowed to produce the analyte of interest, which can diffuse from the unswept regions into the swept region, where the analyte of interest can react with the assay material to produce localized detectable reactions, each of which can be correlated to a particular unswept region. Any unswept region associated with a detected reaction can be analyzed to determine which, if any, of the biological micro-objects in the unswept region are sufficient producers of the analyte of interest.

Referring now to FIG. 1, an exemplary microfluidic device 100 and a microfluidic control system 150 used to observe and control the microfluidic device 100 and the movement of micro-objects therein will now be described. The microfluidic control system 150 generally comprises a support structure (“nest”) 500 (shown in FIG. 16), a power source 192, a tilting device 190, a light emitting and/or imaging device 148, and control and monitoring equipment 152. The microfluidic control system 150 will be described in further detail below.

The microfluidic device 100 generally comprises a chamber 102 containing a fluidic medium 180, and a microfluidic circuit 120 having a flow path 106 through which the fluidic medium 180 can flow, optionally carrying one or more micro-objects (not shown in FIG. 1) into and/or through the microfluidic circuit 120. In some instances, the flow path 106 comprises a single path. In some instances, the single path is arranged in a zigzag pattern, whereby the flow path 106 travels across the microfluidic device 100 two or more times in alternating directions. Although a single microfluidic circuit 120 is illustrated in FIG. 1, suitable microfluidic devices can include a plurality (e.g., 2 or 3) of such microfluidic circuits.

As generally illustrated in FIG. 1, the microfluidic circuit 120 is defined by a chamber 102. Although the chamber 102 can be physically structured in different configurations, in the example shown in FIG. 1 the chamber 102 is depicted as comprising a support structure 104 (e.g., a base), a microfluidic circuit structure 108, and a cover 110. The support structure 104, microfluidic circuit structure 108, and cover 110 can be attached to each other. For example, the microfluidic circuit structure 108 can be disposed on an inner surface 109 of the support structure 104, and the cover 110 can be disposed over the microfluidic circuit structure 108. Together with the support structure 104 and cover 110, the microfluidic circuit structure 108 can define the elements of the microfluidic circuit 120.

The support structure 104 can be at the bottom and the cover 110 at the top of the microfluidic circuit 120 as illustrated in FIG. 1. Alternatively, the support structure 104 and the cover 110 can be configured in other orientations. For example, the support structure 104 can be at the top and the cover 110 at the bottom of the microfluidic circuit 120. Regardless, there can be one or more ports 107, each comprising a passage into or out of the chamber 102. Examples of a passage include a valve, a gate, a pass-through hole, or the like. As illustrated, the port 107 is a pass-through hole created by a gap in the microfluidic circuit structure 108. However, the port 107 can be situated in other components of the chamber 102, such as the cover 110. Only one port 107 is illustrated in FIG. 1, but the microfluidic circuit 120 can have two or more ports 107. For example, there can be a first port 107 that functions as an inlet for fluid entering the microfluidic circuit 120, and there can be a second port 107 that functions as an outlet for fluid exiting the microfluidic circuit 120. Whether a port 107 functions as an inlet or an outlet can depend upon the direction that fluid flows through flow path 106.

In the microfluidic circuit 120 illustrated in FIG. 1, the microfluidic circuit structure 108 comprises a frame 114 and a microfluidic circuit material 116. The frame 114 can partially or completely enclose the microfluidic circuit material 116. The frame 114 can be, for example, a relatively rigid structure substantially surrounding the microfluidic circuit material 116. For example, the frame 114 can comprise a metal material. The microfluidic circuit structure 108 defines circuit elements of the microfluidic circuit 120. Such circuit elements can comprise spaces or regions that can be fluidly interconnected when microfluidic circuit 120 is filled with fluid, such as flow regions (which may include or be one or more flow channels), chambers, pens, traps, and the like.

To this end, the microfluidic circuit material 116 can be patterned with cavities or the like to define circuit elements and interconnections of the microfluidic circuit 120. The microfluidic circuit material 116 can comprise a flexible material, such as a flexible polymer (e.g. rubber, plastic, elastomer, silicone, polydimethylsiloxane ("PDMS"), or the like), which can be gas permeable. Other examples of materials that can compose microfluidic circuit material 116 include molded glass, an etchable material, such as silicone (e.g. photo-patternable silicone or "PPS"), photo-resist (e.g., SU8), or the like. In some embodiments, such materials, and thus the microfluidic circuit material 116, can be rigid and/or substantially impermeable to gas. Regardless, the microfluidic circuit material 116 can be disposed on the support structure 104 and inside the frame 114.

The cover 110 can be an integral part of the frame 114 and/or the microfluidic circuit material 116. Alternatively, the cover 110 can be a structurally distinct element, as illustrated in FIG. 1. The cover 110 can comprise the same or different materials than the frame 114 and/or the microfluidic circuit material 116. Similarly, the support structure 104 can be a separate structure from the frame 114 or microfluidic circuit material 116 as illustrated, or an integral part of the frame 114 or microfluidic circuit material 116. Likewise, the frame 114 and microfluidic circuit material 116 can be separate structures as shown in FIG. 1 or integral portions of the same structure.

In some embodiments, the cover 110 can comprise a rigid material. The rigid material may be glass or a material with similar properties. In some embodiments, the cover 110 can comprise a deformable material. The deformable material can be a polymer, such as PDMS. In some embodiments, the cover 110 can comprise both rigid and deformable materials. For example, one or more portions of the cover 110 can comprise a deformable material that interfaces with rigid materials of the cover 110. In some embodiments, the cover 110 can be modified (e.g., by conditioning all or part of a surface that faces inward toward the microfluidic circuit 120) to support cell adhesion, viability and/or growth. The modification may include a coating of a synthetic or natural polymer. In some embodiments, the cover 110 and/or the support structure 104 can be transparent to light. The cover 110 may also include at least one material that is gas permeable (e.g., PDMS or PPS).

As illustrated in FIG. 1, the microfluidic circuit 120 comprises a microfluidic channel 122 and a plurality of microfluidic sequestration pens 124, 126, 128, and 130, each having one or more openings in fluidic communication with the flow path 106, but otherwise is enclosed, such that the pens can substantially isolate micro-objects inside the pens from micro-objects and/or fluidic medium 180 in the microfluidic channel 122 or in other pens. The walls of each of the microfluidic sequestration pens 124, 126, 128, and 130 can extend from the inner surface 109 of the base to the inside surface of the cover 110 to thereby facilitate such isolation. The opening of each of the microfluidic sequestration pens 124, 126, 128, and 130 to the microfluidic channel 122 can be oriented at an angle with respect to the flow of fluidic medium 180 in the microfluidic channel 122, such that the flow of fluidic medium 180 is not directed into the pens. The flow may be, e.g., tangential or orthogonal to the plane of the opening of the pens. In some instances, the microfluidic sequestration pens 124, 126, 128, and 130 are configured to physically corral one or more micro-objects within the microfluidic circuit 120. The sequestration pens 124, 126, 128, 130 can comprise various shapes, surfaces and features that are optimized for use with DEP, OET, OEW, fluid flow, and/or gravitational forces for maintaining, isolating, assaying and/or culturing biological micro-objects, as will be discussed and shown in detail below.

The microfluidic circuit 120 may comprise any number of microfluidic sequestration pens 124, 126, 128, and 130. Although five sequestration pens are shown, the microfluidic circuit 120 may have fewer or more sequestration pens. As shown, the microfluidic sequestration pens 124, 126, 128, and 130 of the microfluidic circuit 120 comprise differing features and shapes that may provide one or more benefits useful for the manipulation of micro-objects and/or droplets of fluidic medium within the microfluidic device 100. Thus, in some embodiments, the microfluidic circuit 120 may comprise a plurality of microfluidic sequestration pens, with two or more of the sequestration pens comprising differing structures and/or features that provide differing benefits. In some embodiments, however, the microfluidic circuit 120 comprises a plurality of identical microfluidic sequestration pens.

In the embodiment illustrated in FIG. 1, a single channel 122 and flow path 106 is shown. However, other embodiments may contain multiple channels 122, each configured to comprise a flow path 106. The fluidic medium 180 can access the channel 122 via the inlet port 107. In some instances, the microfluidic circuit 120 comprises a plurality of parallel channels 122 and flow paths 106, wherein the fluidic medium 180 within each flow path 106 flows in the same direction. In some instances, the fluidic medium within each flow path 106 flows in at least one of a forward or reverse direction. In some instances, a plurality of sequestration pens is configured (e.g., relative to a channel 122) such that the sequestration pens can be loaded with target micro-objects in parallel.

The microfluidic circuit 120 further comprises one or more micro-object traps 132. The traps 132 are generally formed in a wall forming the boundary of a channel 122, and may be positioned opposite an opening of one or more of the microfluidic sequestration pens 124, 126, 128, 130. In some embodiments, the traps 132 are configured to receive or capture a single micro-object from the flow path 106. In some embodiments, the traps 132 are configured to receive or capture a plurality of micro-objects from the flow path 106. In some instances, the traps 132 comprise a volume approximately equal to the volume of a single target micro-object.

The traps 132 may further comprise an opening that is configured to assist the flow of targeted micro-objects into the traps 132. In some instances, the traps 132 comprise an opening having a height and width that is approximately equal to the dimensions of a single target micro-object, whereby larger micro-objects are prevented from entering into the micro-object trap. The traps 132 may further comprise other features configured to assist in retention of targeted micro-objects within the trap 132. In some instances, the trap 132 is aligned with and situated on the opposite side of a channel 122 relative to the opening of a microfluidic sequestration pen, such that upon tilting the microfluidic device 100 about an axis parallel to the microfluidic channel 122, the trapped micro-object exits the trap 132 at a trajectory that causes the micro-object to fall into the opening of the sequestration pen. In some instances, the trap 132 comprises a side passage 134 that is smaller than the target micro-object in order to facilitate flow through the trap 132 and thereby increase the likelihood of capturing a micro-object in the trap 132.

Figure 2A:
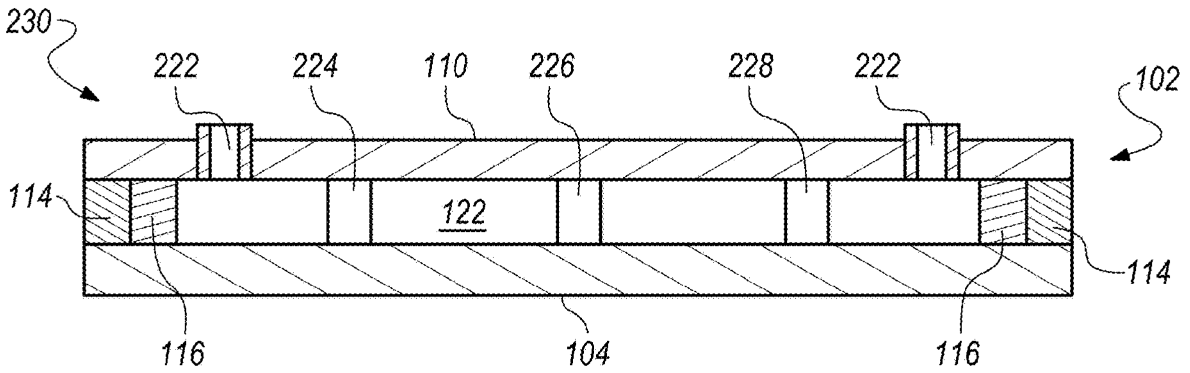
FIGS. 2A-2C are various views of another microfluidic device constructed in accordance with an embodiment of the present invention.
Figure 2B:
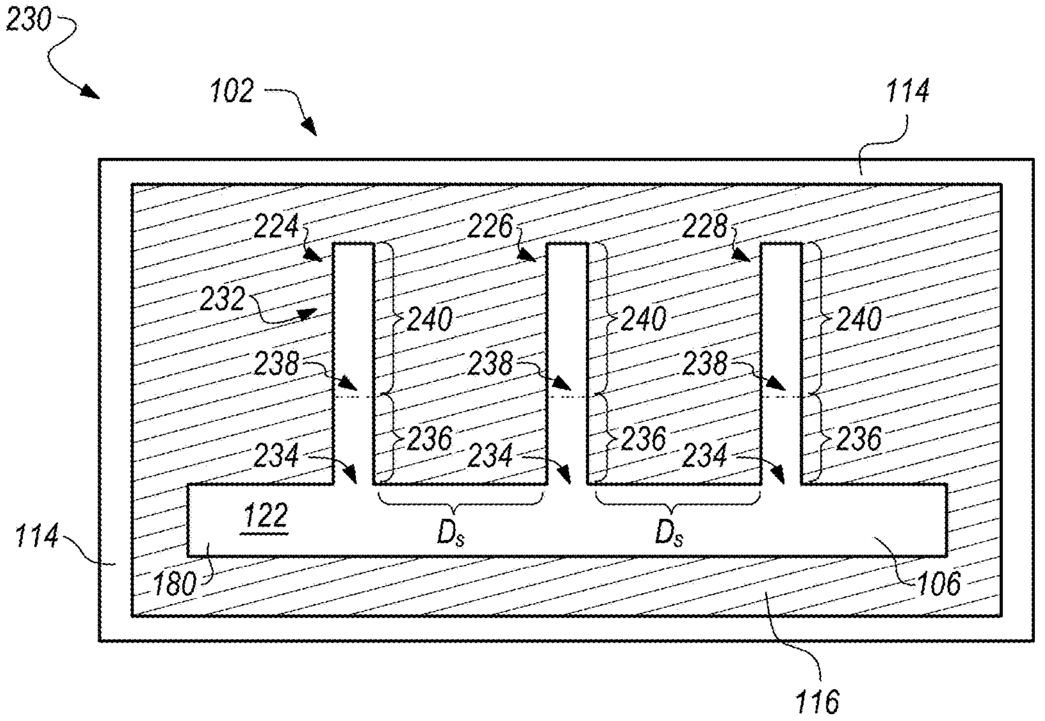
Figure 2C:
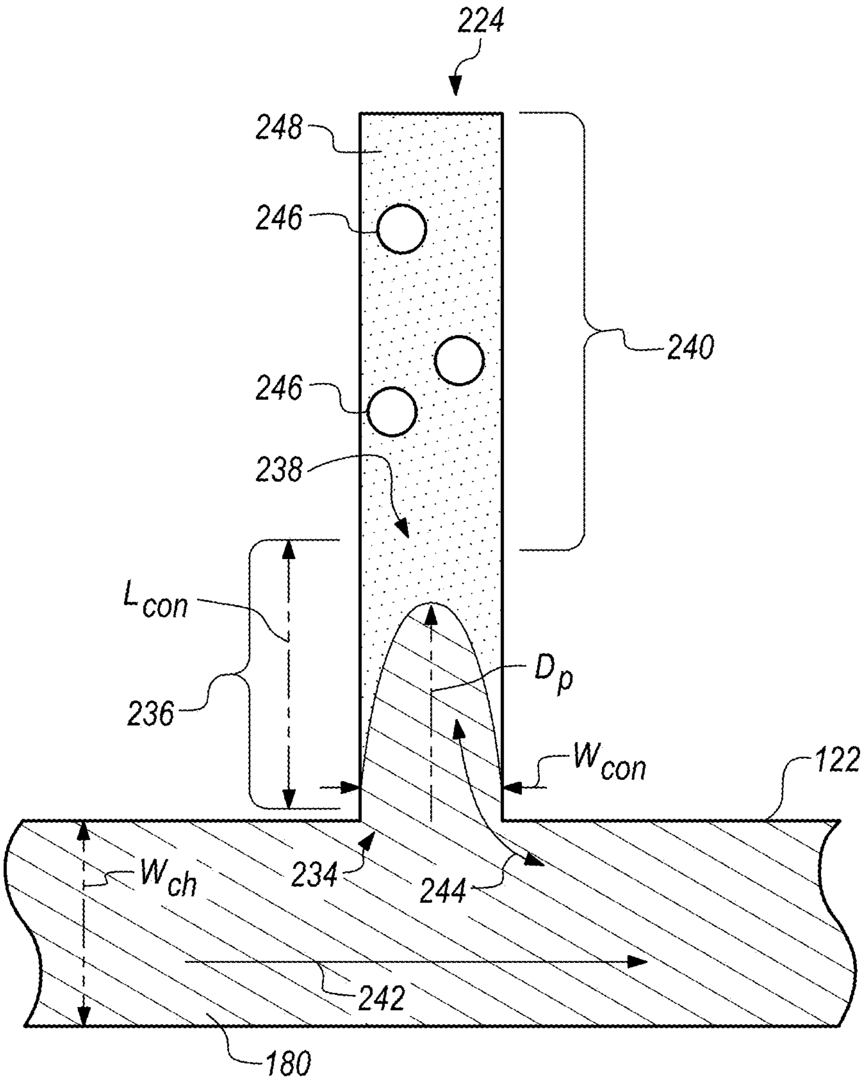

Referring now to FIGS. 2A-2C, one embodiment of a microfluidic device 230, which is a variation of the microfluidic device 100 illustrated in FIG. 1, comprises non-limiting examples of generic sequestration pens 224, 226, and 228. Each sequestration pen 224, 226, and 228 can comprise an isolation structure 232 defining an isolation region 240 and a connection region 236 fluidically connecting the isolation region 240 to a channel 122. The connection region 236 can comprise a proximal opening 234 to the microfluidic channel 122 and a distal opening 238 to the isolation region 240. The connection region 236 can be configured so that the maximum penetration depth (shown as Dp in FIG. 2C) of a flow of a fluidic medium (shown as 180 in FIG. 2C) flowing from the microfluidic channel 122 into the sequestration pen 224, 226, 228 does not extend into the isolation region 240. Thus, due to the connection region 236, a micro-object (not shown) or other material (not shown) disposed in an isolation region 240 of a sequestration pen 224, 226, 228 can thus be isolated from, and not substantially affected by, a flow of medium 180 in the microfluidic channel 122.

Each of the sequestration pens 224, 226, and 228 of FIGS. 2A-2C has a single opening that opens directly to the microfluidic channel 122. The opening of the sequestration pen opens laterally from the microfluidic channel 122. The support structure 104 underlays both the microfluidic channel 122 and the sequestration pens 224, 226, and 228. The upper surface of the electrode activation substrate within the enclosure of a sequestration pen, forming the floor of the sequestration pen, is disposed at the same level or substantially the same level of the upper surface of the support structure 104 within the microfluidic channel 122 (or flow region if a channel is not present), forming the floor of the flow channel (or flow region, respectively) of the microfluidic device 230. The support structure 104 may be featureless or may have an irregular or patterned surface that varies from its highest elevation to its lowest depression by less than about 3 microns, 2.5 microns, 2 microns, 1.5 microns, 1 micron, 0.9 microns, 0.5 microns, 0.4 microns, 0.2 microns, 0.1 microns or less. The variation of elevation in the upper surface of the support structure 104 across both the microfluidic channel 122 (or flow region) and sequestration pens 224, 226, and 228 may be less than about 3%, 2%, 1%. 0.9%, 0.8%, 0.5%, 0.3% or 0.1% of the height of the walls of the sequestration pens 224, 226, 228 or walls of the microfluidic device 230.

The microfluidic channel 122 can thus be an example of a swept region, and the isolation regions 240 of the sequestration pens 224, 226, 228 can be examples of unswept regions. As noted, the microfluidic channel 122 and sequestration pens 224, 226, 228 can be configured to contain one or more fluidic media 180. In the example shown in FIGS. 2A-2B, the ports 222 are connected to the microfluidic channel 122 and allow a fluidic medium 180 to be introduced into or removed from the microfluidic device 230. Prior to introduction of the fluidic medium 180, the microfluidic device may be primed with a gas such as carbon dioxide gas. Once the microfluidic device 230 contains the fluidic medium 180, the flow 242 of fluidic medium 180 in the microfluidic channel 122 can be selectively generated and stopped. For example, as shown, the ports 222 can be disposed at different locations (e.g., opposite ends) of the microfluidic channel 122, and a flow 242 of medium can be created from one port 222 functioning as an inlet to another port 222 functioning as an outlet.

Referring specifically to FIG. 2C, as is known, a flow 242 of fluidic medium 180 in a microfluidic channel 122 past a proximal opening 234 of sequestration pen 224 can cause a secondary flow 244 of the medium 180 into and/or out of the sequestration pen 224. To isolate micro-objects 246 in the isolation region 240 of a sequestration pen 224 from the secondary flow 244, the length $L_{con}$ of the connection region 236 of the sequestration pen 224 (i.e., from the proximal opening 234 to the distal opening 238) should be greater than the penetration depth $D_p$ of the secondary flow 244 into the connection region 236. The penetration depth $D_p$ of the secondary flow 244 increases upon the velocity of the fluidic medium 180 flowing in the microfluidic channel 122 and various parameters relating to the configuration of the microfluidic channel 122 and the proximal opening 234 of the connection region 236 to the microfluidic channel 122. For a given microfluidic device, the configurations of the microfluidic channel 122 and the opening 234 will be fixed, whereas the rate of flow 242 of fluidic medium 180 in the microfluidic channel 122 will be variable. Accordingly, for each sequestration pen 224, a maximal velocity $V_{max}$ for the flow 242 of fluidic medium 180 in channel 122 can be identified that ensures that the penetration depth $D_p$ of the secondary flow 244 does not exceed the length $L_{con}$ of the connection region 236. As long as the rate of the flow 242 of fluidic medium 180 in the microfluidic channel 122 does not exceed the maximum velocity $V_{ma}$, the resulting secondary flow 244 can be limited to the microfluidic channel 122 and the connection region 236 and kept out of the isolation region 240. The flow 242 of medium 180 in the microfluidic channel 122 will thus not draw micro-objects 246 out of the isolation region 240. Rather, micro-objects 246 located in the isolation region 240 will stay in the isolation region 240 so long as the flow 242 of fluidic medium 180 in the microfluidic channel 122 does not exceed the maximum velocity V.

Moreover, as long as the rate of flow 242 of medium 180 in the microfluidic channel 122 does not exceed $V_{max}$, the flow 242 of fluidic medium 180 in the microfluidic channel 122 will not move miscellaneous particles (e.g., microparticles and/or nanoparticles) from the microfluidic channel 122 into the isolation region 240 of a sequestration pen 224. Having the length $L_{con}$ of the connection region 236 be greater than the maximum penetration depth $D_p$ of the secondary flow 244 can thus prevent contamination of one sequestration pen 224 with miscellaneous particles from the microfluidic channel 122 or another sequestration pen (e.g., sequestration pens 226, 228 in FIG. 2D).

Because the microfluidic channel 122 and the connection regions 236 of the sequestration pens 224, 226, 228 can be affected by the flow 242 of medium 180 in the microfluidic channel 122, the microfluidic channel 122 and connection regions 236 can be deemed swept (or flow) regions of the microfluidic device 230. The isolation regions 240 of the sequestration pens 224, 226, 228, on the other hand, can be deemed unswept (or non-flow) regions. For example, components (not shown) in a first fluidic medium 180 in the microfluidic channel 122 can mix with a second fluidic medium 248 in the isolation region 240 substantially only by diffusion of components of the first medium 180 from the microfluidic channel 122 through the connection region 236 and into the second fluidic medium 248 in the isolation region 240. Similarly, components (not shown) of the second medium 248 in the isolation region 240 can mix with the first medium 180 in the microfluidic channel 122 substantially only by diffusion of components of the second medium 248 from the isolation region 240 through the connection region 236 and into the first medium 180 in the microfluidic channel 122. In some embodiments, the extent of fluidic medium exchange between the isolation region of a sequestration pen and the flow region by diffusion is greater than about 90%, 91%, 92%, 93%, 94% 95%, 96%, 97%, 98%, or greater than about 99% of fluidic exchange. The first medium 180 can be the same medium or a different medium than the second medium 248. Moreover, the first medium 180 and the second medium 248 can start out being the same, then become different (e.g., through conditioning of the second medium 248 by one or more cells in the isolation region 240, or by changing the medium 180 flowing through the microfluidic channel 122).

The maximum penetration depth $D_p$ of the secondary flow 244 caused by the flow 242 of fluidic medium 180 in the microfluidic channel 122 can depend on a number of parameters, as mentioned above. Examples of such parameters include: the shape of the microfluidic channel 122 (e.g., the microfluidic channel can direct medium into the connection region 236, divert medium away from the connection region 236, or direct medium in a direction substantially perpendicular to the proximal opening 234 of the connection region 236 to the microfluidic channel 122); a width $W_{ch}$ (or cross-sectional area) of the microfluidic channel 122 at the proximal opening 234; and a width $W_{con}$ (or cross-sectional area) of the connection region 236 at the proximal opening 234; the velocity V of the flow 242 of fluidic medium 180 in the microfluidic channel 122; the viscosity of the first medium 180 and/or the second medium 248, or the like.

In some embodiments, the dimensions of the microfluidic channel 122 and sequestration pens 224, 226, 228 can be oriented as follows with respect to the vector of the flow 242 of fluidic medium 180 in the microfluidic channel 122: the microfluidic channel width $W_{ch}$ (or cross-sectional area of the microfluidic channel 122) can be substantially perpendicular to the flow 242 of medium 180; the width $W_{con}$ (or cross-sectional area) of the connection region 236 at opening 234 can be substantially parallel to the flow 242 of medium 180 in the microfluidic channel 122; and/or the length $L_{con}$ of the connection region can be substantially perpendicular to the flow 242 of medium 180 in the microfluidic channel 122. The foregoing are examples only, and the relative position of the microfluidic channel 122 and sequestration pens 224, 226, 228 can be in other orientations with respect to each other.

As illustrated in FIG. 2C, the width $W_{con}$ of the connection region 236 can be uniform from the proximal opening 234 to the distal opening 238. The width $W_{con}$ of the connection region 236 at the distal opening 238 can thus be any of the values identified herein for the width $W_{con}$ of the connection region 236 at the proximal opening 234. Alternatively, the width $W_{con}$ of the connection region 236 at the distal opening 238 can be larger than the width $W_{con}$ of the connection region 236 at the proximal opening 234. Furthermore, the width of the isolation region 240 at the distal opening 238 can be substantially the same as the width $W_{con}$ of the connection region 236 at the proximal opening 234. The width of the isolation region 240 at the distal opening 238 can thus be any of the values identified herein for the width $W_{con}$ of the connection region 236 at the proximal opening 234. Alternatively, the width of the isolation region 240 at the distal opening 238 can be larger or smaller than the width $W_{con}$ of the connection region 236 at the proximal opening 234. Moreover, the distal opening 238 may be smaller than the proximal opening 234 and the width $W_{con}$ of the connection region 236 may be narrowed between the proximal opening 234 and distal opening 238. For example, the connection region 236 may be narrowed between the proximal opening and the distal opening, using a variety of different geometries (e.g. chamfering the connection region, beveling the connection region). Further, any part or subpart of the connection region 236 may be narrowed (e.g. a portion of the connection region adjacent to the proximal opening 234).

Figure 2D:
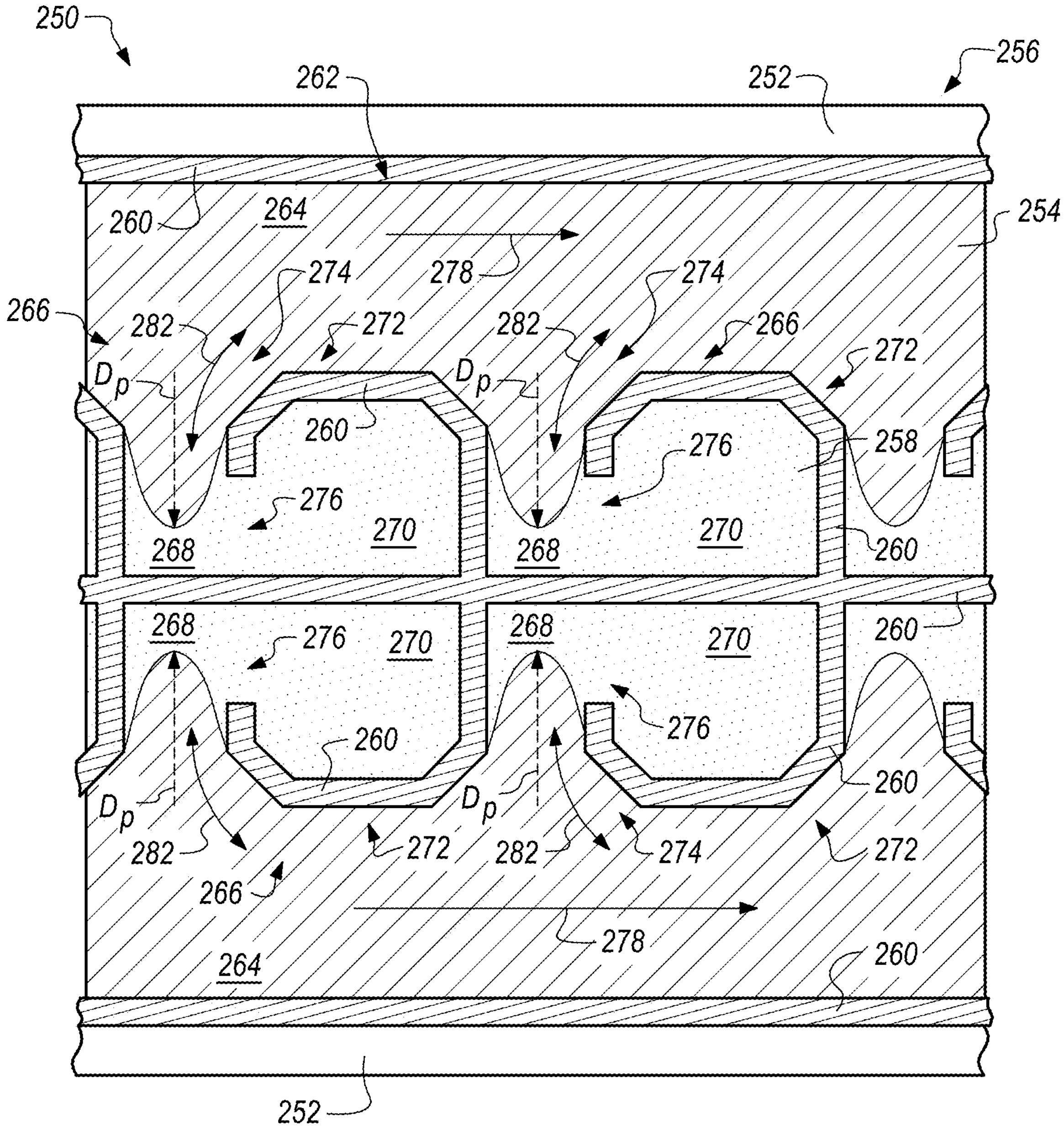
FIGS. 2D-2F are various views of still another microfluidic device constructed in accordance with an embodiment of the present invention.
Figure 2E:
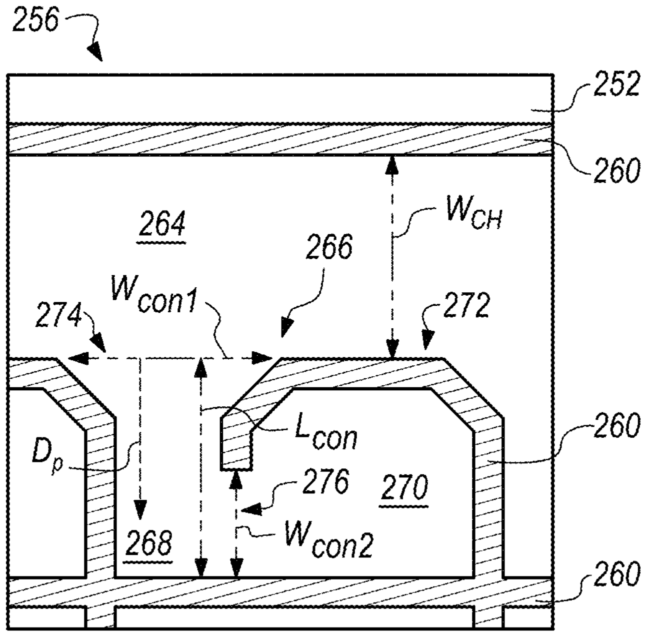
Figure 2F:
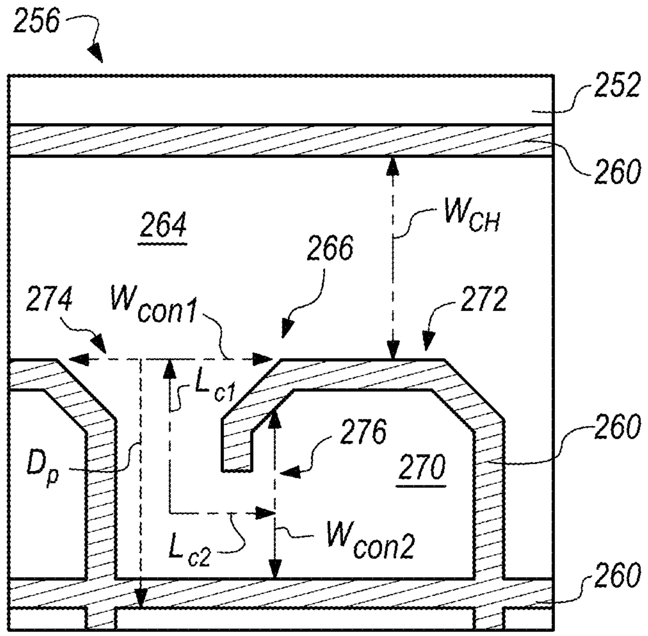

Referring to FIGS. 2D-2F, another embodiment of a microfluidic device 250, which is a variation of the microfluidic device 100, comprises a microfluidic circuit 262 and flow channels 264, which are variations of the respective microfluidic circuit 120 and channel 122 of FIG. 1. The microfluidic device 250 also has a plurality of sequestration pens 266, which are additional variations of the above-described sequestration pens 124, 126, 128, 130, 224, 226, 228. The microfluidic device 250 comprises a support structure (not visible in FIGS. 2D-2F, but can be the same or generally similar to the support structure 104 of the microfluidic device 100 depicted in FIG. 1), a microfluidic circuit structure 256, and a cover (not visible in FIGS. 2D-2F, but can be the same or generally similar to the cover 110 of the microfluidic device 100 depicted in FIG. 1). The microfluidic circuit structure 256 includes a frame 252 and microfluidic circuit material 260, which can be the same as or generally similar to the frame 114 and microfluidic circuit material 116 of the microfluidic device 100 shown in FIG. 1. As shown in FIG. 2D, the microfluidic circuit 262 defined by the microfluidic circuit material 260 can comprise multiple channels 264 (two are shown but there can be more) to which multiple sequestration pens 266 are fluidically connected.

Each sequestration pen 266 can comprise an isolation structure 272, an isolation region 270 within the isolation structure 272, and a connection region 268. From a proximal opening 274 at the microfluidic channel 264 to a distal opening 276 at the isolation structure 272, the connection region 268 fluidically connects the microfluidic channel 264 to the isolation region 270. Generally, in accordance with the above discussion of FIGS. 2B and 2C, a flow 278 of a first fluidic medium 254 in a channel 264 can create secondary flows 282 of the first medium 254 from the microfluidic channel 264 into and/or out of the respective connection regions 268 of the sequestration pens 266.

As illustrated in FIG. 2E, the connection region 268 of each sequestration pen 266 generally includes the area extending between the proximal opening 274 to a channel 264 and the distal opening 276 to an isolation structure 272. The length $L_{con}$ of the connection region 268 can be greater than the maximum penetration depth $D_p$ of secondary flow 282, in which case the secondary flow 282 will extend into the connection region 268 without being redirected toward the isolation region 270 (as shown in FIG. 2D). Alternatively, as illustrated in FIG. 2F, the connection region 268 can have a length $L_{con}$ that is less than the maximum penetration depth $D_p$, in which case the secondary flow 282 will extend through the connection region 268 and be redirected toward the isolation region 270. In this latter situation, the sum of lengths $L_{c1}$ and $L_{c2}$ of connection region 268 is greater than the maximum penetration depth $D_p$, so that the secondary flow 282 will not extend into isolation region 270. Whether the length $L_{con}$ of connection region 268 is greater than the penetration depth $D_p$, or the sum of the lengths $L_{c1}$ and $L_{c2}$ of connection region 268 is greater than the penetration depth $D_p$, a flow 278 of a first medium 254 in the channel 264 that does not exceed a maximum velocity $V_{max}$ will produce a secondary flow having a penetration depth $D_p$, and micro-objects (not shown but can be the same or generally similar to the micro-objects 246 shown in FIG. 2C) in the isolation region 270 of a sequestration pen 266 will not be drawn out of the isolation region 270 by a flow 278 of the first medium 254 in the channel 264. Nor will the flow 278 in the channel 264 draw miscellaneous materials (not shown) from the channel 264 into the isolation region 270 of a sequestration pen 266. As such, diffusion is the only mechanism by which components in a first medium 254 in the microfluidic channel 264 can move from the microfluidic channel 264 into a second medium 258 in an isolation region 270 of a sequestration pen 266. Likewise, diffusion is the only mechanism by which components in a second medium 258 in an isolation region 270 of a sequestration pen 266 can move from the isolation region 270 to a first medium 254 in the microfluidic channel 264. The first medium 254 can be the same medium as the second medium 258, or the first medium 254 can be a different medium than the second medium 258. Alternatively, the first medium 254 and the second medium 258 can start out being the same, then become different, e.g., through conditioning of the second medium by one or more cells in the isolation region 270, or by changing the medium flowing through the microfluidic channel 264.

As illustrated in FIG. 2E, the width $W_{ch}$ of the microfluidic channels 264 (i.e., taken transverse to the direction of a fluidic medium flow through the microfluidic channel indicated by arrows 278 in FIG. 2D) in the microfluidic channel 264 can be substantially perpendicular to a width $W_{con1}$ of the proximal opening 274, and thus, substantially parallel to a width $W_{con2}$ of the distal opening 276. The width $W_{con1}$ of the proximal opening 274 and the width $W_{con2}$ of the distal opening 276, however, need not be substantially perpendicular to each other. For example, an angle between an axis (not shown) on which the width $W_{con1}$ of the proximal opening 274 is oriented and another axis on which the width $W_{con2}$ of the distal opening 276 is oriented can be other than perpendicular and thus other than 90°. Examples of alternatively oriented angles include angles of: about 30° to about 90°, about 45° to about 90°, about 60° to about 90°, or the like.

In various embodiments of sequestration pens (e.g. 124, 126, 128, 130, 224, 226, 228, or 266), the isolation region (e.g. 240 or 270) is configured to contain a plurality of micro-objects. In other embodiments, the isolation region can be configured to contain only one, two, three, four, five, or a similar relatively small number of micro-objects. Accordingly, the volume of an isolation region can be, for example, at least $1\times10^6$, $2\times10^6$, $4\times10^6$, $6\times10^6$ cubic microns, or more.

In various embodiments of sequestration pens (e.g. 124, 126, 128, 130, 224, 226, 228, or 266), the width $W_{ch}$ of the microfluidic channel (e.g., 122) at a proximal opening (e.g. 234) can be about 50-1000 microns, 50-500 microns, 50-400 microns, 50-300 microns, 50-250 microns, 50-200 microns, 50-150 microns, 50-100 microns, 70-500 microns, 70-400 microns, 70-300 microns, 70-250 microns, 70-200 microns, 70-150 microns, 90-400 microns, 90-300 microns, 90-250 microns, 90-200 microns, 90-150 microns, 100-300 microns, 100-250 microns, 100-200 microns, 100-150 microns, or 100-120 microns. In other embodiments, the width $W_{ch}$ of the microfluidic channel (e.g., 122) at a proximal opening (e.g. 234) can be about 200-800 microns, 200-700 microns, or 200-600 microns. The foregoing are examples only, and the width $W_{ch}$ of the microfluidic channel 122 can be any width within any of the endpoints listed above. Moreover, the $W_{ch}$ of the microfluidic channel 122 can be selected to be in any of these widths in regions of the microfluidic channel other than at a proximal opening of a sequestration pen.

In some embodiments, a sequestration pen has a height of about 30 to about 200 microns, or about 50 to about 150 microns. In some embodiments, the sequestration pen has a cross-sectional area of about $1\times10^4$-$3\times10^6$ square microns, $2\times10^4$-$2\times10^6$ square microns, $4\times10^4$-$1\times10^6$ square microns, $2\times10^4$-$5\times10^5$ square microns, $2\times10^4$-$1\times10^5$ square microns or about $2\times10^5$-$2\times10^6$ square microns.

In various embodiments of sequestration pens, the height $H_{ch}$ of the microfluidic channel (e.g., 122) at a proximal opening (e.g., 234) can be a height within any of the following ranges: 20-100 microns, 20-90 microns, 20-80 microns, 20-70 microns, 20-60 microns, 20-50 microns, 30-100 microns, 30-90 microns, 30-80 microns, 30-70 microns, 30-60 microns, 30-50 microns, 40-100 microns, 40-90 microns, 40-80 microns, 40-70 microns, 40-60 microns, or 40-50 microns. The foregoing are examples only, and the height $H_{ch}$ of the microfluidic channel (e.g., 122) can be a height within any of the endpoints listed above. The height $H_{ch}$ of the microfluidic channel 122 can be selected to be in any of these heights in regions of the microfluidic channel other than at a proximal opening of a sequestration pen.

In various embodiments of sequestration pens a cross-sectional area of the microfluidic channel (e.g., 122) at a proximal opening (e.g., 234) can be about 500-50,000 square microns, 500-40,000 square microns, 500-30,000 square microns, 500-25,000 square microns, 500-20,000 square microns, 500-15,000 square microns, 500-10,000 square microns, 500-7,500 square microns, 500-5,000 square microns, 1,000-25,000 square microns, 1,000-20,000 square microns, 1,000-15,000 square microns, 1,000-10,000 square microns, 1,000-7,500 square microns, 1,000-5,000 square microns, 2,000-20,000 square microns, 2,000-15,000 square microns, 2,000-10,000 square microns, 2,000-7,500 square microns, 2,000-6,000 square microns, 3,000-20,000 square microns, 3,000-15,000 square microns, 3,000-10,000 square microns, 3,000-7,500 square microns, or 3,000 to 6,000 square microns. The foregoing are examples only, and the cross-sectional area of the microfluidic channel (e.g., 122) at a proximal opening (e.g., 234) can be any area within any of the endpoints listed above.

In various embodiments of sequestration pens, the length $L_{con}$ of the connection region (e.g., 236) can be about 1-600 microns, 5-550 microns, 10-500 microns, 15-400 microns, 20-300 microns, 20-500 microns, 40-400 microns, 60-300 microns, 80-200 microns, or about 100-150 microns. The foregoing are examples only, and length $L_{con}$ of a connection region (e.g., 236) can be in any length within any of the endpoints listed above.

In various embodiments of sequestration pens the width $W_{con}$ of a connection region (e.g., 236) at a proximal opening (e.g., 234) can be about 20-500 microns, 20-400 microns, 20-300 microns, 20-200 microns, 20-150 microns, 20-100 microns, 20-80 microns, 20-60 microns, 30-400 microns, 30-300 microns, 30-200 microns, 30-150 microns, 30-100 microns, 30-80 microns, 30-60 microns, 40-300 microns, 40-200 microns, 40-150 microns, 40-100 microns, 40-80 microns, 40-60 microns, 50-250 microns, 50-200 microns, 50-150 microns, 50-100 microns, 50-80 microns, 60-200 microns, 60-150 microns, 60-100 microns, 60-80 microns, 70-150 microns, 70-100 microns, or 80-100 microns. The foregoing are examples only, and the width $W_{con}$ of a connection region (e.g., 236) at a proximal opening (e.g., 234) can be different than the foregoing examples (e.g., any value within any of the endpoints listed above).

In various embodiments of sequestration pens, the width $W_{con}$ of a connection region (e.g., 236) at a proximal opening (e.g., 234) can be at least as large as the largest dimension of a micro-object (e.g., a biological cell which may be a T cell, B cell, or other cell type) that the sequestration pen is intended for. The foregoing are examples only, and the width $W_{con}$ of a connection region (e.g., 236) at a proximal opening (e.g., 234) can be different than the foregoing examples (e.g., a width within any of the endpoints listed above).

In various embodiments of sequestration pens, the width $W_{pr}$ of a proximal opening of a connection region may be at least as large as the largest dimension of a micro-object (e.g., a biological micro-object such as a cell) that the sequestration pen is intended for. For example, the width $W_{pr}$ may be about 50 microns, about 60 microns, about 100 microns, about 200 microns, about 300 microns or may be about 50-300 microns, about 50-200 microns, about 50-100 microns, about 75-150 microns, about 75-100 microns, or about 200-300 microns.

In various embodiments of sequestration pens, a ratio of the length $L_{con}$ of a connection region (e.g., 236) to a width $W_{con}$ of the connection region (e.g., 236) at the proximal opening 234 can be greater than or equal to any of the following ratios: 0.5, 1.0, 1.5, 2.0, 2.5, 3.0, 3.5, 4.0, 4.5, 5.0, 6.0, 7.0, 8.0, 9.0, 10.0, or more. The foregoing are examples only, and the ratio of the length $L_{con}$ of a connection region 236 to a width $W_{con}$ of the connection region 236 at the proximal opening 234 can be different than the foregoing examples.

In various embodiments of the disclosed and described microfluidic devices, including without limitation, device 100, 230, 250, 280, 290 and 300, $V_{max}$ can be set around 0.2, 0.5, 0.7, 1.0, 1.3, 1.5, 2.0, 2.5, 3.0, 3.5, 4.0, 4.5, 5.0, 5.5, 6.0, 6.7, 7.0, 7.5, 8.0, 8.5, 9.0, 10, 11, 12, 13, 14, or 15 microliters/sec.

In various embodiments of microfluidic devices having sequestration pens, the volume of an isolation region (e.g., 240) of a sequestration pen can be, for example, at least $5\times10^5$, $8\times10^5$, $1\times10^6$, $2\times10^6$, $4\times10^6$, $6\times10^6$, $8\times10^6$, $1\times10^7$, $5\times10^7$, $1\times10^8$, $5\times10^8$, or $8\times10^8$ cubic microns, or more. In various embodiments of microfluidic devices having sequestration pens, the volume of a sequestration pen may be about $5\times10^5$, $6\times10^5$, $8\times10^5$, $1\times10^6$, $2\times10^6$, $4\times10^6$, $8\times10^6$, $1\times10^7$, $3\times10^7$, $5\times10^7$, or about $8\times10^7$ cubic microns, or more. In some other embodiments, the volume of a sequestration pen may be about 1 nanoliter to about 50 nanoliters, 2 nanoliters to about 25 nanoliters, 2 nanoliters to about 20 nanoliters, about 2 nanoliters to about 15 nanoliters, or about 2 nanoliters to about 10 nanoliters.

In various embodiments, the microfluidic device has sequestration pens configured as in any of the embodiments discussed herein where the microfluidic device has about 5 to about 10 sequestration pens, about 10 to about 50 sequestration pens, about 100 to about 500 sequestration pens; about 200 to about 1000 sequestration pens, about 500 to about 1500 sequestration pens, about 1000 to about 2000 sequestration pens, about 1000 to about 3500 sequestration pens, about 3000 to about 7000 sequestration pens, about 5000 to about 10,000 sequestration pens, about 9,000 to about 15,000 sequestration pens, or about 12,000 to about 20,000 sequestration pens. The sequestration pens need not all be the same size and may include a variety of configurations (e.g., different widths, different features within the sequestration pen).

Figure 2G:
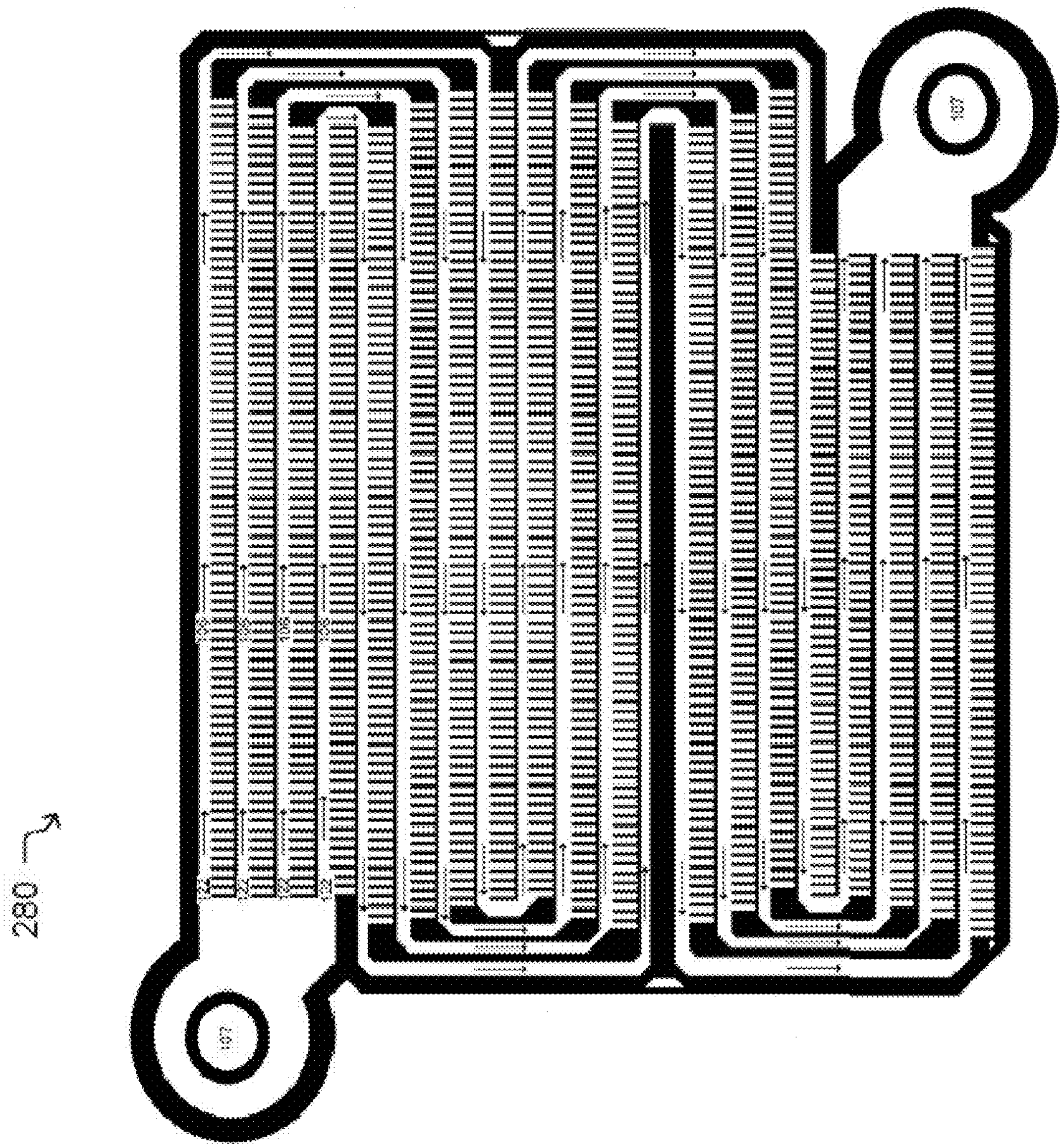
FIG. 2G is a plan view of yet another microfluidic device constructed in accordance with an embodiment of the present invention.

Referring to FIG. 2G, another embodiment of a microfluidic device 280, which is a variation of the microfluidic device 100 of FIG. 1. The microfluidic circuit of the microfluidic device 280 comprises two ports 107, four distinct channels 122, and four distinct flow paths 106. The microfluidic device 280 further comprises a plurality of sequestration pens opening off of each channel 122. In the microfluidic device 280 illustrated in FIG. 2G, the sequestration pens have a geometry similar to the pens illustrated in FIG. 2C, and thus, have both connection regions and isolation regions. Accordingly, the microfluidic circuit 120 includes both swept regions (e.g. channels 122 and portions of the connection regions 236 within the maximum penetration depth $D_p$ of the secondary flow 244) and non-swept regions (e.g. isolation regions 240 and portions of the connection regions 236 not within the maximum penetration depth $D_p$ of the secondary flow 244).

Without intending to be limited by theory, maintenance of the biological micro-object (e.g., a biological cell) 246 within the microfluidic device 100 (or variations thereof, e.g., the microfluidic devices 230, 250, and 280) may be facilitated (i.e., the biological micro-object exhibits increased viability, greater expansion and/or greater portability within the microfluidic device 100) when at least one or more inner surfaces of the microfluidic device 100 have been conditioned or coated so as to present a layer of organic and/or hydrophilic molecules that provides the primary interface between the microfluidic device 100 and biological micro-object(s) 246 maintained therein. In some embodiments, one or more of the inner surfaces of the microfluidic device 100 (e.g. the inner surface of the support structure 104 of the microfluidic device 100, the cover 110 of the microfluidic device 10, and/or the surfaces of the microfluidic circuit structure 108) may be treated with or modified by a coating solution and/or coating agent to generate the desired layer of organic and/or hydrophilic molecules.

The coating may be applied before or after introduction of biological micro-object(s) 246, or may be introduced concurrently with the biological micro-object(s) 246. In some embodiments, the biological micro-object(s) 246 may be imported into the microfluidic device 100 in a fluidic medium 180 that includes one or more coating agents. In other embodiments, the inner surface(s) of the microfluidic device 100 are treated or "primed" with a coating solution comprising a coating agent prior to introduction of the biological micro-object(s) 246 into the microfluidic device 100.

In some embodiments, at least one surface of the microfluidic device 100 includes a coating material that provides a layer of organic and/or hydrophilic molecules suitable for maintenance and/or expansion of biological micro-object(s) 246 (e.g. provides a conditioned surface as described below). In some embodiments, substantially all the inner surfaces of the microfluidic device 100 include the coating material. The coated inner surface(s) may include the surface of a flow path 106 (e.g., channel 122), sequestration pen 124, 126, 128, 130 (or sequestration pens 224, 226, 228, 266), or a combination thereof. In some embodiments, each of a plurality of sequestration pens 124, 126, 128, 130 has at least one inner surface coated with coating materials. In other embodiments, each of a plurality of flow paths 106 or channels 122 has at least one inner surface coated with coating materials. In some embodiments, at least one inner surface of each of a plurality of sequestration pens 124, 126, 128, 130 and each of a plurality of channels 122 is coated with coating materials.

Any convenient coating agent/coating solution can be used, including but not limited to: serum or serum factors, bovine serum albumin (BSA), polymers, detergents, enzymes, and any combination thereof.

The inner surface of the microfluidic device 100 may include a coating material that comprises a polymer. The polymer may be covalently or non-covalently bound (or may be non-specifically adhered) to the inner surface. The polymer may have a variety of structural motifs, such as found in block polymers (and copolymers), star polymers (star copolymers), and graft or comb polymers (graft copolymers), all of which may be suitable for the methods disclosed herein.

The polymer may include a polymer including alkylene ether moieties. A wide variety of alkylene ether containing polymers may be suitable for use in the microfluidic device 100. One non-limiting exemplary class of alkylene ether containing polymers are amphiphilic nonionic block copolymers which include blocks of polyethylene oxide (PEO) and polypropylene oxide (PPO) subunits in differing ratios and locations within the polymer chain. Pluronic® polymers (BASF) are block copolymers of this type and are known in the art to be suitable for use when in contact with living cells. The polymers may range in average molecular mass $M_w$ from about 2000 Da to about 20 KDa. In some embodiments, the PEO-PPO block copolymer can have a hydrophilic-lipophilic balance (HLB) greater than about 10 (e.g. 12-18). Specific Pluronic® polymers useful for yielding a coated surface include Pluronic® L44, L64, P85, and F127 (including F127NF). Another class of alkylene ether containing polymers is polyethylene glycol (PEG $M_w$<100,000 Da) or alternatively polyethylene oxide (PEO, $M_w$>100,000). In some embodiments, a PEG may have an $M_w$ of about 1000 Da, 5000 Da, 10,000 Da or 20,000 Da.

In other embodiments, the coating material may include a polymer containing carboxylic acid moieties. The carboxylic acid subunit may be an alkyl, alkenyl or aromatic moiety containing subunit. One non-limiting example is polylactic acid (PLA). In other embodiments, the coating material may include a polymer containing phosphate moieties, either at a terminus of the polymer backbone or pendant from the backbone of the polymer. In yet other embodiments, the coating material may include a polymer containing sulfonic acid moieties. The sulfonic acid subunit may be an alkyl, alkenyl or aromatic moiety containing subunit. One non-limiting example is polystyrene sulfonic acid (PSSA) or polyanethole sulfonic acid. In further embodiments, the coating material may include a polymer including amine moieties. The polyamino polymer may include a natural polyamine polymer or a synthetic polyamine polymer. Examples of natural polyamines include spermine, spermidine, and putrescine.

In other embodiments, the coating material may include a polymer containing saccharide moieties. In a non-limiting example, polysaccharides such as xanthan gum or dextran may be suitable to form a material which may reduce or prevent cell sticking in the microfluidic device 100. For example, a dextran polymer having a size about 3 kDa may be used to provide a coating material for a surface within the microfluidic device 100.

In other embodiments, the coating material may include a polymer containing nucleotide moieties, i.e. a nucleic acid, which may have ribonucleotide moieties or deoxyribonucleotide moieties, providing a polyelectrolyte surface. The nucleic acid may contain only natural nucleotide moieties or may contain unnatural nucleotide moieties which comprise nucleobase, ribose or phosphate moiety analogs such as 7-deazaadenine, pentose, methyl phosphonate or phosphorothioate moieties without limitation.

In yet other embodiments, the coating material may include a polymer containing amino acid moieties. The polymer containing amino acid moieties may include a natural amino acid containing polymer or an unnatural amino acid containing polymer, either of which may include a peptide, a polypeptide or a protein. In one non-limiting example, the protein may be bovine serum albumin (BSA) and/or serum (or a combination of multiple different sera) comprising albumin and/or one or more other similar proteins as coating agents. The serum can be from any convenient source, including but not limited to fetal calf serum, sheep serum, goat serum, horse serum, and the like. In certain embodiments, BSA in a coating solution is present in a concentration from about 1 mg/mL to about 100 mg/mL, including 5 mg/mL, 10 mg/mL, 20 mg/mL, 30 mg/mL, 40 mg/mL, 50 mg/mL, 60 mg/mL, 70 mg/mL, 80 mg/mL, 90 mg/mL, or more or anywhere in between. In certain embodiments, serum in a coating solution may be present in a concentration of about 20% (v/v) to about 50% v/v, including 25%, 30%, 35%, 40%, 45%, or more or anywhere in between. In some embodiments, BSA may be present as a coating agent in a coating solution at 5 mg/mL, whereas in other embodiments, BSA may be present as a coating agent in a coating solution at 70 mg/mL. In certain embodiments, serum is present as a coating agent in a coating solution at 30%. In some embodiments, an extracellular matrix (ECM) protein may be provided within the coating material for optimized cell adhesion to foster cell growth. A cell matrix protein, which may be included in a coating material, can include, but is not limited to, a collagen, an elastin, an RGD-containing peptide (e.g. a fibronectin), or a laminin. In yet other embodiments, growth factors, cytokines, hormones or other cell signaling species may be provided within the coating material of the microfluidic device.

In some embodiments, the coating material may include a polymer containing more than one of alkylene oxide moieties, carboxylic acid moieties, sulfonic acid moieties, phosphate moieties, saccharide moieties, nucleotide moieties, or amino acid moieties. In other embodiments, the polymer conditioned surface may include a mixture of more than one polymer each having alkylene oxide moieties, carboxylic acid moieties, sulfonic acid moieties, phosphate moieties, saccharide moieties, nucleotide moieties, and/or amino acid moieties, which may be independently or simultaneously incorporated into the coating material.

In some embodiments, the at least one inner surface includes covalently linked molecules that provide a layer of organic and/or hydrophilic molecules suitable for maintenance/expansion of biological micro-object(s) within the microfluidic device 100, providing a conditioned surface for such cells.

In particular embodiments, the covalently linked molecules include a linking group, wherein the linking group is covalently linked to one or more surfaces of the microfluidic device 100, as described below. The linking group is also covalently linked to a moiety configured to provide a layer of organic and/or hydrophilic molecules suitable for maintenance/expansion of biological micro-object(s) 246.

In some embodiments, the covalently linked moiety configured to provide a layer of organic and/or hydrophilic molecules suitable for maintenance/expansion of biological micro-object(s) 246 may include alkyl or fluoroalkyl (which includes perfluoroalkyl) moieties; mono- or polysaccharides (which may include but is not limited to dextran); alcohols (including but not limited to propargyl alcohol); polyalcohols, including but not limited to polyvinyl alcohol; alkylene ethers, including but not limited to polyethylene glycol; polyelectrolytes (including but not limited to polyacrylic acid or polyvinyl phosphonic acid); amino groups (including derivatives thereof, such as, but not limited to alkylated amines, hydroxyalkylated amino group, guanidinium, and heterocylic groups containing an unaromatized nitrogen ring atom, such as, but not limited to morpholinyl or piperazinyl); carboxylic acids including but not limited to propiolic acid (which may provide a carboxylate anionic surface); phosphonic acids, including but not limited to ethynyl phosphonic acid (which may provide a phosphonate anionic surface); sulfonate anions; carboxybetaines; sulfobetaines; sulfamic acids; or amino acids.

In various embodiments, the covalently linked moiety configured to provide a layer of organic and/or hydrophilic molecules suitable for maintenance/expansion of biological micro-object(s) 246 in the microfluidic device 100 may include non-polymeric moieties, such as an alkyl moiety, a substituted alkyl moiety, such as a fluoroalkyl moiety (including but not limited to a perfluoroalkyl moiety), amino acid moiety, alcohol moiety, amino moiety, carboxylic acid moiety, phosphonic acid moiety, sulfonic acid moiety, sulfamic acid moiety, or saccharide moiety. Alternatively, the covalently linked moiety may include polymeric moieties, which may be any of the moieties described above.

In some embodiments, the covalently linked alkyl moiety may comprise carbon atoms forming a linear chain (e.g., a linear chain of at least 10 carbons, or at least 14, 16, 18, 20, 22, or more carbons) and may be an unbranched alkyl moiety. In some embodiments, the alkyl group may include a substituted alkyl group (e.g., some of the carbons in the alkyl group can be fluorinated or perfluorinated). In some embodiments, the alkyl group may include a first segment, which may include a perfluoroalkyl group, joined to a second segment, which may include a non-substituted alkyl group, where the first and second segments may be joined directly or indirectly (e.g., by means of an ether linkage). The first segment of the alkyl group may be located distal to the linking group, and the second segment of the alkyl group may be located proximal to the linking group.

In other embodiments, the covalently linked moiety may include at least one amino acid, which may include more than one type of amino acid. Thus, the covalently linked moiety may include a peptide or a protein. In some embodiments, the covalently linked moiety may include an amino acid which may provide a zwitterionic surface to support cell growth, viability, portability, or any combination thereof.

In other embodiments, the covalently linked moiety may include at least one alkylene oxide moiety and may include any alkylene oxide polymer as described above. One useful class of alkylene ether containing polymers is polyethylene glycol (PEG $M_w$<100,000 Da) or alternatively polyethylene oxide (PEO, $M_w$>100,000). In some embodiments, a PEG may have an $M_w$ of about 1000 Da, 5000 Da, 10,000 Da or 20,000 Da.

The covalently linked moiety may include one or more saccharides. The covalently linked saccharides may be mono-, di-, or polysaccharides. The covalently linked saccharides may be modified to introduce a reactive pairing moiety which permits coupling or elaboration for attachment to the surface. Exemplary reactive pairing moieties may include aldehyde, alkyne or halo moieties. A polysaccharide may be modified in a random fashion, wherein each of the saccharide monomers may be modified or only a portion of the saccharide monomers within the polysaccharide are modified to provide a reactive pairing moiety that may be coupled directly or indirectly to a surface. One exemplar may include a dextran polysaccharide, which may be coupled indirectly to a surface via an unbranched linker.

The covalently linked moiety may include one or more amino groups. The amino group may be a substituted amine moiety, guanidine moiety, nitrogen-containing heterocyclic moiety or heteroaryl moiety. The amino containing moieties may have structures permitting pH modification of the environment within the microfluidic device, and optionally, within the sequestration pens and/or flow regions (e.g., channels).

The coating material providing a conditioned surface may comprise only one kind of covalently linked moiety or may include more than one different kind of covalently linked moiety. For example, the fluoroalkyl conditioned surfaces (including perfluoroalkyl) may have a plurality of covalently linked moieties which are all the same, e.g., having the same linking group and covalent attachment to the surface, the same overall length, and the same number of fluoromethylene units comprising the fluoroalkyl moiety. Alternatively, the coating material may have more than one kind of covalently linked moiety attached to the surface. For example, the coating material may include molecules having covalently linked alkyl or fluoroalkyl moieties having a specified number of methylene or fluoromethylene units and may further include a further set of molecules having charged moieties covalently attached to an alkyl or fluoroalkyl chain having a greater number of methylene or fluoromethylene units, which may provide capacity to present bulkier moieties at the coated surface. In this instance, the first set of molecules having different, less sterically demanding termini and fewer backbone atoms can help to functionalize the entire substrate surface and thereby prevent undesired adhesion or contact with the silicon/silicon oxide, hafnium oxide or alumina making up the substrate itself. In another example, the covalently linked moieties may provide a zwitterionic surface presenting alternating charges in a random fashion on the surface.

Aside from the composition of the conditioned surface, other factors such as physical thickness of the hydrophobic material can impact DEP force. Various factors can alter the physical thickness of the conditioned surface, such as the manner in which the conditioned surface is formed on the support structure 104 (e.g. vapor deposition, liquid phase deposition, spin coating, flooding, and electrostatic coating). In some embodiments, the conditioned surface has a thickness of about 1 nm to about 10 nm; about 1 nm to about 7 nm; about 1 nm to about 5 nm; or any individual value therebetween. In other embodiments, the conditioned surface formed by the covalently linked moieties may have a thickness of about 10 nm to about 50 nm. In various embodiments, the conditioned surface prepared as described herein has a thickness of less than 10 nm. In some embodiments, the covalently linked moieties of the conditioned surface may form a monolayer when covalently linked to the surface of the microfluidic device 100 (e.g., a DEP configured substrate surface) and may have a thickness of less than 10 nm (e.g., less than 5 nm, or about 1.5 to 3.0 nm). These values are in contrast to that of a surface prepared by spin coating, for example, which may typically have a thickness of about 30 nm. In some embodiments, the conditioned surface does not require a perfectly formed monolayer to be suitably functional for operation within the microfluidic device 100.

In various embodiments, the coating material providing a conditioned surface of the microfluidic device 100 may provide desirable electrical properties. Without intending to be limited by theory, one factor that impacts robustness of a surface coated with a particular coating material is intrinsic charge trapping. Different coating materials may trap electrons, which can lead to breakdown of the coating material. Defects in the coating material may increase charge trapping and lead to further breakdown of the coating material. Similarly, different coating materials have different dielectric strengths (i.e. the minimum applied electric field that results in dielectric breakdown), which may impact charge trapping. In certain embodiments, the coating material can have an overall structure (e.g., a densely-packed monolayer structure) that reduces or limits that amount of charge trapping.

In addition to its electrical properties, the conditioned surface may also have properties that are beneficial in use with biological molecules. For example, a conditioned surface that contains fluorinated (or perfluorinated) carbon chains may provide a benefit relative to alkyl-terminated chains in reducing the amount of surface fouling. Surface fouling, as used herein, refers to the amount of indiscriminate material deposition on the surface of the microfluidic device 100, which may include permanent or semi-permanent deposition of biomaterials such as protein and its degradation products, nucleic acids and respective degradation products and the like.

The covalently linked coating material may be formed by reaction of a molecule that already contains the moiety configured to provide a layer of organic and/or hydrophilic molecules suitable for maintenance/expansion of biological micro-object(s) 246 in the microfluidic device 100, as is described below. Alternatively, the covalently linked coating material may be formed in a two-part sequence by coupling the moiety configured to provide a layer of organic and/or hydrophilic molecules suitable for maintenance/expansion of biological micro-object(s) 246 to a surface modifying ligand that itself has been covalently linked to the surface.

In some embodiments, a coating material that is covalently linked to the inner surface of the microfluidic device 100 (e.g., including at least one surface of the sequestration pens 124, 126, 128, 130 and/or flow paths 106) has a structure of Formula 1 or Formula 2. When the coating material is introduced to the surface in one step, it has a structure of Formula 1, while when the coating material is introduced in a multiple step process, it has a structure of Formula 2.

Formula 1

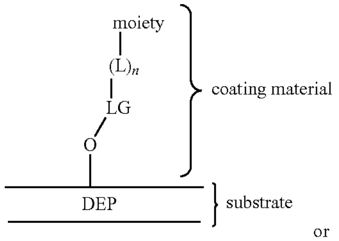

or

Formula 2

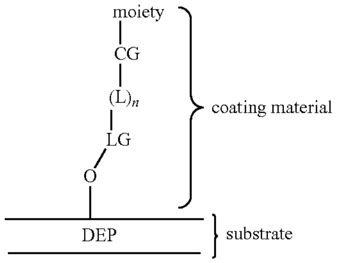

The coating material may be linked covalently to oxides of the surface of support structure 104. The support structure 104 may comprise silicon, silicon oxide, alumina, or hafnium oxide. Oxides may be present as part of the native chemical structure of the substrate or may be introduced as discussed below.

The coating material may be attached to the oxides via a linking group ("LG"), which may be a siloxy or phosphonate ester group formed from the reaction of a siloxane or phosphonic acid group with the oxides. The moiety configured to provide a layer of organic and/or hydrophilic molecules suitable for maintenance/expansion of biological micro-object(s) 246 in the microfluidic device 100 can be any of the moieties described herein. The linking group LG may be directly or indirectly connected to the moiety configured to provide a layer of organic and/or hydrophilic molecules suitable for maintenance/expansion of biological micro-object(s) 246 in the microfluidic device. When the linking group LG is directly connected to the moiety, optional linker ("L") is not present and n is 0. When the linking group LG is indirectly connected to the moiety, linker L is present and n is 1. The linker L may have a linear portion where a backbone of the linear portion may include 1 to 200 non-hydrogen atoms selected from any combination of silicon, carbon, nitrogen, oxygen, sulfur and/or phosphorus atoms, subject to chemical bonding limitations as is known in the art. It may be interrupted with any combination of one or more moieties, which may be chosen from ether, amino, carbonyl, amido, and/or phosphonate groups, arylene, heteroarylene, or heterocyclic groups. In some embodiments, the backbone of the linker L may include 10 to 20 atoms. In other embodiments, the backbone of the linker L may include about 5 atoms to about 200 atoms; about 10 atoms to about 80 atoms; about 10 atoms to about 50 atoms; or about 10 atoms to about 40 atoms. In some embodiments, the backbone atoms are all carbon atoms.

In some embodiments, the moiety configured to provide a layer of organic and/or hydrophilic molecules suitable for maintenance/expansion of biological micro-object(s) may be added to the surface of the substrate in a multi-step process, and has a structure of Formula 2, as shown above. The moiety may be any of the moieties described above.

In some embodiments, the coupling group CG represents the resultant group from reaction of a reactive moiety $R_x$ and a reactive pairing moiety $R_{px}$ (i.e., a moiety configured to react with the reactive moiety $R_x$). For example, one typical coupling group CG may include a carboxamidyl group, which is the result of the reaction of an amino group with a derivative of a carboxylic acid, such as an activated ester, an acid chloride or the like. Other CG may include a triazolylene group, a carboxamidyl, thioamidyl, an oxime, a mercaptyl, a disulfide, an ether, or alkenyl group, or any other suitable group that may be formed upon reaction of a reactive moiety with its respective reactive pairing moiety. The coupling group CG may be located at the second end (i.e., the end proximal to the moiety configured to provide a layer of organic and/or hydrophilic molecules suitable for maintenance/expansion of biological micro-object(s) 246 in the microfluidic device 100) of linker L, which may include any combination of elements as described above. In some other embodiments, the coupling group CG may interrupt the backbone of the linker L. When the coupling group CG is triazolylene, it may be the product resulting from a Click coupling reaction and may be further substituted (e.g., a dibenzocylcooctenyl fused triazolylene group).

In some embodiments, the coating material (or surface modifying ligand) is deposited on the inner surfaces of the microfluidic device 100 using chemical vapor deposition. The vapor deposition process can be optionally improved, for example, by pre-cleaning the cover 110, the microfluidic circuit material 116, and/or the support structure 104, by exposure to a solvent bath, sonication or a combination thereof. Alternatively, or in addition, such pre-cleaning can include treating the cover 110, the microfluidic circuit material 116, and/or the support structure 104 in an oxygen plasma cleaner, which can remove various impurities, while at the same time introducing an oxidized surface (e.g. oxides at the surface, which may be covalently modified as described herein). Alternatively, liquid-phase treatments, such as a mixture of hydrochloric acid and hydrogen peroxide or a mixture of sulfuric acid and hydrogen peroxide (e.g., piranha solution, which may have a ratio of sulfuric acid to hydrogen peroxide from about 3:1 to about 7:1) may be used in place of an oxygen plasma cleaner.

In some embodiments, vapor deposition is used to coat the inner surfaces of the microfluidic device 100 after the microfluidic device 100 has been assembled to form the chamber 102 defining the microfluidic circuit 120. Without intending to be limited by theory, depositing such a coating material on a fully-assembled microfluidic circuit 120 may be beneficial in preventing delamination caused by a weakened bond between the microfluidic circuit material 116 and the support structure 104 dielectric layer and/or the cover 110. In embodiments where a two-step process is employed the surface modifying ligand may be introduced via vapor deposition as described above, with subsequent introduction of the moiety configured provide a layer of organic and/or hydrophilic molecules suitable for maintenance/expansion of biological micro-object(s) 246. The subsequent reaction may be performed by exposing the surface modified microfluidic device 100 to a suitable coupling reagent in solution.

Figure 2H:
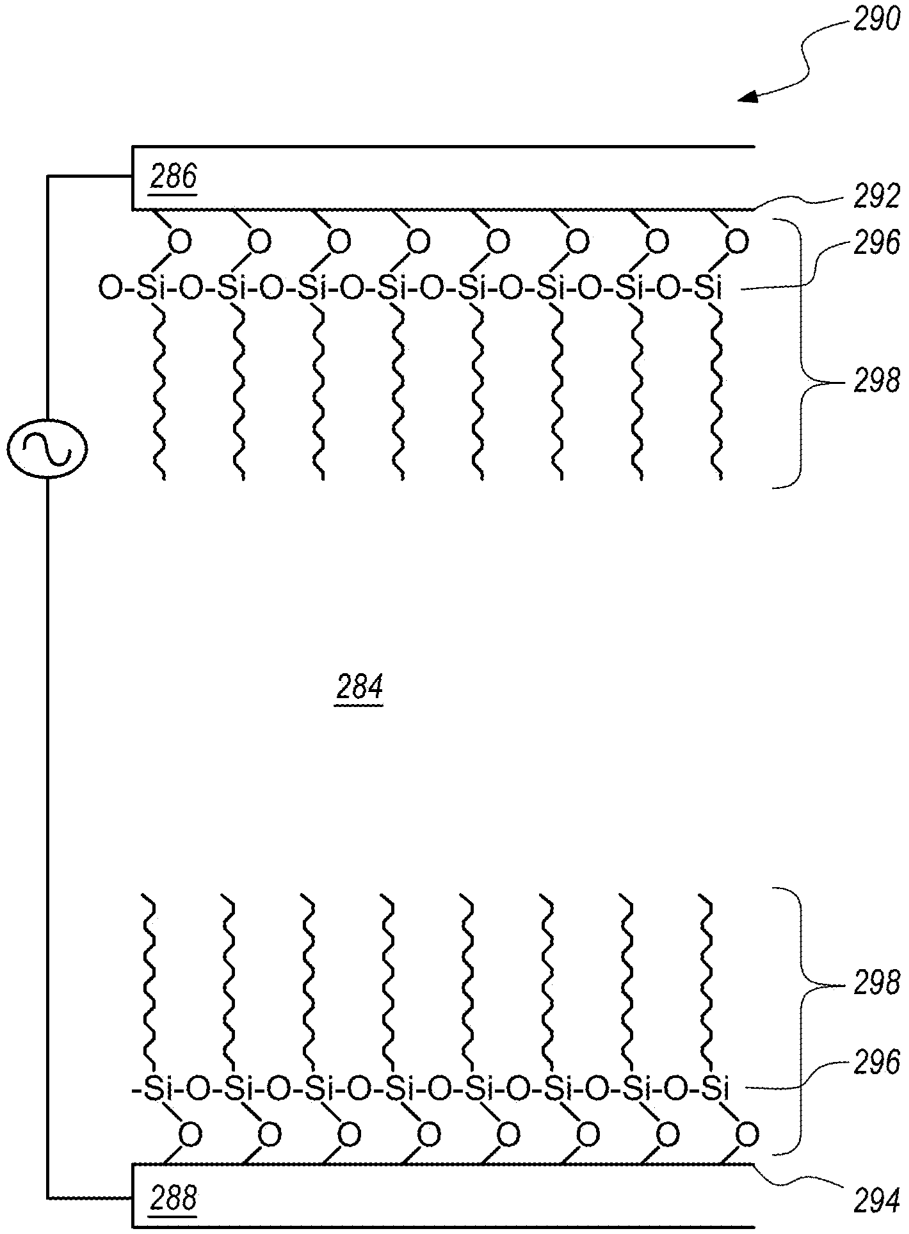
FIG. 2H is a plan view of yet another microfluidic device constructed in accordance with an embodiment of the present invention.

FIG. 2H is a cross-sectional view of a microfluidic device 290 having an exemplary covalently linked coating material providing a conditioned surface. As illustrated, the coating materials 298 (shown schematically) can comprise a monolayer of densely-packed molecules covalently bound to both the inner surface 294 of a base 286, which may be a DEP substrate, and the inner surface 292 of a cover 288 of the microfluidic device 290. The coating material 298 can be disposed on substantially all inner surfaces 294, 292 proximal to, and facing inwards towards, the enclosure 284 of the microfluidic device 290, including, in some embodiments and as discussed above, the surfaces of microfluidic circuit material (not shown) used to define circuit elements and/or structures within the microfluidic device 290. In alternate embodiments, the coating material 298 can be disposed on only one or some of the inner surfaces of the microfluidic device 290.

In the embodiment shown in FIG. 2H, the coating material 298 can include a monolayer of organosiloxane molecules, each molecule covalently bonded to the inner surfaces 292, 294 of the microfluidic device 290 via a siloxy linker 296. Any of the above-discussed coating materials 298 can be used (e.g. an alkyl-terminated, a fluoroalkyl terminated moiety, a PEG-terminated moiety, a dextran terminated moiety, or a terminal moiety containing positive or negative charges for the organosiloxy moieties), where the terminal moiety is disposed at its enclosure-facing terminus (i.e. the portion of the monolayer of the coating material 298 that is not bound to the inner surfaces 292, 294 and is proximal to the enclosure 284).

In other embodiments, the coating material 298 used to coat the inner surface(s) 292, 294 of the microfluidic device 290 can include anionic, cationic, or zwitterionic moieties, or any combination thereof. Without intending to be limited by theory, by presenting cationic moieties, anionic moieties, and/or zwitterionic moieties at the inner surfaces of the enclosure 284 of the microfluidic circuit 120, the coating material 298 can form strong hydrogen bonds with water molecules such that the resulting water of hydration acts as a layer (or "shield") that separates the biological micro-objects from interactions with non-biological molecules (e.g., the silicon and/or silicon oxide of the substrate). In addition, in embodiments in which the coating material 298 is used in conjunction with coating agents, the anions, cations, and/or zwitterions of the coating material 298 can form ionic bonds with the charged portions of non-covalent coating agents (e.g. proteins in solution) that are present in the medium 180 (e.g. a coating solution) in the enclosure 284.

In still other embodiments, the coating material may comprise or be chemically modified to present a hydrophilic coating agent at its enclosure-facing terminus. In some embodiments, the coating material may include an alkylene ether containing polymer, such as PEG. In some embodiments, the coating material may include a polysaccharide, such as dextran. Like the charged moieties discussed above (e.g., anionic, cationic, and zwitterionic moieties), the hydrophilic coating agent can form strong hydrogen bonds with water molecules such that the resulting water of hydration acts as a layer (or "shield") that separates the biological micro-objects from interactions with non-biological molecules (e.g., the silicon and/or silicon oxide of the substrate).

Further details of appropriate coating treatments and modifications may be found at U.S. application Ser. No. 15/135,707, filed on Apr. 22, 2016, and is incorporated by reference in its entirety.

In order to promote growth and/or expansion of cell populations, environmental conditions conducive to maintaining functional cells may be provided by additional components of the system. For example, such additional components can provide nutrients, cell growth signaling species, pH modulation, gas exchange, temperature control, and removal of waste products from cells.

Significantly, the microfluidic device 100 (or variations thereof, e.g., the microfluidic devices 230, 250, 280, and 290) is configured as an optically-actuated electrokinetic device. In particular, dielectrophoretic (DEP) forces are applied across the fluidic medium 180 (e.g., in the flow path 106 and/or in the sequestration pens 124, 126, 128, 130) in the microfluidic device 100 via one or more electrodes (not shown) to manipulate, transport, separate and sort micro-objects located therein. For example, in some embodiments, DEP forces are applied to one or more portions of microfluidic circuit 120 of the microfluidic device 100 in order to transfer a single micro-object from the flow path 106 into a desired one of the microfluidic sequestration pens 124, 126, 128, 130. In some embodiments, DEP forces are used to prevent a micro-object within one of the microfluidic sequestration pens 124, 126, 128, 130. Further, in some embodiments, DEP forces are used to selectively remove a micro-object from one of the microfluidic sequestration pens 124, 126, 128, 130 that was previously collected.

In some embodiments, the DEP forces comprise optoelectronic tweezer (OET) forces. In other embodiments, optoelectrowetting (OEW) forces are applied to one or more positions in the support structure 104 (and/or the cover 110) of the microfluidic device 100 (e.g., positions helping to define the flow path 106 and/or the sequestration pens 124, 126, 128, 130) via one or more electrodes (not shown) to manipulate, transport, separate and sort droplets located in the microfluidic circuit 120. For example, in some embodiments, OEW forces are applied to one or more positions in the support structure 104 (and/or the cover 110) in order to transfer a single droplet from the flow path 106 into a desired microfluidic sequestration pen. In some embodiments, OEW forces are used to prevent a droplet within one of the microfluidic sequestration pens 124, 126, 128, 130 from being displaced therefrom. Further, in some embodiments, OEW forces are used to selectively remove a previously collected droplet from one of the microfluidic sequestration pens 124, 126, 128, 130.

In some embodiments, DEP and/or OEW forces are combined with other forces, such as flow and/or gravitational force, so as to manipulate, transport, separate and sort micro-objects and/or droplets within the microfluidic circuit 120. For example, the chamber 102 can be tilted (e.g., by tilting device 190) to position the flow path 106 and micro-objects located therein above the microfluidic sequestration pens 124, 126, 128, 130, and the force of gravity can transport the micro-objects and/or droplets into the microfluidic sequestration pens 124, 126, 128, 130. In some embodiments, the DEP and/or OEW forces can be applied prior to the other forces. In other embodiments, the DEP and/or OEW forces can be applied after the other forces. In still other instances, the DEP and/or OEW forces can be applied at the same time as the other forces or in an alternating manner with the other forces.

A variety of optically-actuated electrokinetic devices are known in the art, including devices having an optoelectronic tweezer (OET) configuration and devices having an optoelectrowetting (OEW) configuration. Examples of suitable OET configurations are illustrated in U.S. Pat. No. RE 44,711 (originally issued as U.S. Pat. No. 7,612,355), and U.S. Pat. No. 7,956,339, both of which are incorporated by reference in their entirety. Examples of OEW configurations are illustrated in U.S. Pat. No. 6,958,132 and U.S. Patent Publication No. 2012/0024708, both of which are incorporated by reference herein in their entirety. Yet another example of an optically-actuated electrokinetic device includes a combined OET/OEW configuration, examples of which are shown in U.S. Patent Publication Nos. 2015/0306598 and 2015/0306599 and their corresponding PCT Publications WO2015/164846 and WO2015/164847, all of which are incorporated herein by reference in their entirety.

Examples of microfluidic devices having pens in which biological micro-objects can be placed, cultured, and/or monitored have been described, for example, in U.S. Patent Publication No. 2014/0116881, U.S. Patent Publication No. 2015/0151298, and U.S. Patent Publication No. 2015/0165436, each of which is incorporated herein by reference in its entirety. U.S. Patent Publication Nos. 2015/0151298 and 2015/0165436 also describe exemplary methods of analyzing secretions of cells cultured in a microfluidic device. Each of the foregoing applications further describes microfluidic devices configured to produce dielectrophoretic (DEP) forces, such as optoelectronic tweezers (OET) or configured to provide opto-electro wetting (OEW). For example, the optoelectronic tweezers device illustrated in FIG. 2 of U.S. Patent Publication No. 2014/0116881 is an example of a device that can be utilized in embodiments of the present disclosure to select and move an individual biological micro-object or a group of biological micro-objects.

Figure 3A:
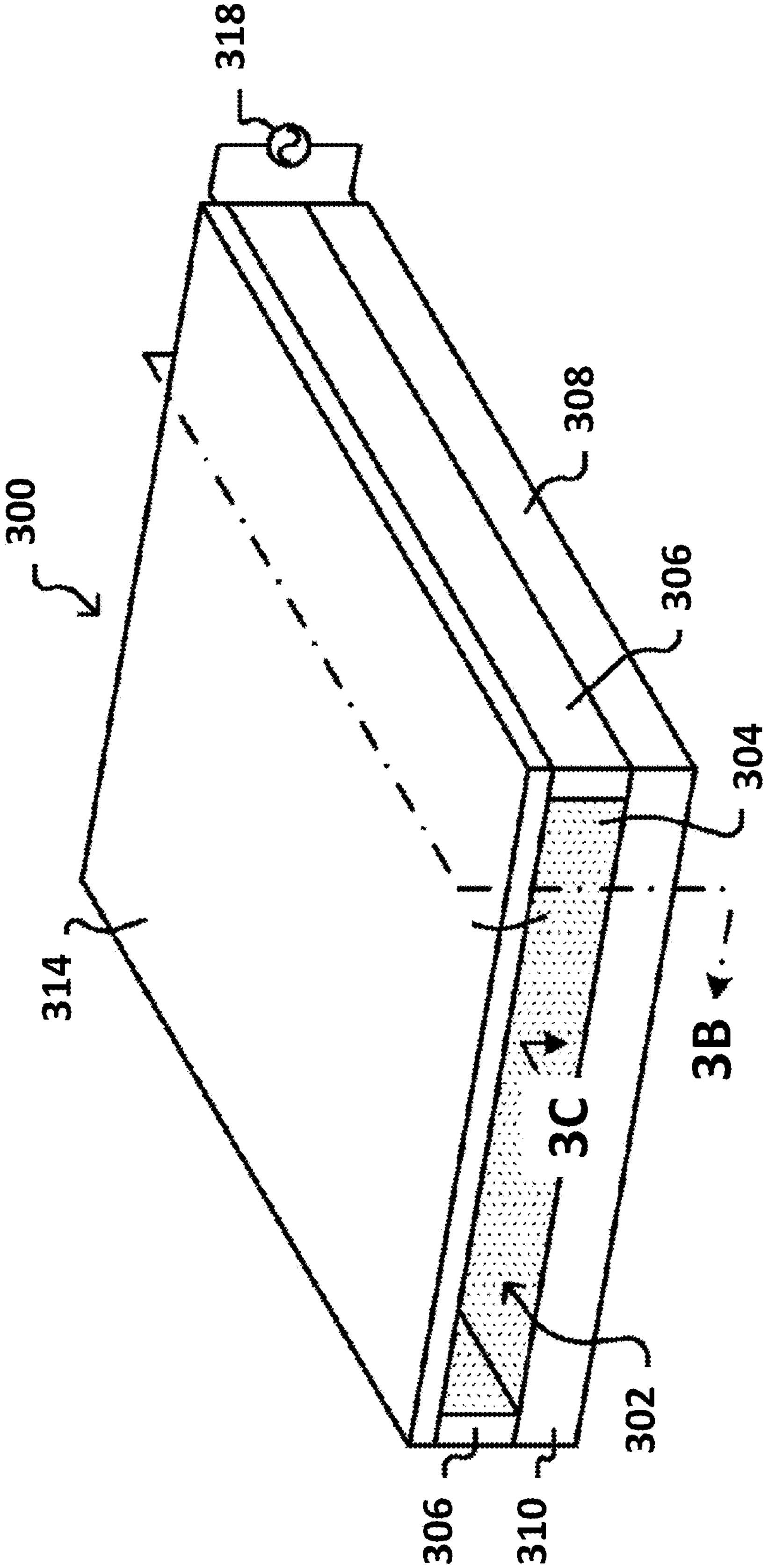
FIG. 3A-3E are various views of yet another microfluidic device constructed in accordance with an embodiment of the present invention.
Figure 3B:
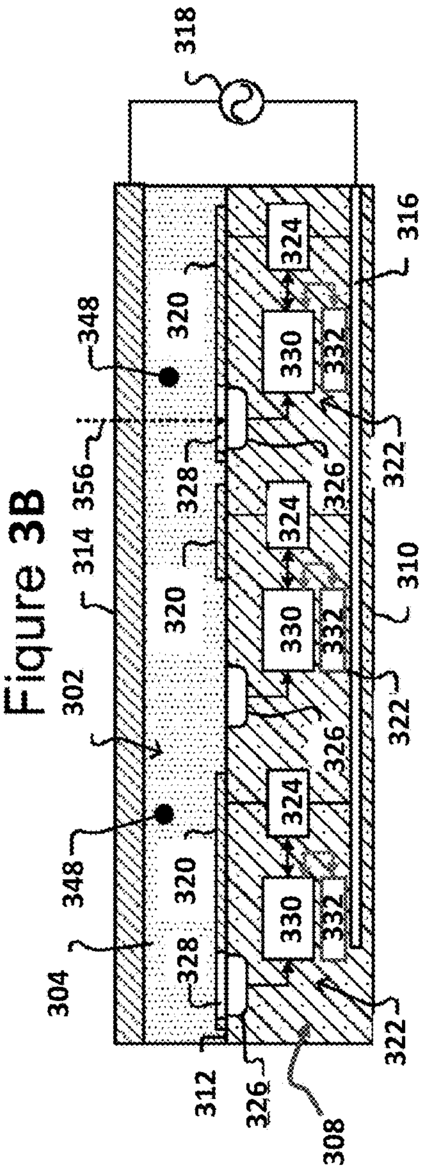
Figure 3C:
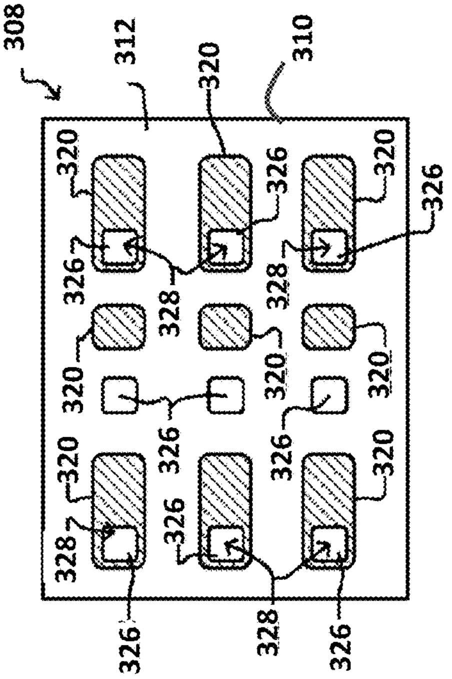

Referring now to FIGS. 3A-3C, the features that enable a microfluidic device 300 (which can be the microfluidic device 100 or variations thereof, e.g., the microfluidic devices 230, 250, 280, and 290) as an optically-actuated electrokinetic device will be described. For purposes of simplicity and brevity, only the features of the microfluidic device 300 relevant to the optically-actuated electrokinetic function of the microfluid device 300 are illustrated in FIGS. 3A-3C.

The microfluidic device 300 generally comprises a chamber 302 containing a fluidic medium 304 (e.g., respectively corresponding to the chamber 102 and fluidic medium 180 of the microfluidic device 100 in FIG. 1). While a portion of the chamber 302 of the microfluidic device 300 is simplistically illustrated, it should be understood that the chamber 302 may be part of a fluidic circuit element having a more detailed structure, such as a growth chamber, a sequestration pen, a flow region, or a flow channel. A DEP configuration may be incorporated into any such fluidic circuit element of the microfluidic device 300, or select portions thereof.

The microfluidic device 300 comprises sidewalls 306 and a printed circuit board assembly ("PCBA") 308 (corresponding to the support structure 104 of the microfluidic device 100 of FIG. 1), that, at least in part, form the chamber 302. The PCBA 308 comprises a circuit substrate 310 on or in which circuit elements can be formed. The circuit substrate 310 comprises a surface 312 that, at least in part, forms the chamber 302 containing the fluidic medium 304. The circuit substrate 310 can comprise a material that has a relatively high electrical impedance. For example, the impedance of the circuit substrate 310 generally can be greater than the electrical impedance of the fluidic medium 304 in the chamber 302. For example, the impedance of the circuit substrate 310 can be two, three, four, five, or more times the impedance of the fluidic medium 304 in the chamber 302. In some embodiments, the circuit substrate 310 can comprise a semiconductor material, which undoped, has a relatively high electrical impedance.

As will be described in further detail below, the PCBA 308 comprises circuit elements embodied in the circuit substrate 310 to form electric circuits. For example, such circuits can be integrated circuits formed in the semiconductor material of the circuit substrate 310. The circuit substrate 310 can thus comprise multiple layers of different materials, such as undoped semiconductor material, metal layers, electrically insulating layers, and the like, such as is generally known in the field of forming microelectronic circuits integrated into semiconductor material. In some embodiments, the circuit substrate 310 can comprise an integrated circuit corresponding to any of many known semiconductor technologies, such as complementary metal-oxide semiconductor (CMOS) integrated circuit technology, bi-polar integrated circuit technology, or bi-MOS integrated circuit technology.

The microfluidic device 300 further comprises a first electrode 314 disposed to be electrically coupled to the fluidic medium 304 in the chamber 302, and a second electrode 316 disposed to be electrically insulated from the fluidic medium 304 in the chamber 302. A power source 318 (described in further detail below) is connected between the first electrode 314 and the second electrode 316 to create a biasing voltage between the electrodes 314, 316, as required for the generation of DEP forces in the chamber 302. The power source 318 can be, for example, an alternating current (AC) power source.

In some embodiments, all or part of the first electrode 314 can be substantially transparent to light, so that light beamlets 356 (one light beamlet 356 shown in FIG. 3B) can pass through the first electrode 314. The first electrode 314 may be disposed on or otherwise form a portion of the cover 110 illustrated in FIG. 1. The second electrode 316 may comprise one or more metal layers on or in the circuit substrate 310, and thus, may form a portion of the PCBA 308. As shown, the second electrode 316 comprises a metal layer embedded in the circuit substrate 310, although in alternative embodiments, the second electrode 316 may comprise a metal layer on the surface 312 of the circuit substrate 310. Regardless, such a metal layer can comprise a plate, a pattern of metal traces, or the like. The electrodes 314, 316 can comprise a conductive oxide, such as indium-tin-oxide (ITO), which may be coated on glass or a similarly insulating material. Alternatively, one or both of the electrodes 314, 316 can be flexible electrodes, such as single-walled nanotubes, multi-walled nanotubes, nanowires, clusters of electrically conductive nanoparticles, or combinations thereof, embedded in a deformable material, such as a polymer (e.g., PDMS). Flexible electrodes that can be used in microfluidic devices have been described, for example, in U.S. Patent Publication No. 2012/0325665, the contents of which are incorporated herein by reference.

The microfluidic device 100 further comprises dielectrophoresis (DEP) electrodes 320 at different locations on or proximate to the surface 312 of the circuit substrate 310 in electrical contact with the fluidic medium 304. Thus, the fluidic medium 304 contained in the chamber 302 provides a resistive connection between the first electrode 314 and the DEP electrodes 320. As best shown in FIG. 3C, the DEP electrodes 320 are distinct from another and are not directly connected to each other electrically.

The microfluidic device 300 further comprises programmable control modules 322, each of which is associated with a respective one of the DEP electrodes 320, and is configured to be programmed with switching instructions received from the control and monitoring equipment (described in further detail below) of the microfluidic control system 150 and to selectively electrically isolate the respective DEP electrode 320 from the second electrode 316 or electrically connect the respective DEP electrode 320 to the second electrode 316 in accordance with the programmed switching instructions.

To this end, each control module 322 comprises a switch mechanism 324 disposed between a different corresponding one of the DEP electrodes 320 and the second electrode 316. Each switch mechanism 324 can connect the corresponding DEP electrode 320 to the second electrode 316. For example, each switch mechanism 324 can be in direct electrical communication with a corresponding one of the DEP electrodes 320 or the second electrode 316 or both. In some examples, each switch mechanism 324 can be in indirect electrical communication (i.e. via an intervening electrical component) with a corresponding one of the DEP electrodes 320 or the second electrode 316 or both. In some examples, each switch mechanism 324 can be in direct electrical communication with either one of a corresponding one of the DEP electrodes 320 or the second electrode 316 and in indirect electrical communication with the other one of the corresponding one of the DEP electrodes 320 or the second electrode 316. In particular, each switch mechanism 324 is switchable between at least two different states. For example, the switch mechanism 324 can be switched between an OFF state and an ON state. In the OFF state, the switch mechanism 324 does not connect the corresponding DEP electrode 320 to the second electrode 316, and thus, the corresponding DEP electrode 320 is electrically isolated from the second electrode 316. Put another way, the switch mechanism 324 provides only a high impedance electrical path from the corresponding DEP electrode 320 to the second electrode 316. Moreover, the circuit substrate 310 does not otherwise provide an electrical connection from the corresponding DEP electrode 320 to the second electrode 316, and thus, there is nothing but a high impedance connection from the corresponding DEP electrode 320 to the second electrode 316 while the switch mechanism 324 is in the OFF state. In the ON state, the switch mechanism 324 electrically connects the corresponding DEP electrode 320 to the second electrode 316, and thus, provides a low impedance path from the corresponding DEP electrode 320 to the second electrode 316. The high impedance connection from the corresponding DEP electrode 320 to the second electrode 316 while the switch mechanism 324 is in the OFF state can be a greater impedance than the fluidic medium 304 in the chamber 302, for example the high impedance connection can have an impedance at least 5 times, at least 10 times, at least 20 times, or at least 100 times (or more) greater than the impedance of the fluidic medium 304 in the chamber 302. The low impedance connection from the corresponding DEP electrode 320 to the second electrode 316 provided by the switch mechanism 324 in the ON state can have a lesser impedance than the fluidic medium 304, for example the fluidic medium 304 in the chamber 302 can have an impedance at least 2 times, at least 3 times, at least 4 times, at least 5 times, at least 10 times, at least 20 times, or at least 100 times (or more) greater than the impedance of the low impedance connection.

Figure 4:
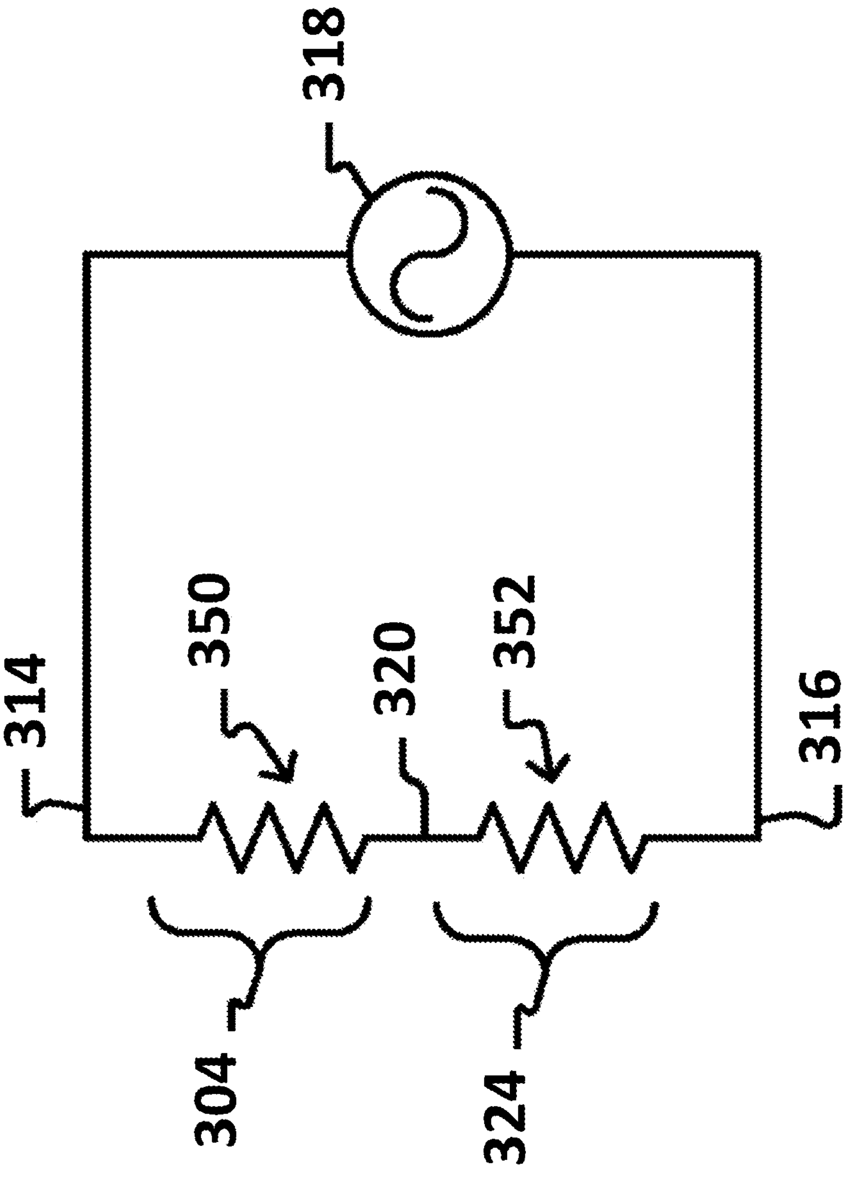
FIG. 4 is an equivalent electrical circuit diagram of an optically-actuated electrokinetic mechanism of the microfluidic device of FIGS. 3A-3E.

Referring further to FIG. 4, a schematic model circuit of the first electrode 314, second electrode 316, DEP electrode 320, fluidic medium 304 and switch mechanism 324 will now be described. The first resistor 350 represents the impedance of the fluidic medium 304 in the chamber 302, and the second resistor 352 represents the impedance of a switch mechanism 324, and thus, the impedance between one of the DEP electrodes 320 on the inner surface 312 of the circuit substrate 310 and the second electrode 316. As noted, the impedance (represented by the second resistor 352) between a corresponding DEP electrode 320 and the second electrode 316 is greater than the impedance (represented by the first resistor 350) of the fluidic medium 304 while the switch mechanism 324 is in the OFF state, but the impedance (represented by the second resistor 352) between a corresponding DEP electrode 320 and the second electrode 316 becomes less than the impedance (represented by the first resistor 350) of the fluidic medium 350 while the switch mechanism 324 is in the ON state. Turning a switch mechanism 324 to the ON state thus creates a localized non-uniform electrical field in the fluidic medium 304 generally from the DEP electrode 320 to a corresponding region on the first electrode 314. The non-uniform electrical field can result in a DEP force on a nearby micro-object 348 (e.g., a micro-particle or biological object, such as a cell or the like) in the fluidic medium 304. The impedance of the switch mechanism 324, when in the OFF state, can be two, three, four, five, ten, twenty, 50, 100, 1000, 5,000, 10,000, or more times the impedance of the switch mechanism 324 when in the ON state. Also, in some embodiments, the impedance of the switch mechanism 324, when in the OFF state, can be two, three, four, five, ten, twenty, fifty, or more times the impedance of the fluidic medium 304, which can be two, three, four, five, ten, twenty, fifty, or more times the impedance of the switch mechanism 324 when in the ON state.

Significantly, the microfluidic device 100 further comprises additional circuit elements configured to control whether each of the switch mechanisms 324 is in the OFF state or the ON state for each time interval of a succession of time intervals based on instructions generated and received from the microfluidic control system 150 via a modulated light beam 354.

To this end, each control module 322 comprises a photosensitive element 326 configured to generate an output signal comprising instructions for controlling the corresponding switch mechanism 324 in response to a modulated light beam 354 directed onto the photosensitive element 326. The photosensitive elements 326 are respectively associated with the DEP electrodes 320. Each photosensitive element 326 can be disposed at a region on the inner surface 312 of the circuit substrate 310. The photosensitive elements 326 can be spaced apart from the respective DEP electrodes 320 or can be underneath the respective DEP electrodes 320. For example, as illustrated by the middle of column of DEP electrodes 320 in FIG. 3C, each DEP electrode 320 can be spaced apart from a corresponding photosensitive element 326. As another example, and as illustrated by the left and right columns of DEP electrodes 320 in FIG. 3C, each DEP electrode 320 can be disposed around (entirely as shown or partially (not shown)) and comprise an opening 328 (e.g., a window) through which a light beam 354 can pass to strike the photosensitive element 326. Alternatively, a portion of each DEP electrode 320 can be transparent to light, and thus, can cover a corresponding photosensitive element 326.

To this end, each control module 322 further comprises a control circuit 330 and a corresponding memory unit 332. The memory unit 332 may form a part of or otherwise be associated with a control circuit 330 formed in the circuit substrate 310. Each of the control circuits 330 is operatively connected to a corresponding one of the photosensitive elements 326 to receive the output signal comprising the switching instructions from the respective photosensitive element 326, and is operatively connected to a corresponding one of the memory units 332 to at least temporarily store the output signal comprising the switching instructions in the respective memory unit 332, and to subsequently retrieve the switching instructions from the respective memory unit 332. Each of the control circuits 330 is also operatively connected to a corresponding one of the switch mechanisms 324 to control the ON state and OFF state of the switch mechanism 324 in accordance with a switching control signal (described in further detail below) for each time interval of a succession of time intervals based on the switching instructions in the stored output signal retrieved from the respective memory unit 332.

The switching control signal has a switching control signal frequency that defines the time intervals during which the switch mechanism 324 can be switched. Preferably, the switching control signal frequency is slower than the modulation frequency of the light beam 354, as will be described in further detail below. Each of the control circuits 330 can comprise analog circuitry, digital circuitry, a digital processor operating in accordance with machine readable instructions (e.g., software, firmware, microcode or the like) stored in the corresponding memory unit 332 or other memory, or a combination of one or more of the foregoing. Each of the memory units 332 may, e.g., be a register.

Figure 3D:
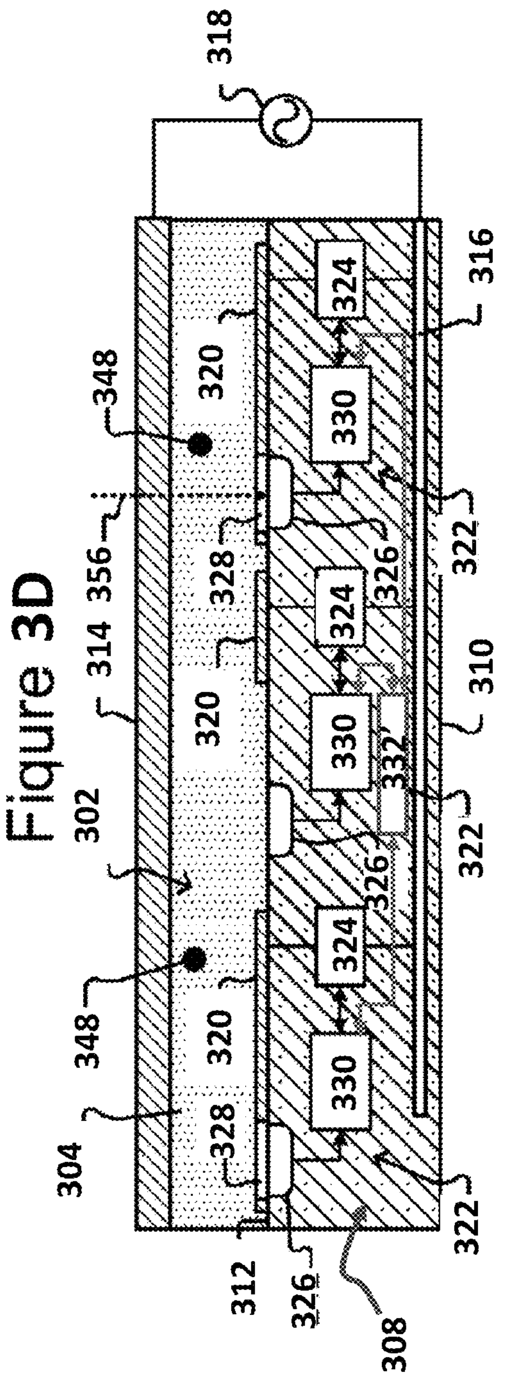

Although each control module 322 of the microfluidic device 100 is illustrated in FIG. 3B as having a dedicated memory unit 332, it should be appreciated that the microfluidic device 100 may alternatively have a memory unit 332' that is shared between multiple control modules 322, as illustrated in FIG. 3D. In this case, each of the control circuits 330 is operatively connected to a corresponding one of the photosensitive elements 326 to receive the output signal comprising the switching instructions from the respective photosensitive element 326, and is operatively connected to the shared memory unit 332' to at least temporarily store the output signal comprising the switching instructions in the shared memory unit 332', and to subsequently retrieve the switching instructions from the shared memory unit 332'. It should also be appreciated that this configuration requires more electrical traces to be incorporated into the circuit substrate 310 in order to connect the control circuits 330 to the shared memory unit 332', thereby requiring the allocation of additional space within the circuit substrate 310.

Figure 3E:
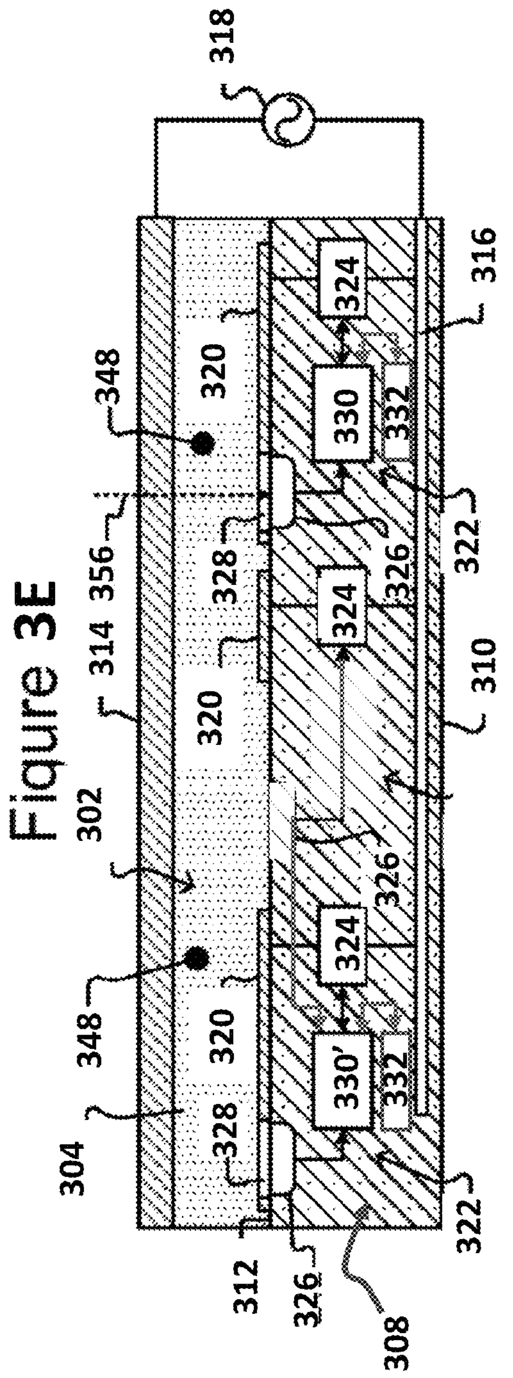

Although each control module 322 of the microfluidic device 100 is illustrated in FIG. 3B as having a single switch mechanism 324 that is controlled by a single control circuit 330, it should be appreciated that in some embodiments control modules 322 can comprise multiple switch mechanisms 324 that are controlled by a single control circuit 330', as illustrated in FIG. 3E (only two switch mechanisms 324 shown to be controlled by the single control circuit 330', although more than two switch mechanism 324 may be controlled by the single control circuit 330'). In some embodiments, each control module 322 may include a single control circuit 330 and at least 2, 3, 4, 5, 10, 15, 20, 25, 30, 50, 100, or more switch mechanisms 324, controlled by the single control circuit, each of the switch mechanisms operable to electrically connect a corresponding DEP electrode 320 to the second electrode 316. In this case, each control circuit 330' that controls multiple switch mechanisms 324 is operatively connected to a corresponding one of the photosensitive elements 326 to receive output signals comprising the switching instructions from the corresponding photosensitive element 326 for controlling the multiple switch mechanisms 324. Each of these control circuit(s) 330' are also operatively connected to a corresponding one of the memory units 332 (or alternatively, a shared memory unit 332' such as that illustrated in FIG. 3D) to at least temporarily store the output signals comprising the switching instructions in the memory unit 332 (or shared memory unit 332'), to subsequently retrieve the switching instructions from the memory unit 332 (or shared memory unit 332'), and is further operatively connected to the multiple switch mechanisms 324 to control the ON states and OFF states of the switch mechanisms 324 in accordance with switching control signals for each time interval of a succession of time intervals based on the switching instructions in the stored output signals retrieved from the respective memory unit 332 (or shared memory unit 332'). It should also be appreciated that this configuration requires more electrical traces to be incorporated into the circuit substrate 310 in order to connect the control circuits 330 to remote switch mechanism 324, thereby requiring the allocation of additional space within the circuit substrate 310.

Figure 5:
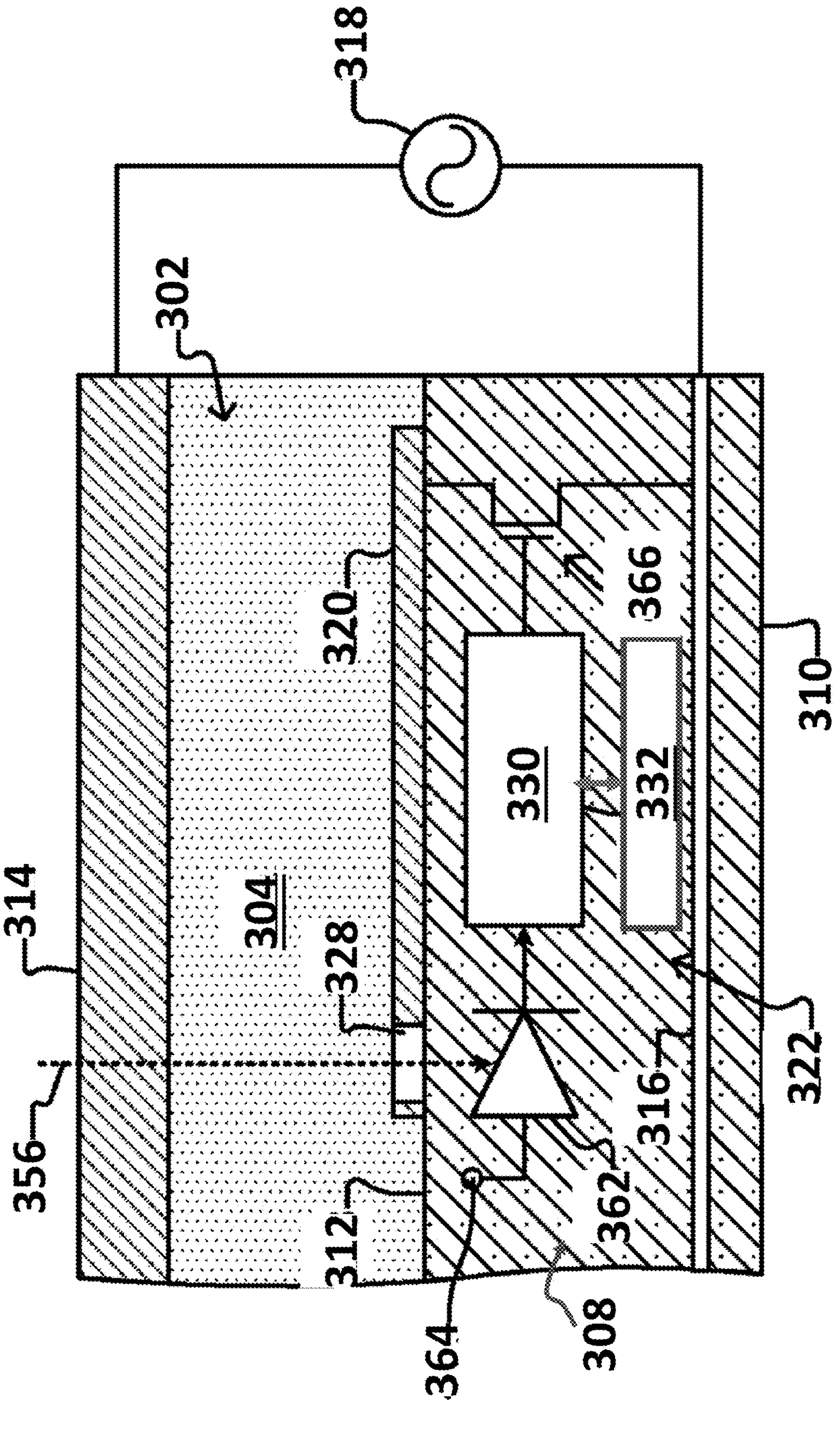
FIG. 5 is a partial, side cross-sectional view of the microfluidic device of FIGS. 3A-3E, particularly illustrating a detailed embodiment of a photosensitive element.

Regardless of the configuration of the control modules 322 in the microfluidic device 100, each of the photosensitive elements 326 and switch mechanisms 324 can have any one of a variety of suitable configurations. For example, referring to FIG. 5, the photosensitive element 326 can comprise a photodiode 362, and the switch mechanism 324 can comprise a transistor 366. As described above, the circuit substrate 310 can comprise a semiconductor material, and the photodiode 362 and transistor 366 can be formed in layers of the circuit substrate 310 as is known in the field of semiconductor manufacturing. An input 364 of the photodiode 362 can be biased with a direct current (DC) power source (not shown). The photodiode 362 can be configured and positioned so that a light beamlet 356 directed at a location on the inner surface 312 that corresponds to the photodiode 362 can activate the photodiode 362, causing the photodiode 362 to output a signal to the control circuit 330. A change in the intensity of the light beamlet 356 can cause the photodiode to change the signal to the control circuit 330. The transistor 366 can be any type of transistor, but need not be a phototransistor. For example, the transistor 366 can be a field effect transistor (FET) (e.g., a complementary metal oxide semiconductor (CMOS) transistor), a bipolar transistor, or a bi-MOS transistor. If the transistor 366 is a FET transistor as shown in FIG. 5, the drain or source can be connected to the DEP electrode 320 on the inner surface 312 of the circuit substrate 310 and the other of the drain or source can be connected to the second electrode 316. The output of the control circuit 330 can be connected to the gate of the transistor 366. The transistor 366 can be biased, so that the signal provided to the gate turns the transistor 366 off or on. If the transistor 366 is a bipolar transistor, the collector or emitter can be connected to the DEP electrode 320 on the inner surface 312 of the circuit substrate 310 and the other of the collector or emitter can be connected to the second electrode 316. The output of the control circuit 330 can be connected to the base of the transistor 366. Regardless, the transistor 366 can be biased so that the signal provided to the base turns the transistor 366 off or on. Regardless of whether the transistor 366 is a FET transistor or a bipolar transistor, the transistor 366 can function as discussed above with respect to the switch mechanism 324 of FIGS. 3A-3C. That is, the control circuit 330 can be configured to control whether the transistor 366 is turned on or off in accordance with the switching instructions stored in the memory unit 332. When turned on, the transistor 366 can provide a low impedance electrical path from the DEP electrode 320 to the second electrode 316 as discussed above with respect to the switch mechanism 324 in FIGS. 3A-3C. Conversely, turned off, the transistor 366 can provide a high impedance electrical path from the DEP electrode 320 to the second electrode 316 as described above with respect to the switch mechanism 324.

Figure 6:
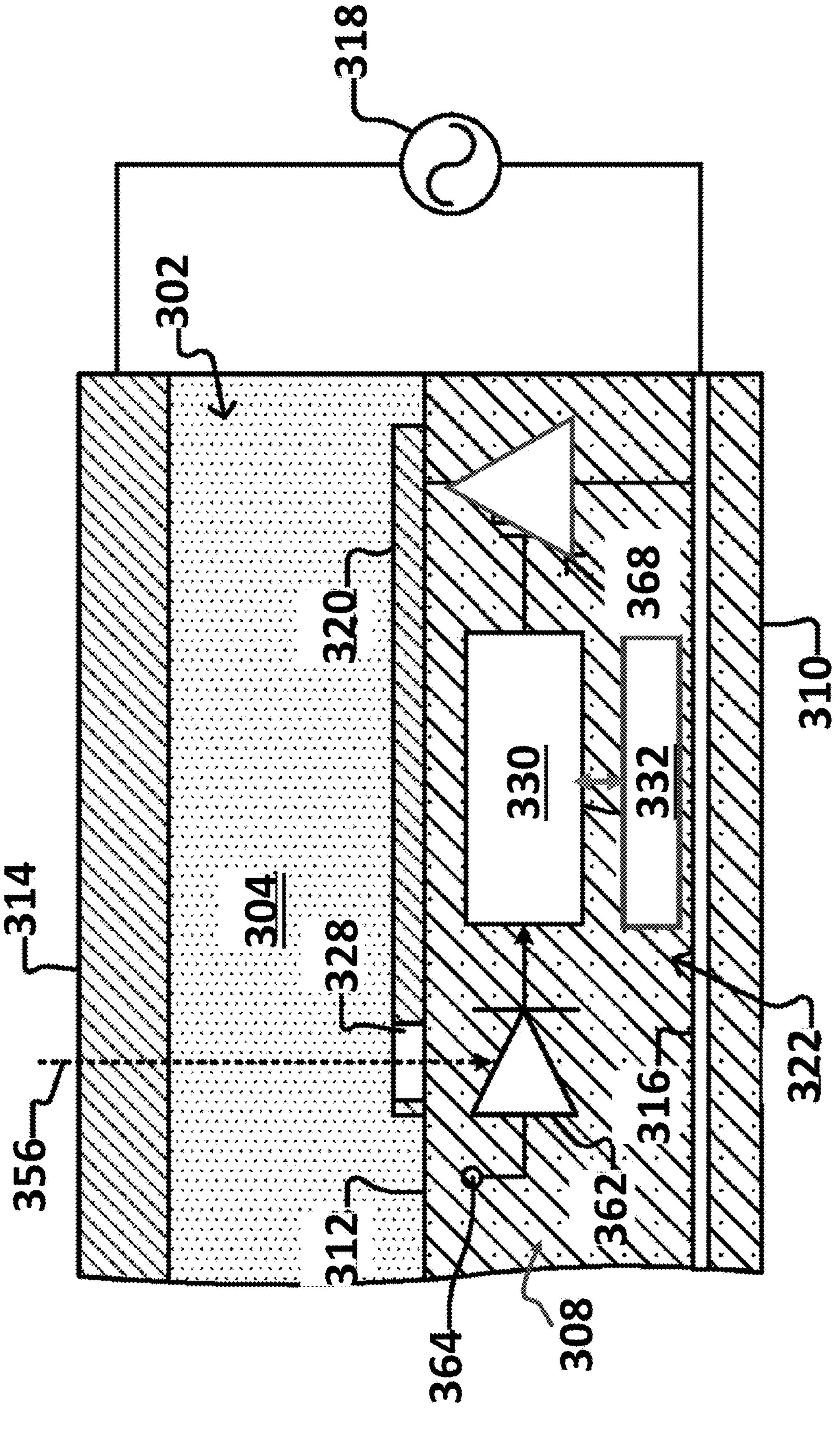
FIG. 6 is a partial, side cross-sectional view of the microfluidic device of FIGS. 3A-3E, particularly illustrating a detailed embodiment of a photosensitive element and a switch mechanism.

Referring to FIG. 6, the switch mechanism 324 may alternatively comprise an amplifier 368, which can, e.g., be an operational amplifier, one or more transistors configured to function as an amplifier, or the like. As shown, the control circuit 330 can utilize the output of the photodiode 362 to control the amplification level of the amplifier 368. For example, the control circuit 330 can control the amplifier 368 to function as discussed above with respect to the switch mechanism 324 of FIGS. 3A-3C. That is, the control circuit 330 can be configured to control whether the amplifier 368 is turned on or off in accordance with the switching instructions stored in the memory unit 332. The control circuit 330 can turn the amplifier 368 off or set the gain of the amplifier 368 to zero, effectively causing the amplifier 368 to provide a high impedance electrical connection from the DEP electrode 320 to the second electrode 316 as discussed above with respect to the switch mechanism 324. Conversely, the control circuit 330 can turn the amplifier 368 on or set the gain of the amplifier 368 to a non-zero value, effectively causing the amplifier 368 to provide a low impedance electrical connection from the DEP electrode 320 to the second electrode 316 as discussed above with respect to the switch mechanism 324.

Figure 7:
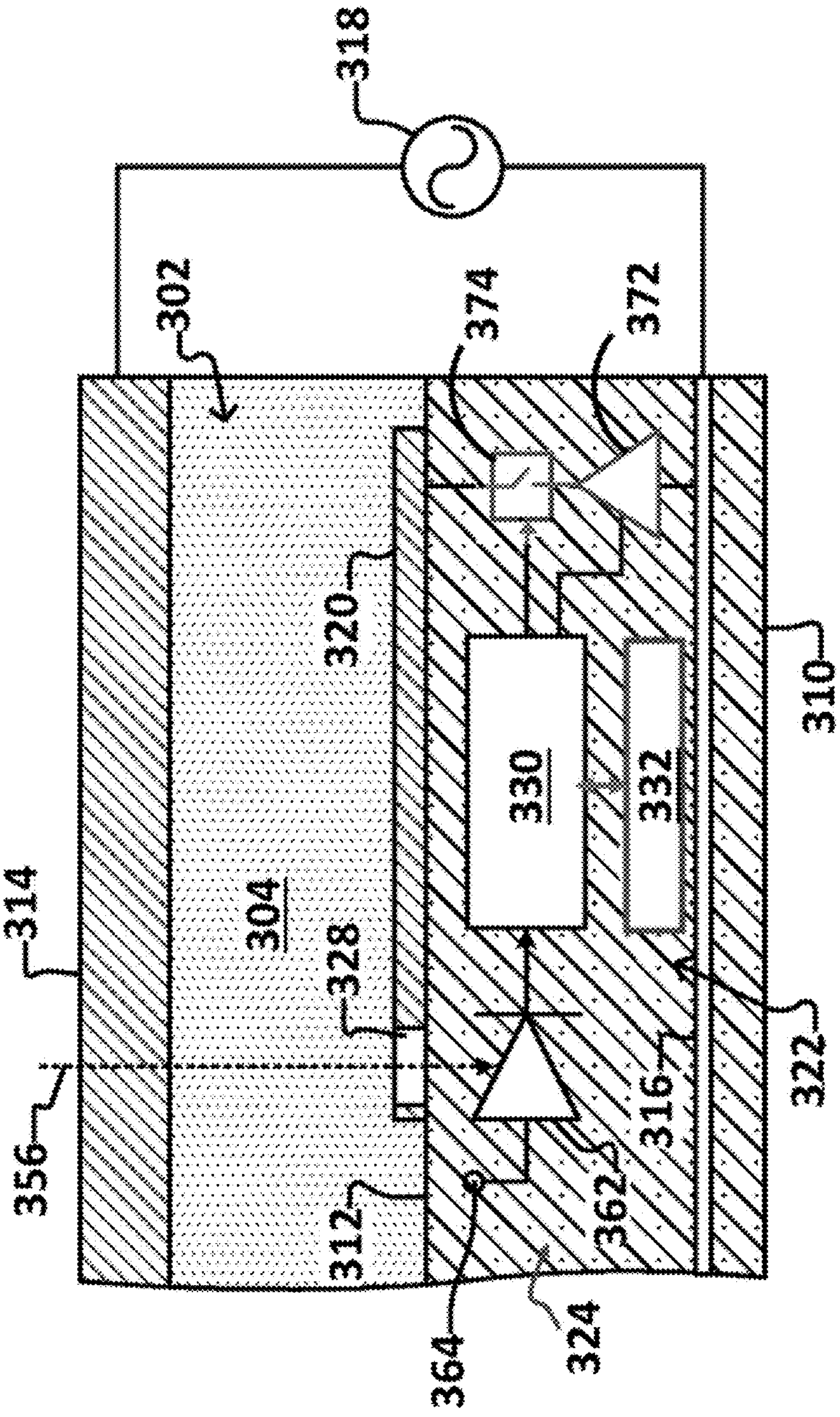
FIG. 7 is a partial, side cross-sectional view of the microfluidic device of FIGS. 3A-3E, particularly illustrating a detailed embodiment of a photosensitive element and another switch mechanism.

Referring to FIG. 7, the switch mechanism 324 can alternatively comprise a switch 374 in series with an amplifier 372. The switch 374 can comprise any kind of electrical switch including a transistor, such as the transistor 362 of FIG. 5. The amplifier 372 can be like the amplifier 368 of FIG. 6. The switch 374 and amplifier 372 can be formed in the circuit substrate 310 generally as discussed above. The control circuit 330 can be configured to control whether the switch 374 is open or closed in accordance with the output of the photodiode 362. Regardless, the control circuit 330 can be configured to control whether the amplifier 372 is turned on or off in accordance with the switching instructions stored in the memory unit 332. When the switch 374 is open, the switch 374 and amplifier 372 can provide a high impedance electrical connection from the DEP electrode 320 to the second electrode 316 as discussed above. Conversely, while the switch 374 is closed, the switch 374 and amplifier 372 can provide a low impedance electrical connection from the DEP electrode 320 to the second electrode 316 as discussed above. In other embodiments the switch mechanism 324 can comprise other circuit elements in addition to or instead of the switch 374 in series with the amplifier 372, provided that the switch mechanism 324 is configured to switch between a low impedance and high impedance electrical connection from the DEP electrode 320 to the second electrode 316 as discussed above.

Figure 8:
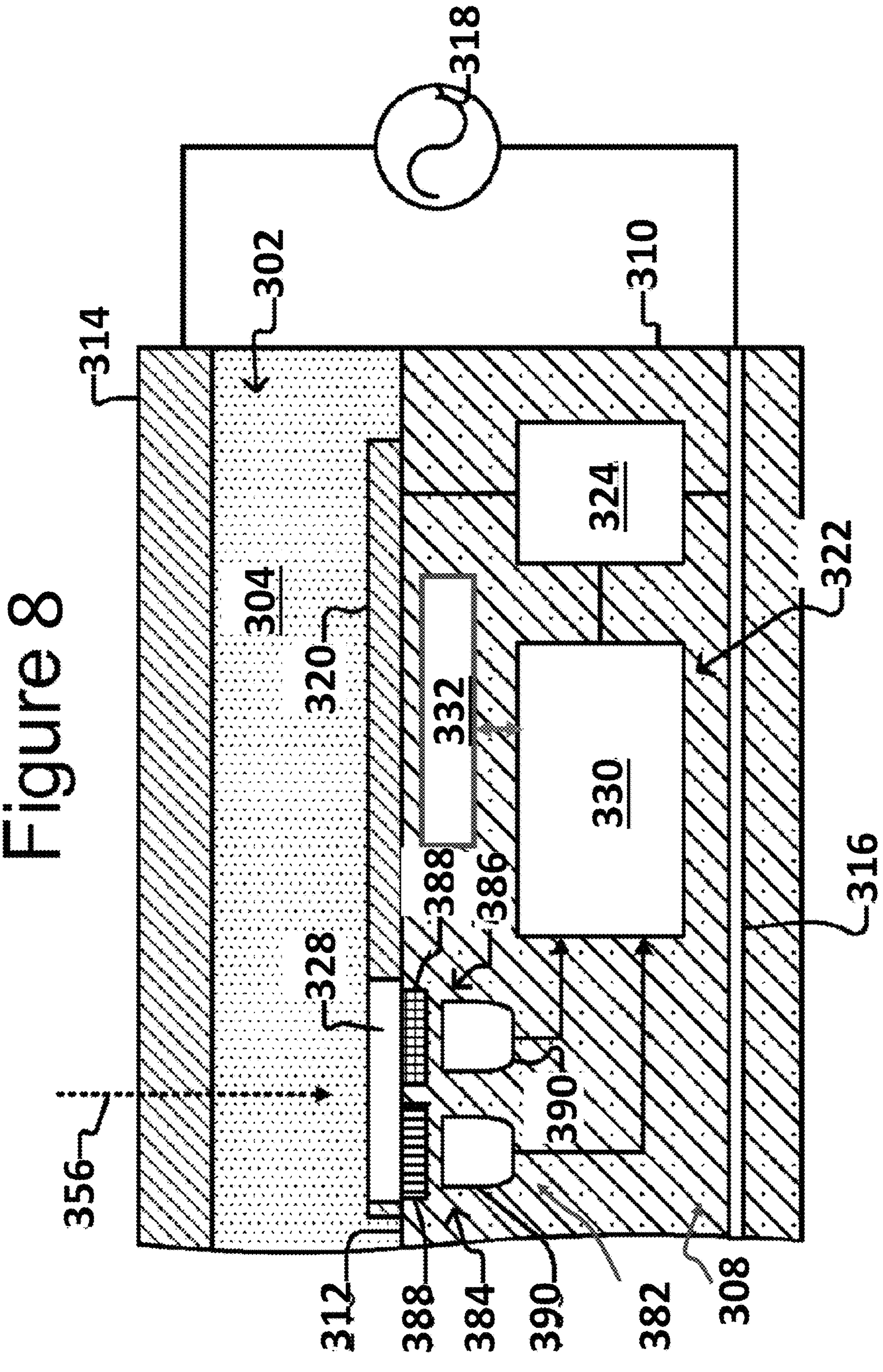
FIG. 8 is a partial, side cross-sectional view of the microfluidic device of FIGS. 3A-3E, particularly illustrating a detailed embodiment of another photosensitive element.

Referring now to FIG. 8, each of one or more (e.g., all) of the photosensitive elements 326 can be replaced with a color detector element 382. One color detector element 382 is shown in FIG. 8, but each of the photosensitive elements 326 can be replaced with such an element 382. The color detector element 382 can comprise a plurality of color photo detectors 384, 386 (two are shown, but there can be more). Each pass color detector 384, 386 can be configured to provide a positive signal to the control circuit 330 in response to a different color of the light beamlet 356. For example, the photo detector 384 can be configured to provide a positive signal to the control circuit 330 when a light beamlet 356 of a first color is directed onto the photo detectors 384, 386, and the photo detector 386 can be configured to provide a positive signal to the control circuit 330 when the light beamlet 356 of a second different color is directed onto the photo detectors 384, 386. As shown, each photo detector 384, 386 can comprise a color filter 388 and a photosensitive element 390. Each filter 388 can be configured to pass only a particular color. For example, the filter 388 of the first photo detector 384 can pass substantially only a first color, and the filter 388 of the second photo detector 386 can pass substantially only a second color. The photosensitive elements 390 can both be similar to or the same as the photosensitive element 326 in FIGS. 3A-3C, as discussed above. The configurations of the color photo detectors 384, 386 shown in FIG. 8 are examples only, and variations are contemplated. For example, rather than comprising a filter 388 and a photosensitive element 390, one or both of the color photo detectors 384, 386 can comprise a photo-diode configured to turn on only in response to light of a particular color.

Figure 9:
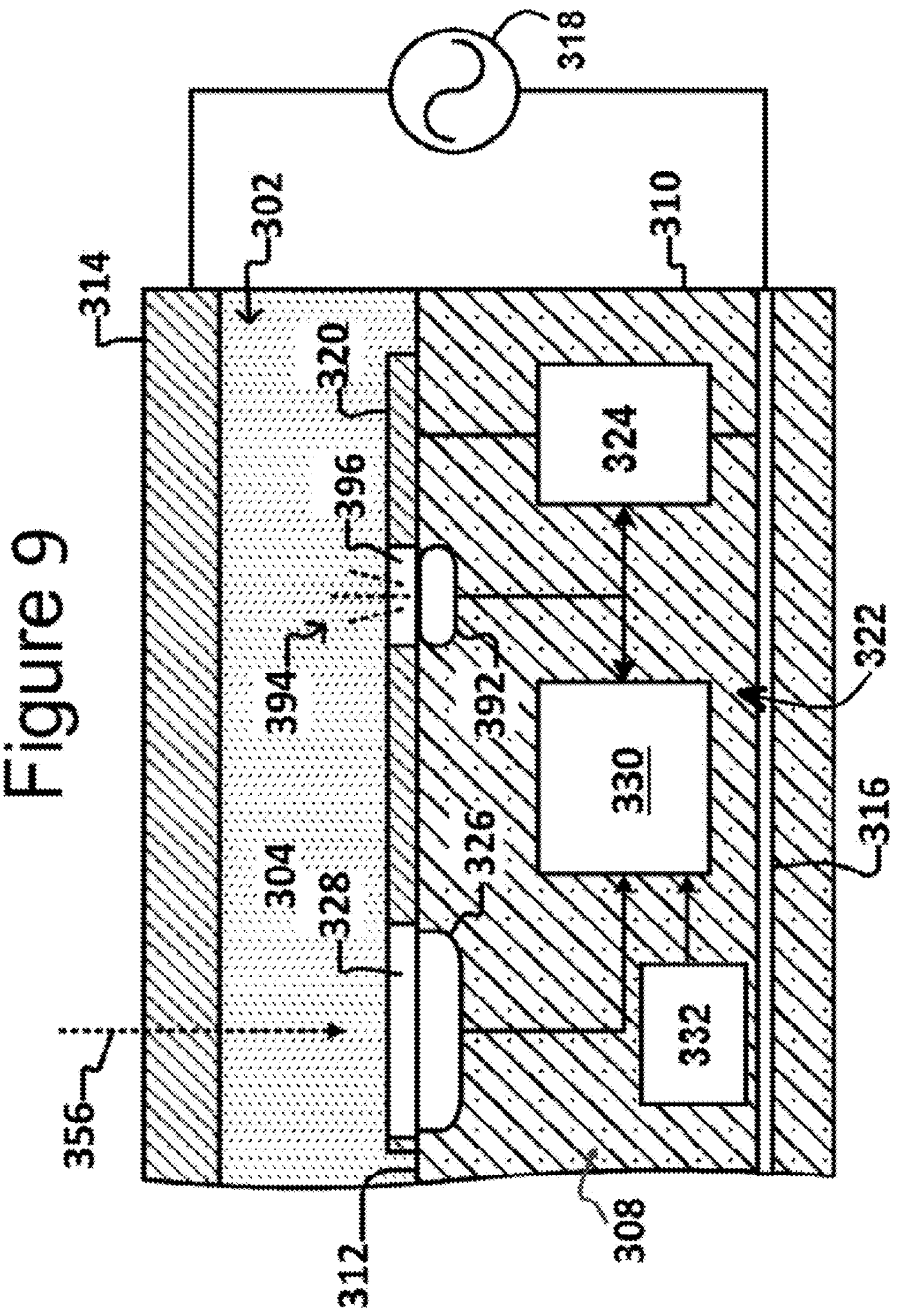
FIG. 9 is a partial, side cross-sectional view of the microfluidic device of FIGS. 3A-3E, particularly illustrating a detailed embodiment of a status indicator.

Referring now to FIG. 9, the microfluidic device 100 may comprise an optional indicator element 392. As shown, the indicator element 392 can be connected to the output of the control circuit 330, which can be configured to set the indicator element 392 to different states, each of which corresponds to one of the possible states of the switch mechanism 324. Thus, for example, the control circuit 330 can turn the indicator element 392 on while the switch mechanism 324 is in the ON state and turn the indicator element 392 off while the switch mechanism 324 is in the OFF state. In the foregoing example, the indicator element 392 can thus be in the ON state while the switch mechanism 324 in in the ON state, and in the OFF state while the switch mechanism 324 is in the OFF state. The control circuit 330 can also turn the indicator element 392 on or off to provide a signal to the microfluidic control system 150. The signal provided to the microfluidic control system may correspond to, for example, a state of the microfluidic device 100, a state of the programmable control module 322, information stored in memory 332, or information received from a sensor. For example, the control circuit 330 can turn the indicator element 392 on or off (or otherwise modulate the indicator element 392) to provide a signal based on the switching instructions stored in the respective memory unit 332, whether or not the switch mechanism 324 is in the ON state or OFF state. The indicator element 392 can provide a visual indication (e.g., emit light 394) only when turned on. Non-limiting examples of the indicator element 392 include a light source such as a light emitting diode (which can be formed in the circuit substrate 310), a light bulb, or the like. As shown, the DEP electrode 320 can include a second opening 396 (e.g., window) for the indicator element 392. Alternatively, the indicator element 392 can be spaced away from the DEP electrode 320 and thus not covered by the DEP electrode 320, in which case there need not be a second window 396 in the DEP electrode 320. As yet another alternative, the DEP electrode 320 can be transparent to light, in which case there need not be a second window 396 even if the DEP electrode 320 covers the indicator element 392.

Figure 10:
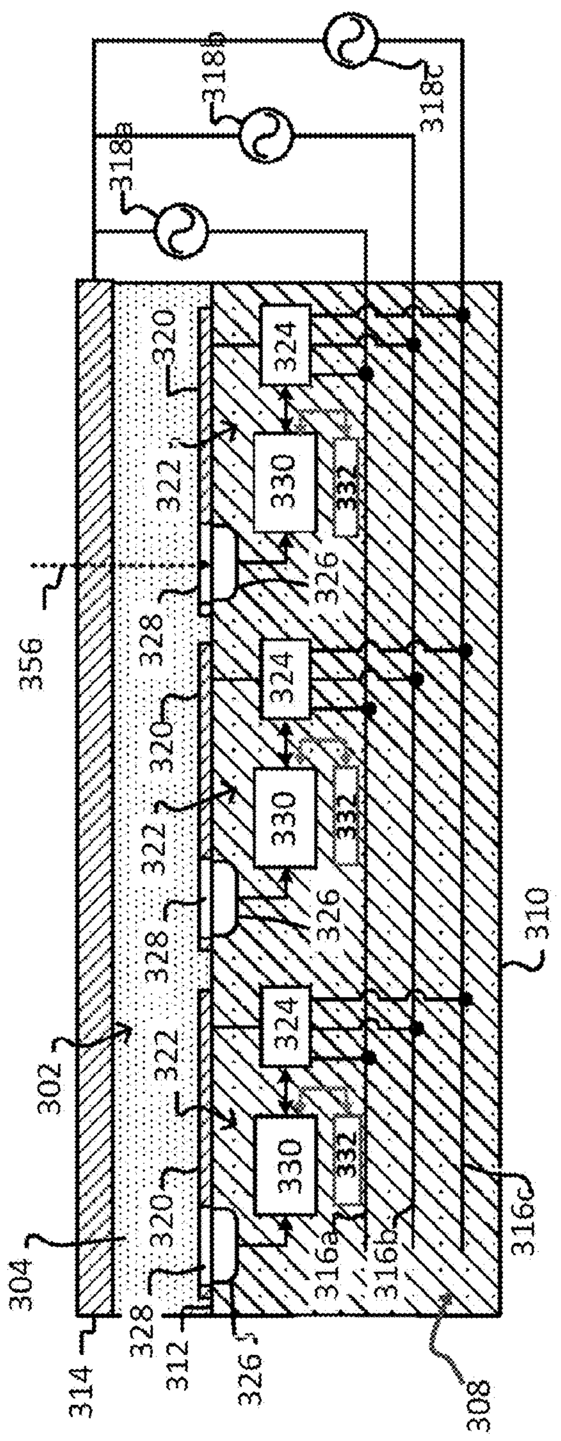
FIG. 10 is a partial, side cross-sectional view of an embodiment of a microfluidic device.

Referring to FIG. 10, the microfluidic device 100 may comprise not only the second electrode **316*a*, but one or more additional third and fourth electrodes 316*b*, 316*c* (two are shown but there can be one or more than two) and a corresponding plurality of additional power sources 318*a*, 318*b*, 318*c*. As shown, each switch mechanism 324 can be configured to connect electrically a corresponding DEP electrode 320 to one of the electrodes 316*a*, 316*b*, 316*c*. A switch mechanism 324 can thus be configured to selectively connect a corresponding DEP electrode 320 to any one of the electrodes 316*a*, 316*b*, 316*c*. Each switch mechanism 324 can also be configured to disconnect the first electrode 314 from all of the electrodes 316*a*, 316*b*, 316*c*. As also shown, the power source 318*a* can be connected to (and thus provide power between) the first electrode 314 and the second electrode 316*a* as discussed above. The power source 318*b* can be connected to (and thus provide power between) the first electrode 314 and the third electrode 316*b*, and the power source 316*c* can be connected to (and thus provide power between) the first electrode 314 and the fourth electrode 316*c*. Each of the electrodes 316*a*, 316*b*, 316*c* can be generally like the second electrode 316 as discussed above. For example, each electrode 316*a*, 316*b*, 316*c* can be electrically insulated from the medium 304 in the chamber 302. As another example, each electrode 316*a*, 316*b*, 316*c* can be part of a metal layer on the surface 312 of or inside the circuit substrate 310. Each power source 318*a*, 318*b*, 318*c* can be an alternating current (AC) power source like the power source 318 as discussed above. The power sources 318*a*, 318*b*, 318*c*, however, can be configured differently. For example, each power source 318*a*, 318*b*, 318*c* can be configured to provide a different level of voltage and/or current. In such an example, each switch mechanism 324 can thus switch the electrical connection from a corresponding DEP electrode 320 between an OFF state in which the DEP electrode 320 is not connected to any of the electrodes 316*a*, 316*b*, 316*c* and any of multiple ON states in which the DEP electrode 320 is connected to any one of the electrodes 316*a*, 316*b*, 316*c*. As another example of how the power sources 318*a*, 318*b*, 318*c* can be configured differently, each power source 318*a*, 318*b*, 318*c* can be configured to provide power with a different phase shift. For example, in an embodiment comprising the electrodes 316*a*, 316*b* and the power sources 318*a*, 318*b* (but not the electrode 316*c* and power source 318*c*), the power source 316*a* can provide power that is approximately (e.g., plus or minus ten percent) one hundred eighty (180) degrees out of phase with the power provided by the power source 316*b*. In such an embodiment, each switch mechanism 324 can be configured to switch between connecting a corresponding DEP electrode 320 to the second electrode 316*a* and the third electrode 316*b*. The corresponding DEP electrode 320 can be activated (and thus turned on) while the DEP electrode 320 is connected to one of the electrodes 316*a*, 316*b* (e.g., 316*a*) and deactivated (and thus turned off) while connected to the other of the electrodes 316*a*, 316*b* (e.g., 316*b*). Such an embodiment can reduce leakage current from a DEP electrode 320 that is turned off as compared to the microfluidic device 100 of FIGS. 3A-3C**.

Figure 11A:
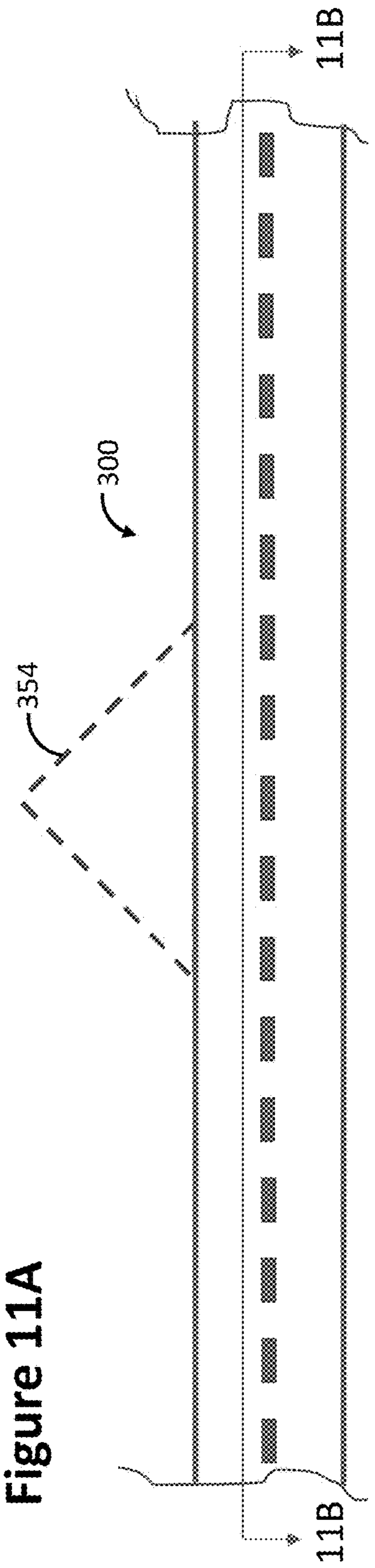
FIG. 11A is a profile view of the microfluidic device of FIGS. 3A-3E, particularly showing a light beam generated by the microfluidic system of FIG. 1.
Figure 11B:
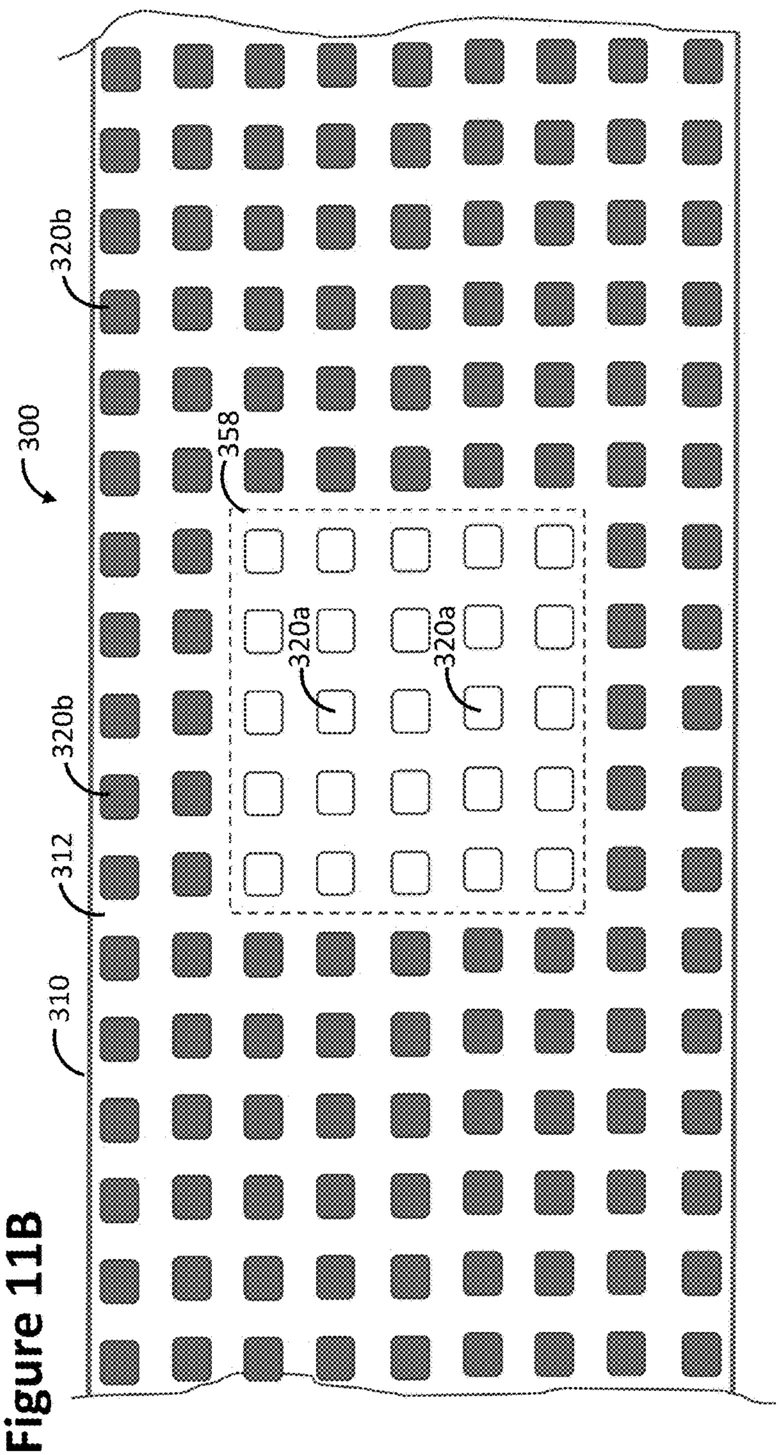
FIG. 11B is a planar view of the microfluidic device of FIG. 11A, taken along the line 11B-11B.

Thus, it can be appreciated from the foregoing, that instead of setting each of the switch mechanisms 324 to either an ON state or an OFF state in real-time for each time interval, instructions for setting each of the switch mechanisms 324 to an ON state or an OFF state over a succession of time intervals are stored in the memory units 332, which can then be subsequently accessed by the respective control circuits 330 to actively set the respective switch mechanism 324 to the ON state or the OFF state in accordance with the switching instructions. It can further be appreciated that instructions can be sent to the control circuits 330 for storing in the corresponding memory units 332 by exposing the corresponding photosensitive elements 326 with a light beam 354 (shown in FIG. 11A) that is modulated with the switching instructions. Accordingly, as illustrated in FIGS. 11A and 11B, modulation of the light beam 354 can generate instructions that selectively activate and deactivate changing patterns of DEP electrodes 320 in a field of view (FOV) 358 defined by the periphery of the light beam 354. Thus, a light beam 354 directed onto the inner surface 312 of the circuit substrate 310 can illuminate select DEP electrodes 320*a* (shown in white) in the FOV 358, while not illuminating DEP electrodes 320*b* (shown in black) outside of the FOV 358. Although in the illustrated embodiment, the FOV 358 is shaped as a square, the FOV 358 may have any suitable shape, including circular, rectangular, oval, triangular, etc. In a preferred embodiment, the light beam 354 comprises an array of light beamlets 356 (one shown in FIG. 3B) that correspond to the DEP electrodes 320*a* in the FOV 358, such that instructions can be independently sent to the individual control circuits 330 corresponding to the respective DEP electrodes 320*a*. As will be described in further detail below, the light beam 354, and thus the FOV 358, may be moved around the inner surface 312 of the circuit substrate 310 of the microfluidic device 100, or even other microfluidic devices, to send instructions to previously unilluminated DEP electrodes 320*b*.

Each of the light beamlets 356 can be modulated in any variety of manners in order to encode the switching instructions within the output signal of the respective photosensitive element 326.

In one implementation, activation (e.g., turned on) of the photosensitive element 326 can represent an instruction to set the switch mechanism 324 to the ON state, and deactivation (e.g., turned off) of the photosensitive element 326 can represent an instruction to set the switch mechanism 324 to the OFF state. For example, the light beamlet 356 can be selectively directed onto the photosensitive element 326 to activate it, and the light beamlet 356 thereafter can be removed from the photosensitive element 326 to deactivate it. Thus, a first pulse of the light beamlet 356 on the photosensitive element 326, and thus a first pulse of a positive signal output by the photosensitive element 326, can represent an instruction to switch or leave the corresponding switch mechanism 324 in the ON state, and the lack of a pulse of the light beamlet 356 on the photosensitive element 326, and thus, a lack of a pulse of a positive signal output by the photosensitive element 326, can represent an instruction to switch or leave the switch mechanism 324 in the OFF state, or vice versa.

In another implementation, activation of the photosensitive element 326 can represent an instruction to toggle the switch mechanism 324 between the ON state and the OFF state. For example, a first pulse of the light beamlet 356 on the photosensitive element 326, and thus a first pulse of a positive signal output by the photosensitive element 326, can represent an instruction to toggle the switch mechanism 324 from an OFF state to an ON state. The switch mechanism 324 can be maintained in the ON state until instructed otherwise. That is, the next pulse of the light beamlet 356 on the photosensitive element 326, and thus the next pulse of the positive signal output by the photosensitive element 326, represents an instruction to toggle the switch mechanism 324 from the ON state to the OFF state. Subsequent pulses of the light beamlet 356 on the photosensitive element 326, and thus, subsequent pulses of the positive signal output by the photosensitive element 326, can generate instructions that toggle the switch mechanism 324 between the OFF and ON states.

In still another implementation, different patterns of activation of the photosensitive element 326 can represent an instruction to either set the switch mechanism 324 to the ON state or the OFF state. For example, a sequence of n pulses of the light beamlet 356 on the photosensitive element 326 having a first characteristic, and thus a sequence of n pulses of a positive signal output by the photosensitive element 326 having the first characteristic, can represent an instruction to set the switch mechanism to the ON state, and a sequence of k pulses of the light beamlet 356 on the photosensitive element 326 having a second characteristic, and thus sequence of k pulses of a positive signal output by the photosensitive element 326 having the second characteristic, can represent an instruction to set the switch mechanism to the OFF state, where n and k can be equal or unequal integers. Examples of the first characteristic and the second characteristic can include the following: the first characteristic can be that the n pulses occur at a first frequency, and the second characteristic can be that the k pulses occur at a second frequency that is different than the first frequency. As another example, the pulses can have different widths (e.g., a short width and a long width), like, for example, Morse Code. The first characteristic can be a particular pattern of n short and/or long width pulses of the light beamlet 356 that constitutes a predetermined ON state code, and the second characteristic can be a different pattern of k short and/or long width pulses of the light beamlet 356 that constitutes a predetermined OFF state code, or vice versa. Indeed, in the foregoing examples the pulses of the light beamlet 356 can be configured to instruct the switch mechanism 324 to be set between more than two states. Thus, the switch mechanism 324 can have more and/or different states than merely an ON state and an OFF state.

In yet another implementation, an instruction to either set the switch mechanism 324 to the ON state or the OFF state can be represented by a characteristic of the light beamlet 356, and thus the corresponding pulse of a positive signal output from the photosensitive element 326, other than merely the presence or absence of the light beamlet 356. For example, the switching instructions can be generated in accordance with the brightness of the light beamlet 356, and thus, the level of the corresponding pulse output by the photosensitive element 326. Thus, for example, a detected brightness level of the light beamlet 356 on the photosensitive element 326, and thus, a level of a corresponding pulse of the positive signal output by the photosensitive element 326, that is greater than a first threshold, but less than a second threshold, can represent an instruction to set the switch mechanism 324 to the ON state, and a detected brightness level of the light beamlet 356 on the photosensitive element 326, and thus, a level of a corresponding pulse of the positive signal output by the photosensitive element

326, that is greater than the second threshold can represent an instruction to set the switch mechanism 324 to the OFF state, or vice versa.

In yet another implementation, an instruction to either set the switch mechanism 324 to the ON state or the OFF state can be represented by different colors of the light beamlet 356, and thus an intensity of a corresponding pulse of a positive signal output from the photosensitive element 326, as will be described in further detail below.

In yet another implementation, an instruction to either set the switch mechanism 324 to the ON state or the OFF state can be represented by any combination of the foregoing characteristics of the light beamlet 356. For example, a detected sequence of pulses of the light beamlet 356 at a particular frequency on the photosensitive element 326, and thus, a corresponding sequence of pulses of positive signal output by the photosensitive element 326 at the particular frequency, can represent an instruction to set the switch mechanism to the ON state, and a detected brightness level of the light beamlet 356 on the photosensitive element 326, and thus, a level of a corresponding pulse of the positive signal output by the photosensitive element 326, can represent an instruction to set the switch mechanism to the OFF state.

Each of the control circuits 330 is configured to receive from the control and monitoring equipment 152 (described in further detail below) a system clock/timing signal for coordinating the storage of the output signal generated by the respective photosensitive element 326 in the respective memory unit 332. To this end, the microfluidic device 100 may further comprise one or more electrically conductive leads (not shown), e.g., incorporated into one or more metal layers in the circuit substrate 310, such that each of the control circuits 330 can receive the system clock/timing signal via the electrically conductive lead(s). Each of the control circuits 330 is further configured for receiving from the control and monitoring equipment 152 or otherwise generating or deriving the switching control signal (described above), and coordinating the subsequent controlling of whether the respective switch mechanism 324 is in the ON state or the OFF state for each time interval of a succession of time intervals based on the instructions in the stored output signal. Each of the control circuits 330 is further configured for receiving from the control and monitoring equipment 152 or otherwise generating or deriving an initialization pulse/signal in response to which the respective control circuit 330 initiates storing the output signal from the corresponding photosensitive element 326 in the corresponding memory unit 332.

Figures 12A, 12B:
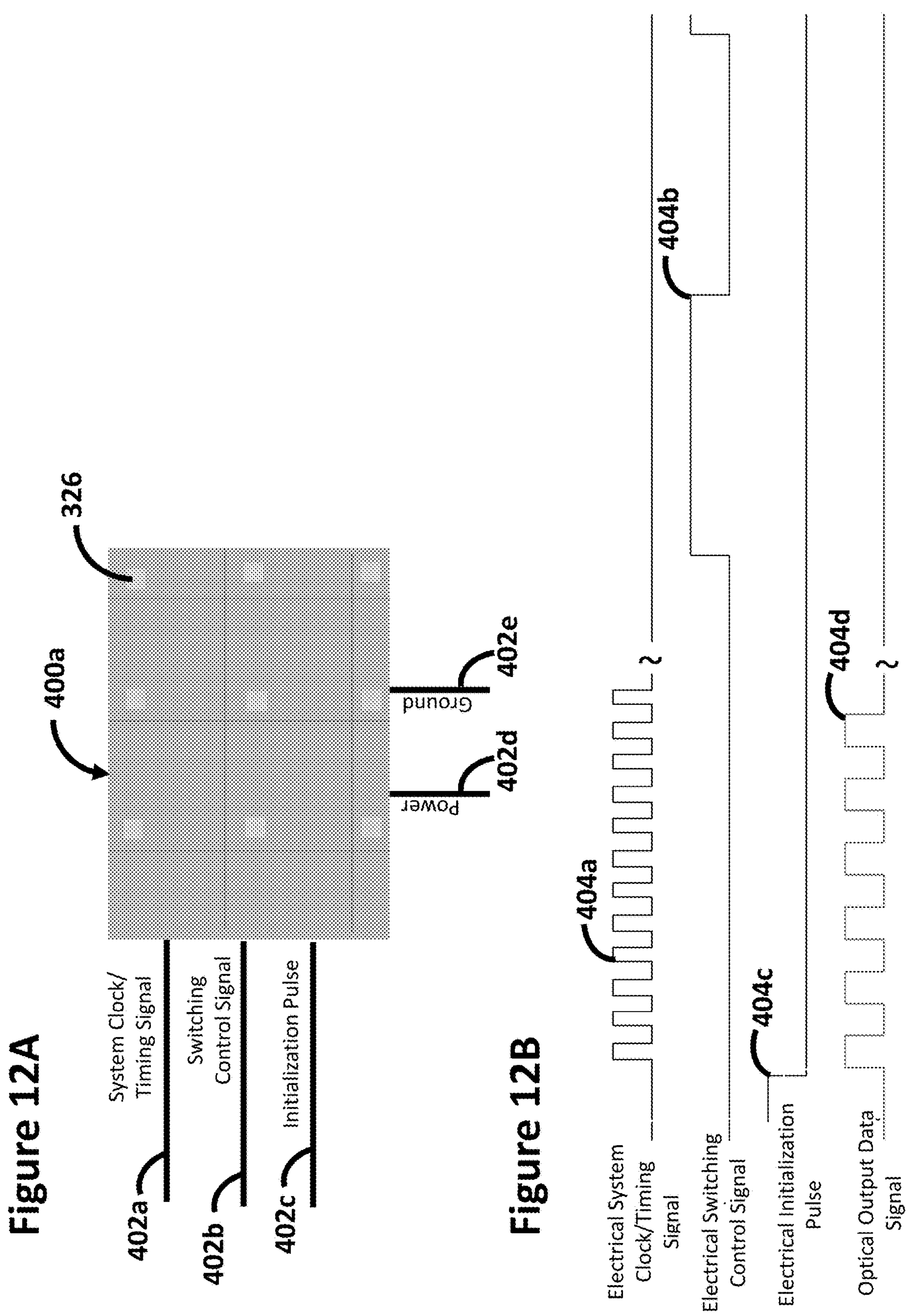
FIG. 12A is a plan view of a microfluidic device, particularly illustrating various electrical signals input into the microfluidic device.
FIG. 12B are timing diagrams of electrical signals input into the microfluidic device of FIG. 12A.

For example, with reference to FIGS. 12A and 12B, in one embodiment of a microfluidic device 400*a*, each of the control circuits 330 is configured to receive the system clock/timing signal 404*a* on a first electrically conductive lead 402*a*, the switching control signal 404*b* on a second electrically conductive lead 402*b*, and an initialization pulse 404*c* on a third electrically conductive lead 402*c*. The microfluidic device 400*a* further comprises a fourth electrically conductive lead 402*d* configured to receive power from the control and monitoring equipment 152, and a fifth electrically conductive lead 402*e* for grounding the microfluidic device 400*a* to the control and monitoring equipment 152. As will be described in further detail below, the signals and power may be provided to the electrical leads of the microfluidic device 400*a* via a nest 500 (shown in FIG. 16) in which terminals of the microfluidic device 400*a* may be placed into electrical contact. It should be appreciated that the electrically conductive leads 402*a*-402*e* are shown as being external to the microfluidic device 400*a* for purposes of illustration only. In the embodiment where a nest 500 is used, the electrically conductive leads 402*a*-402*e* will be internal to the microfluidic device 400*a*, and will be electrically connected to the electrical terminals on the exterior surface of the microfluidic device 400*a*, as will be described in further detail below.

The system clock/timing signal 404*a* is used to synchronize the storage within the memory unit 332 of an output data signal 404*d* (comprising the switching instructions to control the respective switching mechanism 324) generated by each photosensitive element 326 in response to the modulated light beam 354 (or beamlet 356). The modulation frequency of the light beam 354 (or beamlet 356), i.e., the frequency of the output data signal 404*d* generated by each photosensitive element 326, may be set to be equal to, or a fraction (i.e., slower) of, the system clock/timing signal 404*a*. In the illustrated embodiment, the modulation frequency of the light beam 354 is twice as slow as the system clock/timing signal frequency, and thus, for every two pulses of the system clock/timing signal 404*a*, each control circuit 330 may respectively push a high or a low (1 or 0) of the output data signal 404*d* generated by the respective photosensitive element 326 to the respective memory unit (e.g., the register) 332.

The switching control signal 404*b* is used to synchronize the switching of each of the switch mechanisms 324 between the ON state and OFF state in accordance with the stored output data signal 404*d*, and may, thus, have a frequency that is set to be equal to the switching frequency of the control circuits 330. Thus, each control circuit 330 may retrieve (i.e., read out) each instruction (i.e., each bit) from the respective memory unit (e.g., the register) 332 for each pulse of the switching control signal 404*b*. In general, the frequency of the switching control signal 404*b* is lower than the frequency of the system clock/timing signal 404*a*. In some embodiments the frequency of the system clock/timing signal 404*a* is an integer multiple of the frequency of the switching control signal 404*b*. As an example, the frequency of the system clock/timing signal 404*a* can be in the range of 1000 Hz-20 kHz, or in the range 10 kHz-200 kHz, or in the range 100 kHz-2 MHz, or may have a value outside those ranges, whereas, for example, the frequency of the switching control signal 404*b* can be in the range of 0.1 Hz-100 Hz, such as in the range 0.25 Hz-20 Hz or in the range 0.5 Hz-8 Hz, or may have a value outside these ranges. In certain embodiments, the frequency of the system clock/timing signal 404*a* can be higher than the frequency of the switching control signal 404*b*. For example the frequency of the system clock/timing signal 404*a* may be in a range of at least 50-100,000 times greater than the frequency of the switching control signal 404*b*, or even higher. In other examples the frequency of the system clock/timing signal 404*a* may be in a range of 50-500 times, 100-1000 times, 200-2000 times, 500-5000 times, 1000-10,000 times, 2000-20,000 times, 5000-50,000 times, or 10,000-100,000 times, greater than the frequency of the switching control signal 404*b*, or between any two endpoints listed, for example 50-5000 times, 100-2000 times, or 2000-100,000 times, greater than the frequency of the switching control signal 404*b*.

The initialization pulse 404*c*, and in this case a framing pulse, is used to inform the control circuits 330 to begin receiving and storing the output data signal 404*d* from the respective photosensitive elements 326 into the respective memory units 332, i.e., to begin listening for the switching instructions sent from the monitoring and control equipment 152 (described in further detail below). Each control circuit 330 will receive the output data signal 404*d* comprising the switching instructions from the respective photosensitive element 326 and store the switching instructions (as 1's and 0's) in the respective register 332 at the frequency of the system clock/timing signal (or multiple integer thereof) until the register 332 is full. As an example, for 1024 bits of data, the total time for receiving and storing the switching instructions may be much less than 1 second. Once the register 332 is full, the respective control circuit 330 may then retrieve the switching instructions from the register 332 and control the respective switch mechanism 324 at the frequency of the switching control signal 404*b*. As an example, at a switching control signal frequency of 2 Hz, the time required to retrieve all of the switching instructions from the respective register 332 and control the switch mechanism 324 in accordance with such instructions may be 8.5 minutes for 1024 bits of data.

Figures 13A, 13B:
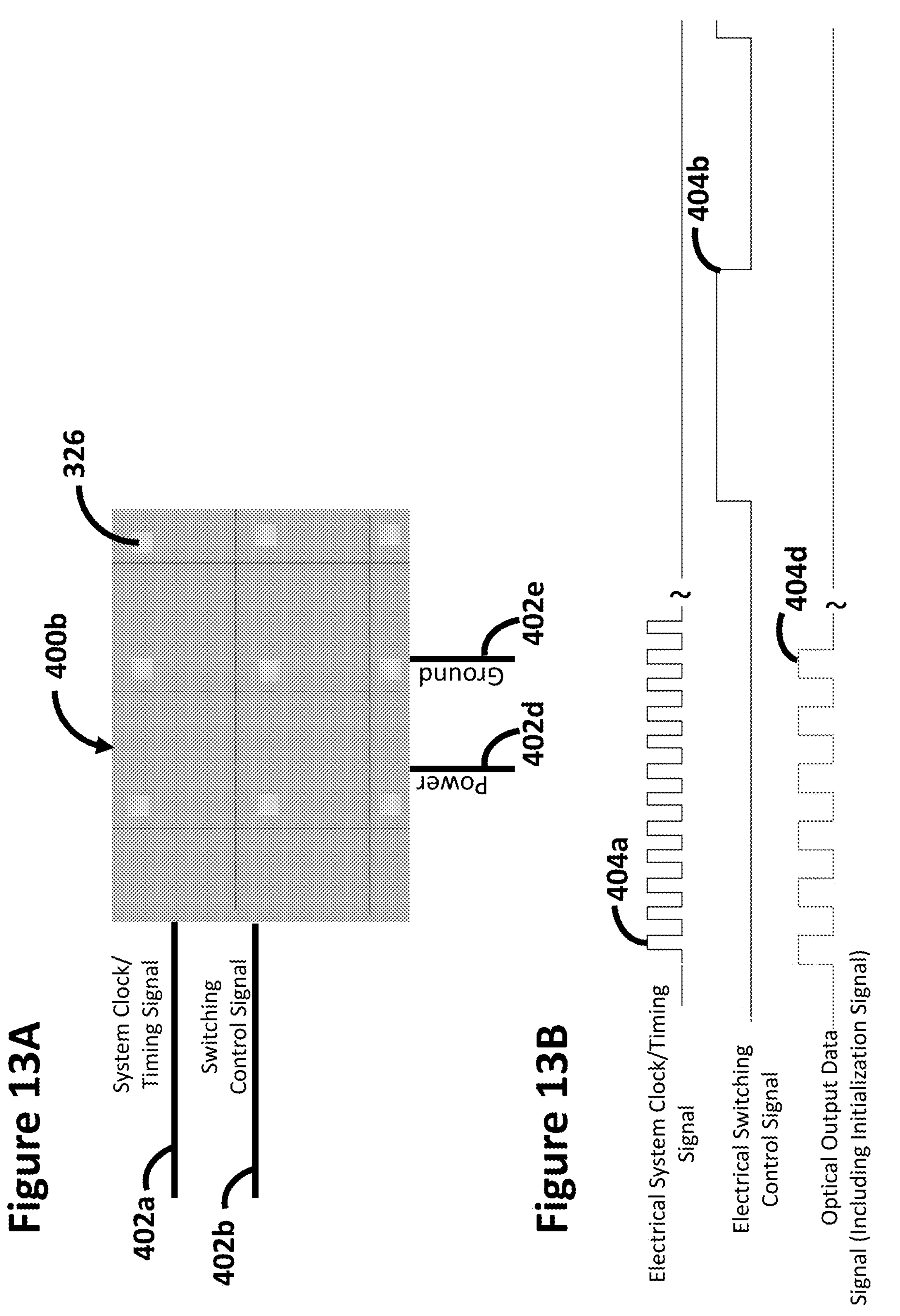
FIG. 13A is a plan view of another microfluidic device, particularly illustrating various electrical signals input into the other microfluidic device.
FIG. 13B are timing diagrams of electrical signals input into the microfluidic device of FIG. 13A.

With reference to FIGS. 13A and 13B, another embodiment of a microfluidic device 400*b* is similar to the microfluidic device 400*a* illustrated in FIGS. 12A and 12B in that each of the control circuits 330 is configured to receive the system clock/timing signal 404*a* on a first electrically conductive lead 402*a*, and the switching control signal 404*b* on a second electrically conductive lead 402*b*. However, the microfluidic device 400*b* differs from the microfluidic device 400*a* in that each control circuit 330 of the microfluidic device 400*b* does not receive an initialization pulse 404*c* via a third electrical lead. Instead, each of the control circuits 330 is configured to receive an initialization signal (not shown) from the corresponding photosensitive element 326. That is, instead of electrically receiving the initialization pulse 404*c*, the initialization signal is incorporated into the modulated light beam 354 (or beamlet 356), in which case, the output data signal 404*d* generated by each photosensitive element 326 will initially include an initialization signal (not shown) that is received by the respective control circuit 330. The initialization signal can be, e.g., a special data sequence or signature (e.g., 0101101010110). Once the respective control circuit 330 receives the output data signal 404*d* having this special data sequence from the respective photosensitive element 326, the control circuit 330 will be informed to begin receiving and storing the switching instructions embodied in the next output data signal 404*d* generated by the respective photosensitive element 326 for storage within the respective register 332 at the frequency of the system clock/timing signal 404*a* (or multiple integer thereof) until the register 332 is full.

Figures 14A, 14B:
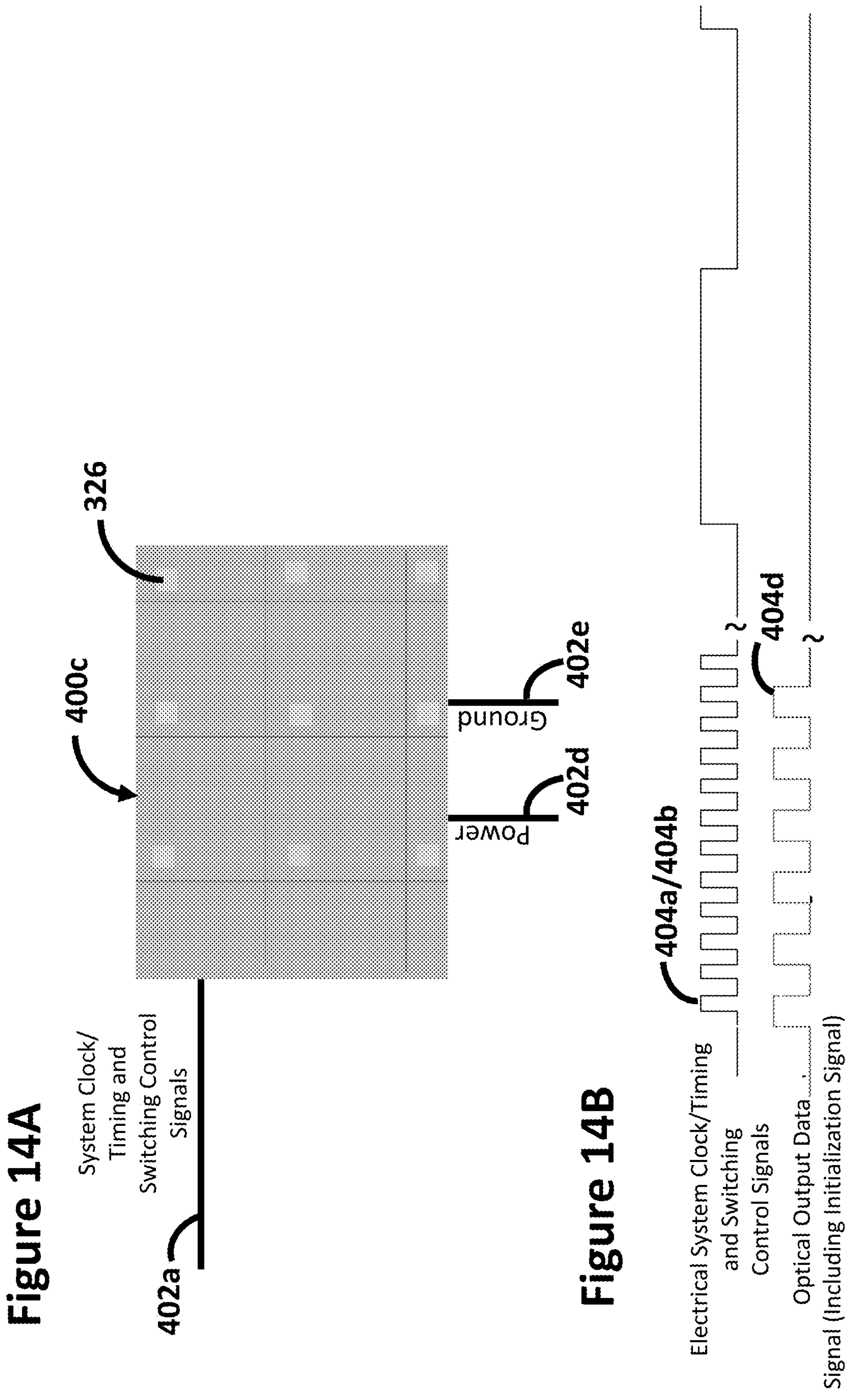
FIG. 14A is a plan view of still another microfluidic device, particularly illustrating various electrical signals input into the microfluidic device.
FIG. 14B are timing diagrams of electrical signals input into the microfluidic device of FIG. 14A.

With reference to FIGS. 14A and 14B, still another embodiment of a microfluidic device 400*c* is similar to the microfluidic device 400*b* illustrated in FIGS. 12A and 12B in that each of the control circuits 330 is configured to receive the system clock/timing signal 404*a* on a first electrically conductive lead 402*a*, and the initialization signal in the output data signal 404*d* from the corresponding photosensitive element 326. However, the microfluidic device 400*c* differs from the microfluidic device 400*a* in that each control circuit 330 of the microfluidic device 400*c* does not receive the switching control signal 404*b* via a second electrically conductive lead 402*b*. Rather, the control circuit 330 is configured to receive the switching control signal 404*b* on the same electrically conductive lead 402*a* on which the respective control circuit 330 receives the system clock/timing signal 404*a*. In this case, the receipt of the system clock/timing signal 404*a* and switching control signal 404*b* by each control circuit 330 may be time-multiplexed in that the respective control circuit 330 may first receive the system clock/timing signal 404*a* on the first electrically conductive lead 402*a* to synchronize the storage within the memory unit 332 of the output data signal 404*d* (comprising the switching instructions to control the respective switching mechanism 324) generated by the photosensitive element 326 in response to the modulated light beam 354 (or beamlet 356), and then may receive the switching control signal 404*b* (e.g., by slowing down the system clock/timing signal 404*a*) on the first electrically conductive lead 402*a* to synchronize the switching of the respective switch mechanism 324 between the ON state and OFF state in accordance with the stored output data signal 404*d*.

Alternatively, each control circuit 330 derives the switching control signal 404*b* from the system clock/timing signal 404*a* received on the first electrically conductive lead 402*a*. For example, each control circuit 330 may consider every nth pulse of the system clock/timing signal 404*a* as the switching control signal 404*b*, such that each control circuit 330 retrieves each instruction from the respective register 332 at every nth pulse of the system clock/timing signal 404*a* to control the respective switch mechanism 324. In another alternative embodiment, each control circuit 330 is configured to receive the switching control signal 404*b* on the same electrically conductive lead 402*d* on which the microfluidic device 100*c* receives power. In this case, a "one-wire serial," "I2C," "SPI," or "Microwire" or "Bit Banging" type approach or carrier signal on top of power signal can be used. In an embodiment, the modulated data is sampled on the rising or falling edges of the system clock/timing signal 404*a*. A separate circuit is used to demodulate the data riding on top of the power line so that the original data is presented to the control circuit 330 and/or memory unit 332.

Figure 15A:
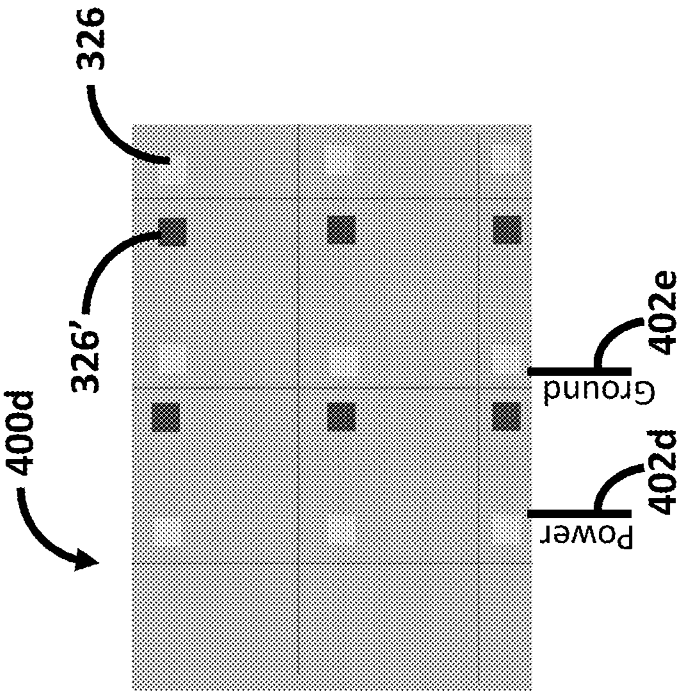
FIG. 15A is a plan view of yet another microfluidic device, particularly illustrating various electrical signals input into the microfluidic device.
Figure 15B:
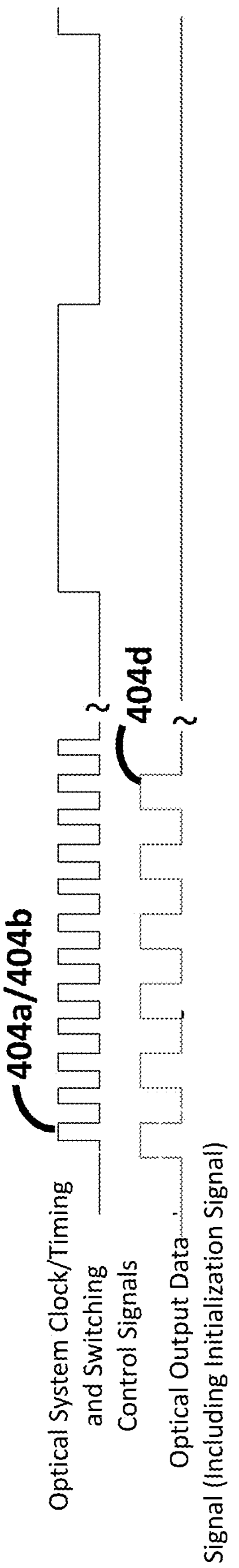
FIG. 15B are timing diagrams of electrical signals input into the microfluidic device of FIG. 15A.

With reference to FIGS. 15A and 15B, yet another embodiment of a microfluidic device 400*d* is similar to the microfluidic device 400*c* illustrated in FIGS. 14A and 14B in that each of the control circuits 330 is configured to receive the system clock/timing signal 404*a*, the switching control signal 404*b*, as well as the initialization signal 404*c* and the output data signal 404*d* from the corresponding photosensitive element 326. However, the microfluidic device 400*d* differs from the microfluidic device 400*c* in that each control circuit 330 of the microfluidic device 400*d* does not receive the system clock/timing signal 404*a* and the switching control signal 404*b* on any electrically conductive lead. Instead, each of the control circuits 330 is configured to receive the system clock/timing signal 404*a* and switching control signal 404*b* from an additional photosensitive element 326' (shown in FIG. 15A). That is, the system clock/timing signal 404*a* and switching control signal 404*b* are incorporated into the modulated light beam 354 (or beamlet 356), in which case, the receipt of the system clock/timing signal 404*a* and switching control signal 404*b* by each control circuit 330 may be time-multiplexed. That is, each control circuit 330 may first receive the initialization signal from the photosensitive element 326 to inform the control circuit 330 to begin receiving and storing the switching instructions embodied in the output data signal 404*d* generated by the respective photosensitive element 326 for storage within the respective register 332 at the frequency of the system clock/timing signal 404*a* (or multiple integer thereof) until the register 332 is full. After first receiving the initialization signal, each control circuit 330 may then receive the system clock/timing signal 404*a* from the additional photosensitive element 326' to synchronize the storage within the memory unit 332 of the output data signal 404*d* (comprising the switching instructions to control the respective switching mechanism 324) generated by the photosensitive element 326 in response to the modulated light beam 354 (or beamlet 356). Each control circuit 330 may then receive the switching control signal 404*b* from the additional photosensitive element 326' to synchronize the switching of the respective switch mechanism 324 between the ON state and OFF state in accordance with the stored output data signal 404*d*.

In an alternative embodiment, the initialization signal may be generated by the additional photosensitive element 326'. In this case, the receipt of the system clock/timing signal 404*a*, switching control signal 404*b*, and initialization signal 404*c* by each control circuit 330 may be time-multiplexed in that the respective control circuit 330 may first receive the initialization signal from the additional photosensitive element 326' to inform the control circuit 330 to begin receiving and storing the switching instructions embodied in the output data signal 404*d* generated by the respective photosensitive element 326 for storage within the respective register 332 at the frequency of the system clock/timing signal 404*a* (or multiple integer thereof) until the register 332 is full. The respective control circuit 330 may then receive the system clock/timing signal 404*a* from the additional photosensitive element 326' to synchronize the storage within the memory unit 332 of the output data signal 404*d* (comprising the switching instructions to control the respective switching mechanism 324) generated by the photosensitive element 326 in response to the modulated light beam 354 (or beamlet 356). The respective control circuit 330 may then receive the switching control signal 404*b* from the additional photosensitive element 326' to synchronize the switching of the respective switch mechanism 324 between the ON state and OFF state in accordance with the stored output data signal 404*d*. In an alternative embodiment, the initialization signal may be incorporated into the output data signal 404*d* generated by the respective photosensitive element 326 as described above with respect to the microfluidic device 400*c* of FIGS. 14A and 14B. In some embodiments having a photosensitive element 326 and an additional photosensitive element 326', the photosensitive element 326 and additional photosensitive element 326' are responsive to different wavelengths and capable of concurrently receiving two different signals from a single modulated light beam 354 (or beamlet 356) having the two different signals that are wavelength multiplexed at wavelengths corresponding to the respective photosensitive elements 326, 326'. In other embodiments having a photosensitive element 326 and an additional photosensitive element 326', the photosensitive element 326 and additional photosensitive element 326' are spatially separated enough to be able to each receive a different signal from two different respective light beamlets 356. In either of the above cases, for example, the signals received by either or both of the photosensitive elements 326, 326' may also be time multiplexed as described above, e.g. the respective control circuit 330 may first receive the initialization signal from the additional photosensitive element 326', and then the respective control circuit 330 may receive the system clock/timing signal 404*a* from the additional photosensitive element 326'.

Figure 16:
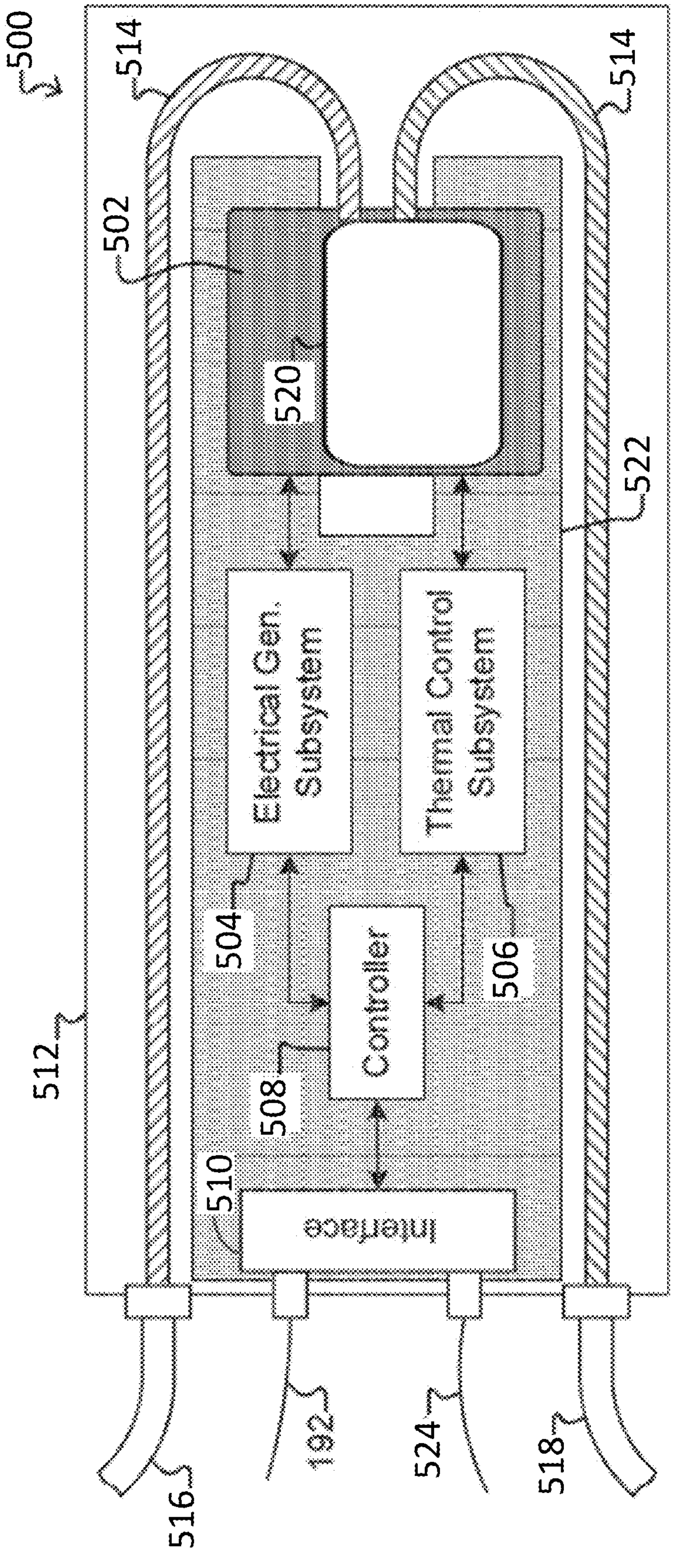
FIG. 16 is a plan view of a nest for use in the microfluidic system of FIG. 1.

Referring now to FIG. 16, the support structure ("nest") 500 is configured to hold the microfluidic device 100 (not shown in FIG. 16) or any variations of the microfluidic device 100 (e.g., the microfluidic devices 230, 250, and 280, 290, 300, 400*a*-400*d*) described herein. The nest 500 comprises a socket 502 capable of interfacing with the microfluidic device 100 and providing electrical connections from the power source 192 (shown in FIG. 1) to the microfluidic device 100. For example, the nest 500 may comprise electrically conductive nest contacts (not shown) that are configured to contact corresponding ones of electrically conductive device contacts (not shown) located on the microfluidic device 100 when the microfluidic device 100 is mounted on the nest 500. The electrically conductive device contacts of the microfluidic device 100 may be electrically connected with corresponding ones of the electrically conductive device leads located within the circuit substrate 310.

The nest 500 further comprises an integrated electrical signal generation subsystem 504 configured to supply a biasing voltage to the socket 502, such that the biasing voltage is applied across the electrodes 314, 316 (shown in FIG. 3B) of the microfluidic device 100 when it is being held by the socket 502. Thus, the electrical signal generation subsystem 504 can be part of the power source 192. The ability to apply a biasing voltage to microfluidic device 100 does not mean that a biasing voltage will be applied at all times when the microfluidic device 100 is held by the socket 502. Rather, in most cases, the biasing voltage will be applied intermittently, e.g., only as needed to facilitate the generation of electrokinetic forces, such as dielectrophoresis or electrowetting, in the microfluidic device 100.

The nest 500 can include a printed circuit board assembly (PCBA) 522 in which the socket 502 and electrical signal generation subsystem 504 is mounted and electrically integrated. Typically, the electrical signal generation subsystem 504 may include a waveform generator (not shown), an oscilloscope (not shown) and/or a waveform amplification circuit (not shown) configured to amplify a waveform received from the waveform generator. The oscilloscope, if present, can be configured to measure the waveform supplied to the microfluidic device 100 held by the socket 502. In certain embodiments, the oscilloscope measures the waveform at a location proximal to the microfluidic device 100 (and distal to the waveform generator), thus ensuring greater accuracy in measuring the waveform actually applied to the device. Data obtained from the oscilloscope measurement can be, for example, provided as feedback to the waveform generator, and the waveform generator can be configured to adjust its output based on such feedback.

An example of a suitable combined waveform generator and oscilloscope comprises a Red Pitaya™ waveform generator/oscilloscope unit ("Red Pitaya unit"). A waveform amplification circuit amplifies the waveform generated by the Red Pitaya unit and passes the amplified voltage to the microfluidic device 100. The Red Pitaya unit may be configured to measure the amplified voltage at the microfluidic device 100 and then adjust its own output voltage as needed such that the measured voltage at the microfluidic device 100 is the desired value. The waveform amplification circuit may have a +6.5V to −6.5V power supply generated by a pair of DC-DC converters mounted on the PCBA 322, resulting in a signal of up to 13 Vpp at the microfluidic device 100.

The nest 500 can also comprise a controller 508, such as a microprocessor, used to sense and/or control the electrical signal generation subsystem 504. Examples of suitable microprocessors include the Arduino™ microprocessors, such as the Arduino Nano™. The controller 508 may be used to perform functions and analysis or may communicate with the control and monitoring equipment 152 (shown in FIG. 1) via an interface 510 (e.g., a plug or connector) to perform functions and analysis.

In the configuration where the control circuits 330 of the microfluidic device 100 receive the system clock/timing signal and receive or derive the switching control signal via electrically conductive lead(s) (e.g., the system clock/timing signal 404*a* and switching control signal 404*b* in the microfluidic devices 400*a*-400*c* of FIGS. 12A-12B, 13A-13B, and 14A-14B), the controller 508 may transmit the system clock/timing signal and, if the switching control signal is not derived from the system clock/timing signal, the switching control signal also, via the electrically conductive contact(s) of the nest 500 to the electrically conductive lead(s) of the microfluidic device 100, such that the control circuits 330 of the microfluidic device 100 can receive the system clock/timing signal via the electrically conductive lead(s). In the configuration where the control circuits 330 of the microfluidic device also receives the initialization pulse via electrically conductive lead(s) (e.g., the initialization pulse 404*c* in the microfluidic device 400*a* of FIGS. 12A-12B), the controller 508 may also transmit the initialization pulse via the electrically conductive contact(s) of the nest 500 to the electrically conductive lead(s) of the microfluidic device 100, such that the control circuits 330 of the microfluidic device 100 can receive the initialization pulse via the electrically conductive lead(s).

The nest 500 may further comprise a thermal control subsystem 506 configured to regulate the temperature of microfluidic device 100 held by the nest 500. For example, the thermal control subsystem 506 can include a Peltier thermoelectric device (not shown) and a cooling unit (not shown). The Peltier thermoelectric device can have a first surface configured to interface with at least one surface of the microfluidic device 100. The cooling unit can be, for example, a cooling block (not shown), such as a liquid-cooled aluminum block. A second surface of the Peltier thermoelectric device (e.g., a surface opposite the first surface) can be configured to interface with a surface of such a cooling block. The cooling block can be connected to a fluidic path 514 configured to circulate cooled fluid through the cooling block. In the embodiment illustrated in FIG. 16, the nest 500 comprises an inlet 516 and an outlet 518 to receive cooled fluid from an external reservoir (not shown), introduce the cooled fluid into the fluidic path 514 and through the cooling block, and then return the cooled fluid to the external reservoir. In some embodiments, the Peltier thermoelectric device, the cooling unit, and/or the fluidic path 514 can be mounted on a casing 512 of the nest 500.

In some embodiments, the thermal control subsystem 506 is configured to regulate the temperature of the Peltier thermoelectric device so as to achieve a target temperature for the microfluidic device 100. Temperature regulation of the Peltier thermoelectric device can be achieved, for example, by a thermoelectric power supply, such as a Pololu™ thermoelectric power supply (Pololu Robotics and Electronics Corp.). The thermal control subsystem 506 can include a feedback circuit, such as a temperature value provided by an analog circuit. Alternatively, the feedback circuit can be provided by a digital circuit. The feedback circuit may be, e.g., an analog voltage divider circuit (not shown) that includes a resistor (e.g., with resistance 1 kOhm+/−0.1%, temperature coefficient+/−0.02 ppm/CO) and an NTC thermistor (e.g., with nominal resistance 1 kOhm+/−0.01%). In some instances, the thermal control subsystem 506 measures the voltage from the feedback circuit and then uses the calculated temperature value as input to an on-board PID control loop algorithm. Output from the PID control loop algorithm can drive, for example, both a directional and a pulse-width-modulated signal pin on a Pololu™ motor drive (not shown) to actuate the thermoelectric power supply, thereby controlling the Peltier thermoelectric device.

The nest 500 may further comprise a serial port 524 that allows the microprocessor of the controller 508 to communicate with the control and monitoring equipment 152 via the interface 510. In addition, the microprocessor of the controller 508 can communicate (e.g., via a Plink tool (not shown)) with the electrical signal generation subsystem 504 and thermal control subsystem 506. Thus, via the combination of the controller 508, the interface 510, and the serial port 524, the electrical signal generation subsystem 504 and the thermal control subsystem 506 can communicate with the control and monitoring equipment 152.

Referring back to FIG. 1, the electrical power source 192 provides power to various control modules of the microfluidic control system 150 and the microfluidic device 100 or any variations of the microfluidic device 100 (e.g., the microfluidic devices 230, 250, and 280, 290, 300, 400*a*-400*d*) described herein, providing biasing voltages or currents as needed. The electrical power source 192 can, for example, comprise one or more alternating current (AC) and/or direct current (DC) voltage or current sources. The media source 178 (e.g., a container, reservoir, or the like) can comprise multiple sections or containers, each for holding a different fluidic medium 180. Thus, the media source 178 can be a device that is outside of and separate from the microfluidic device 100, as illustrated in FIG. 1. Alternatively, the media source 178 can be located in whole or in part inside the chamber 102 of the microfluidic device 100. For example, the media source 178 can comprise reservoirs that are part of the microfluidic device 100.

The light emitting and/or imaging device 148 captures images inside the microfluidic circuit 120 of the microfluidic device 100 or any variations of the microfluidic device 100 (e.g., the microfluidic devices 230, 250, and 280, 290, 300, 400*a*-400*d*) described herein. For example, such light emitting and/or imaging device 148 can direct stimulating radiation and/or light beams into the microfluidic circuit 120 and collect radiation and/or light beams reflected or emitted from the microfluidic circuit 120 (or micro-objects contained therein). The emitted light beams may be in the visible spectrum and may, e.g., include fluorescent emissions. The reflected light beams may include reflected emissions originating from an LED or a wide spectrum lamp, such as a mercury lamp (e.g. a high-pressure mercury lamp) or a Xenon arc lamp.

Figure 17:
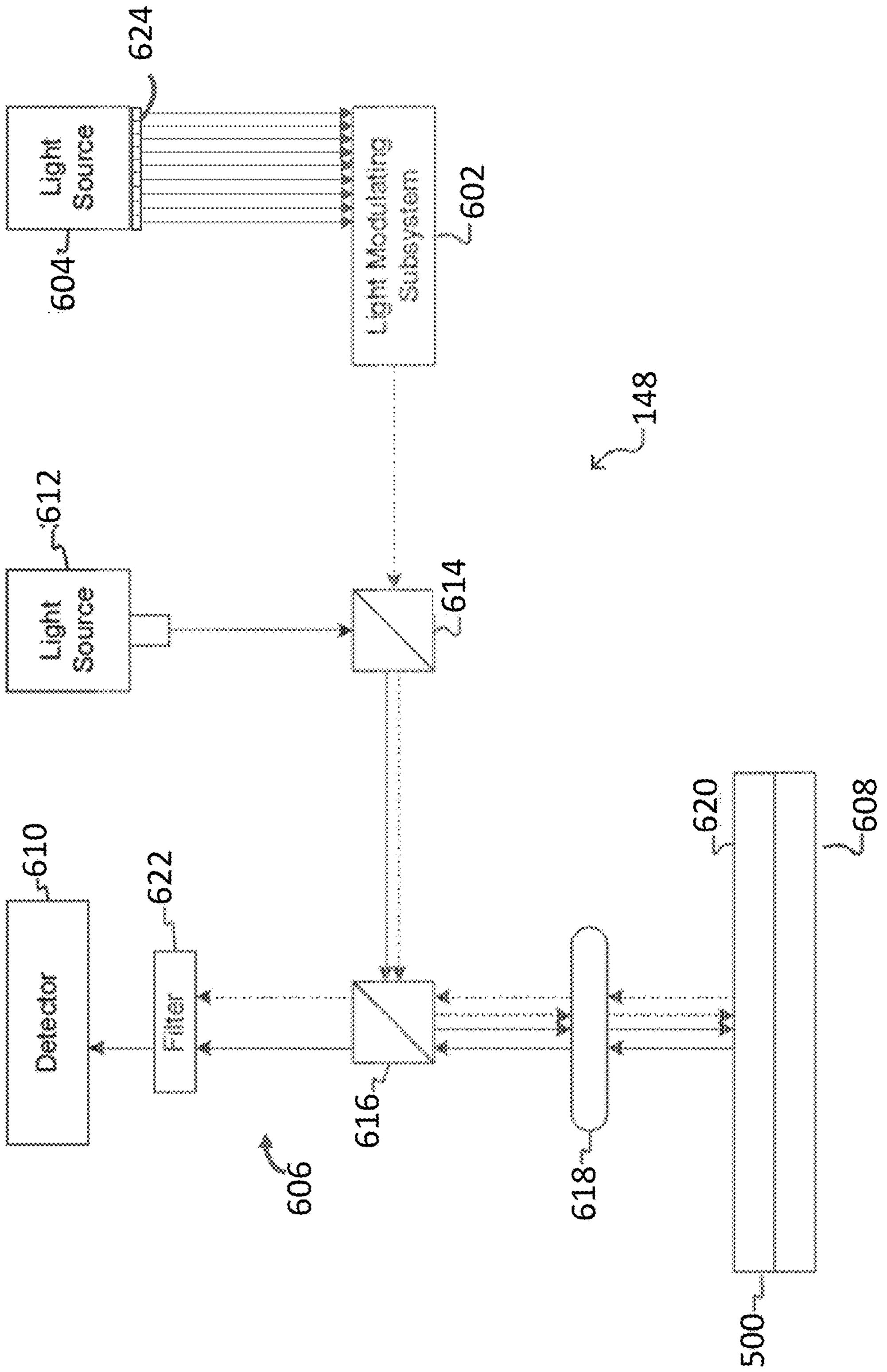
FIG. 17 is a block diagram of an imaging device for use in the microfluidic system of FIG. 1.

As one example, and with reference to FIG. 17, the light emitting and/or imaging device 148 comprises a light modulating subsystem 602, light source 604, and a microscope 606, which may or may not include an eyepiece. The representation of the optical system shown in FIG. 17 is a schematic representation only, and the light emitting and/or imaging device 148 may include additional filters, notch filters, lenses and the like.

The light modulating subsystem 602 is configured to modulate the light emitted from the light source 604 with the switching instructions for controlling the switch mechanisms 324, such as in the manner described above. The light modulating subsystem 602 can include a digital mirror device (DMD) or a micro-shutter array system (MSA), either of which can be configured to receive light from a light source 608 and transmit a subset of the received light into an optical train of the light emitting and/or imaging device 148. Alternatively, the light modulating subsystem 602 can include a device that produces its own light (and thus dispenses with the need for a light source 608), such as an organic light emitting diode display (OLED), a liquid crystal on silicon (LCOS) device, a ferroelectric liquid crystal on silicon device (FLCOS), or a transmissive liquid crystal display (LCD). The light modulating subsystem 602 can be, for example, a projector. Thus, the light modulating subsystem 602 can be capable of emitting both structured and unstructured light.

The nest 500 and light modulating subsystem 602 can be individually configured to be mounted on the microscope 606. The microscope 606 can be, for example, a standard research-grade light microscope or fluorescence microscope. Thus, the nest 500 can be configured to be mounted on a stage 608 of the microscope 606 and/or the light modulating subsystem 602 can be configured to mount on a port of microscope 606. In other embodiments, the nest 500 and the light modulating subsystem 602 described herein can be integral components of microscope 606.

In certain embodiments, the microscope 606 can further include one or more detectors 610. The detector(s) 610 can include an eye piece, a charge-coupled device (CCD), a camera (e.g., a digital camera), or any combination thereof. If at least two detectors 610 are present, one detector can be, for example, a fast-frame-rate camera while the other detector can be a high sensitivity camera. Furthermore, the microscope 606 can include an optical train configured to receive reflected and/or emitted light from the microfluidic device 100 and focus at least a portion of the reflected and/or emitted light on the detector(s) 610. The optical train of the microscope 606 can also include different tube lenses (not shown) for the different detectors, such that the final magnification on each detector can be different.

In certain embodiments, the light emitting and/or imaging device 148 is configured to use at least two light sources. For example, the light source 604, as the first light source, can be used to produce structured light (e.g., via the light modulating subsystem 602) and a second light source 612 can be used to provide unstructured light. The first light source 604 can produce structured light for optically-actuated electrokinesis and/or fluorescent excitation, and the second light source 612 can be used to provide bright field illumination. The optical train of the microscope 606 can be configured to (1) receive structured light from the light modulating subsystem 602 and focus the structured light on at least a first region in a microfluidic device, such as an optically-actuated electrokinetic device, when the device is being held by the nest 500, and (2) receive reflected and/or emitted light from the microfluidic device and focus at least a portion of such reflected and/or emitted light onto detector 610.

The optical train of the microscope 606 can be further configured to receive unstructured light from the second light source 612 and focus the unstructured light on at least a second region of the microfluidic device 100 when the microfluidic device 100 is held by the nest 500. In certain embodiments, the first and second regions of the microfluidic device 100 can be overlapping regions. For example, the first region can be a subset of the second region. In other embodiments, the second light source 612 may additionally or alternatively include a laser, which may have any suitable wavelength of light. When the second light source 612 includes one or more light source(s) for brightfield and/or fluorescent excitation, as well as laser illumination, the physical arrangement of the light source(s) may vary from that shown in FIG. 17, and the laser illumination may be introduced at any suitable physical location within the optical system. The schematic locations of light source 612 and light source 604/light modulating subsystem 602 may be interchanged as well.

In FIG. 17, the first light source 604 is shown supplying light to a light modulating subsystem 602, which provides structured light to the optical train of the microscope 606. The second light source 612 is shown providing unstructured light to the optical train via a beam splitter 614. Structured light from the light modulating subsystem 602 and unstructured light from the second light source 612 travel from the beam splitter 614 through the optical train together to reach a second beam splitter (or dichroic filter 616, depending on the light provided by the light modulating subsystem 602), where the light gets reflected down through an objective 618 to a sample plane 620. Reflected and/or emitted light from the sample plane 620 then travels back up through the objective 618, through the beam splitter and/or dichroic filter 616, and to a dichroic filter 622. Only a fraction of the light reaching dichroic filter 622 passes through and reaches the detector(s) 610.

In some embodiments, the second light source 612 emits blue light. With an appropriate dichroic filter 622, blue light reflected from the sample plane 620 is able to pass through dichroic filter 622 and reach the detector 610. In contrast, structured light coming from the light modulating subsystem 602 gets reflected from the sample plane 620, but does not pass through the dichroic filter 622. In this example, the dichroic filter 622 is filtering out visible light having a wavelength longer than 495 nm. Such filtering out of the light from the light modulating subsystem 602 would only be complete (as shown) if the light emitted from the light modulating subsystem 602 did not include any wavelengths shorter than 495 nm. In practice, if the light coming from the light modulating subsystem 602 includes wavelengths shorter than 495 nm (e.g., blue wavelengths), then some of the light from the light modulating subsystem 602 would pass through filter 622 to reach the detector(s) 610. In such an embodiment, the filter 622 acts to change the balance between the amount of light that reaches the detector(s) 610 from the first light source 604 and the second light source 612. This can be beneficial if the first light source 604 is significantly stronger than the second light source 612. In other embodiments, the second light source 612 can emit red light, and the dichroic filter 622 can filter out visible light other than red light (e.g., visible light having a wavelength shorter than 650 nm).

Thus, it can be appreciated that the light emitting and/or imaging device 148 serves as an imaging device and also serves as a light emitting device (and thus is referenced herein as a light emitting and/or imaging device 148). As used herein, light emitting and/or imaging device 148 includes embodiments in which both light emitting devices and imaging devices are present (either present separately or present together as a unit) and embodiments in which either a light emitting device or an imaging device is present (but not both). In some cases, context may indicate which The light emitting and/or imaging device 148 for illuminating selected regions of the microfluidic device 100 with a modulated light beam (i.e., structured light) from the light modulating subsystem 602, thereby controlling the switch mechanisms 324 (e.g., phototransistors) to select and move micro-objects (not shown in FIG. 1) and/or droplets of medium (not shown in FIG. 1) in the flow path 106 and/or sequestration pens 124, 126, 128, 130. As will be described in further detail below, the light emitting and/or imaging device 148 and nest 500 (and thus the microfluidic device 100 in the nest 500) may be moved relative to each other, such that the light emitting and/or imaging device 148 may be selectively positioned at each of a plurality of fields of view (FOVs) of the surface 312 of the circuit substrate 310 (illustrated in FIG. 3B) in order to control the switch mechanism 324 that are within the selectively positioned FOV. The light emitting and/or imaging device 148 may comprise light emitting elements 624 (e.g., light emitting diodes LEDs), each of which is configured to direct a respective modulated light beamlet 356 onto a corresponding one of the photosensitive elements 326 located within the selectively positioned FOV. Such light emitting elements 624 can, e.g., be located between the light source 604 and the light modulating subsystem 602. In this case, the light emitting elements 624 transmit light beamlets 356 to the light modulating subsystem 602, which modulate the light beamlets 356 with instructions for controlling the switch mechanisms 324 associated with the respective photosensitive elements 326 onto which the light beamlets 356 are directed. Thus, the light emitting elements 624 may simultaneously direct the modulated light beamlets 356 onto the respective photosensitive elements 326 within the FOV.

Referring back to FIG. 1, the tilting device 190 is configured to rotate the microfluidic device 100, or any variations of the microfluidic device 100 (e.g., the microfluidic devices 230, 250, and 280, 290, 300, 400*a*-400*d*) described herein, about one or more axes of rotation. In some embodiments, the tilting device 190 is configured to support and/or hold the chamber 102 comprising the microfluidic circuit 120 about at least one axis such that the microfluidic device 100 (and thus the microfluidic circuit 120) can be held in a level orientation (i.e. at 0° relative to x- and y-axes), a vertical orientation (i.e. at 90° relative to the x-axis and/or the y-axis), or any orientation therebetween. The orientation of the microfluidic device 100 (and the microfluidic circuit 120) relative to an axis is referred to herein as the "tilt" of the microfluidic device 100 (and the microfluidic circuit 120). For example, the tilting device 190 can tilt the microfluidic device 100 at 0.1°, 0.2°, 0.3°, 0.4°, 0.5°, 0.6°, 0.7°, 0.8°, 0.9°, 1°, 2°, 3°, 4°, 5°, 10°, 15°, 20°, 25°, 30°, 35°, 40°, 45°, 50°, 55°, 60°, 65°, 70°, 75°, 80°, 90° relative to the x-axis or any degree therebetween. The level orientation (and thus the x- and y-axes) is defined as normal to a vertical axis defined by the force of gravity. The tilting device can also tilt the microfluidic device 100 (and the microfluidic circuit 120) to any degree greater than 90° relative to the x-axis and/or y-axis, or tilt the microfluidic device 100 (and the microfluidic circuit 120) 180° relative to the x-axis or the y-axis in order to fully invert the microfluidic device 100 (and the microfluidic circuit 120). Similarly, in some embodiments, the tilting device 190 tilts the microfluidic device 100 (and the microfluidic circuit 120) about an axis of rotation defined by flow path 106 or some other portion of microfluidic circuit 120.

In some instances, the microfluidic device 100 is tilted into a vertical orientation such that the flow path 106 is positioned above or below one or more sequestration pens. The term "above" as used herein denotes that the flow path 106 is positioned higher than the one or more sequestration pens on a vertical axis defined by the force of gravity (i.e. an object in a sequestration pen below a flow path 106 would have a lower gravitational potential energy than an object in the flow path). The term "below" as used herein denotes that the flow path 106 is positioned lower than the one or more sequestration pens on a vertical axis defined by the force of gravity (i.e. an object in a sequestration pen above a flow path 106 would have a higher gravitational potential energy than an object in the flow path).

In some instances, the tilting device 190 tilts the microfluidic device 100 about an axis that is parallel to the flow path 106. Moreover, the microfluidic device 100 can be tilted to an angle of less than 90° such that the flow path 106 is located above or below one or more sequestration pens without being located directly above or below the sequestration pens. In other instances, the tilting device 190 tilts the microfluidic device 100 about an axis perpendicular to the flow path 106. In still other instances, the tilting device 190 tilts the microfluidic device 100 about an axis that is neither parallel nor perpendicular to the flow path 106.

Referring still to FIG. 1, the control and monitoring equipment 152 comprises a master controller 154 comprising a media module 160 for controlling the media source 178, a motive module 162 for controlling movement and/or selection of micro-objects (not shown) and/or medium (e.g., droplets of medium) in the microfluidic circuit 120 of the microfluidic device 100, an imaging module 164 for controlling the light emitting and/or imaging device 148 for capturing images (e.g., digital images) of the microfluidic device 100, and a tilting module 166 for controlling a tilting device 190 for alternatively controlling movement and/or selection of micro-objects (not shown) and/or medium (e.g., droplets of medium) in the microfluidic circuit 120 of the microfluidic device 100. The control equipment 152 can also include other modules 168 for controlling, monitoring, or performing other functions with respect to the microfluidic device 100. As shown, the equipment 152 can further include a display device 170 and an input/output device 172.

Any of the master controller 154, media module 160, motive module 162, imaging module 164, tilting module 166, and/or other modules 168 may comprise a control module 156 and a digital memory 158 (only illustrated in the master controller 154 in FIG. 1), e.g., a digital processor configured to operate in accordance with machine executable instructions (e.g., software, firmware, source code, or the like) stored as non-transitory data or signals in the memory 158. Alternatively, or in addition, the control module 156 can comprise hardwired digital circuitry and/or analog circuitry. Thus, functions, processes acts, actions, or steps of a process discussed herein as being performed with respect to the microfluidic device 100 or any other microfluidic apparatus can be performed by any one or more of the master controller 154, media module 160, motive module 162, imaging module 164, tilting module 166, and/or other modules 168 configured as discussed above. Similarly, the master controller 154, media module 160, motive module 162, imaging module 164, tilting module 166, and/or other modules 168 may be communicatively coupled to transmit and receive data used in any function, process, act, action or step discussed herein.

The master controller 154 can, among other things, assist the electrical signal generation subsystem 504 of the nest 500 (shown in FIG. 16) by performing scaling calculations for output voltage adjustments. A Graphical User Interface (GUI) (not shown) provided via the display device 170 coupled to the external master controller 154, can be configured to plot temperature and waveform data obtained from the thermal control subsystem 506 and the electrical signal generation subsystem 504, respectively. Alternatively, or in addition, the GUI can allow for updates to the controller 508, the thermal control subsystem 506, and the electrical signal generation subsystem 504 of the nest 500 (shown in FIG. 16).

The media module 160 controls the media source 178. For example, the media module 160 can control the media source 178 to input a selected fluidic medium 180 into the chamber 102 (e.g., through the inlet port 107) of the microfluidic device 100. The media module 160 can also control removal of media 180 from the chamber 102 (e.g., through an outlet port (not shown)). One or more media can thus be selectively input into and removed from the microfluidic circuit 120. The media module 160 can also control the flow of fluidic medium 180 in the flow path 106 inside the microfluidic circuit 120. For example, in some embodiments, the media module 160 stops the flow of media 180 in the flow path 106 and through the chamber 102 prior to the tilting module 166 causing the tilting device 190 to tilt the microfluidic device 100 to a desired angle of incline.

The imaging module 164 can control the light emitting and/or imaging device 148. For example, the imaging module 164 can receive and process image data from the light emitting and/or imaging device 148. Image data from the light emitting and/or imaging device 148 can comprise any type of information captured by the light emitting and/or imaging device 148 (e.g., the presence or absence of micro-objects, droplets of medium, accumulation of label, such as fluorescent label, etc.). Using the information captured by the light emitting and/or imaging device 148, the imaging module 164 can further calculate the position of objects (e.g., micro-objects, droplets of medium) and/or the rate of motion of such objects within the microfluidic device 100.

The tilting module 166 can control the tilting motions of tilting device 190. Alternatively, or in addition, the tilting module 166 can control the tilting rate and timing to optimize transfer of micro-objects to the one or more sequestration pens 124, 126, 138, 130 via gravitational forces. The tilting module 166 is communicatively coupled with the imaging module 164 to receive data describing the motion of micro-objects and/or droplets of medium in the microfluidic circuit 120. Using this data, the tilting module 166 may adjust the tilt of the microfluidic circuit 120 in order to adjust the rate at which micro-objects and/or droplets of medium move in the microfluidic circuit 120. The tilting module 166 may also use this data to iteratively adjust the position of a micro-object and/or droplet of medium in the microfluidic circuit 120.

The motive module 162 can be configured to control selection, trapping, and movement of micro-objects (not shown in FIG. 1) in the microfluidic circuit 120. As discussed above with respect to FIGS. 3A-3E, the chamber 102 comprises a dielectrophoresis (DEP) configuration (not shown in FIG. 1), and the motive module 162 can control the activation of DEP electrodes 320 and/or switch mechanisms 324 (e.g., phototransistors) to select and move micro-objects (not shown in FIG. 1) and/or droplets of medium (not shown in FIG. 1) in the flow path 106 and/or sequestration pens 124, 126, 128, 130. The motive module 162 accomplishes this by advantageously generating and transmitting instructions via the modulated light beam of the light emitting and/or imaging device 148 that are at least temporarily stored in the microfluidic device or devices 100 (e.g., in the memory devices 332), which are subsequently used by the control circuit 330 to control the switch mechanism 324 in a manner that selects and moves the micro-objects and/or droplets of medium within the respective microfluid device(s) 100, as described above.

Thus, as briefly discussed above, dielectrophoretic (DEP) forces are applied across the fluidic medium 180 (e.g., in the flow path and/or in the sequestration pens) in the microfluidic device 100 via the DEP electrodes 320 (shown in FIG. 3B) to manipulate, transport, separate and sort micro-objects located therein. For example, in some embodiments, DEP forces are applied to one or more portions of microfluidic circuit 120 of the microfluidic device 100 in order to transfer a single micro-object from the flow path 106 into a desired one of the microfluidic sequestration pens 124, 126, 128, 130. In some embodiments, DEP forces are used to prevent a micro-object within one of the microfluidic sequestration pens 124, 126, 128, 130 from leaving the sequestration pen 124, 126, 128, 130. Further, in some embodiments, DEP forces are used to selectively remove a micro-object from one of the microfluidic sequestration pens 124, 126, 128, 130 that was previously collected.

In some embodiments, the DEP forces comprise optoelectronic tweezer (OET) forces. In other embodiments, optoelectrowetting (OEW) forces are applied to one or more positions in the support structure 104 (and/or the cover 110) of the microfluidic device 100 (e.g., positions helping to define the flow path 106 and/or the sequestration pens 124, 126, 128, 130) via one or more electrodes (not shown) to manipulate, transport, separate and sort droplets located in the microfluidic circuit 120. For example, in some embodiments, OEW forces are applied to one or more positions in the support structure 104 (and/or the cover 110) in order to transfer a single droplet from the flow path 106 into a desired microfluidic sequestration pen. In some embodiments, OEW forces are used to prevent a droplet within one of the microfluidic sequestration pens 124, 126, 128, 130 from being displaced therefrom. Further, in some embodiments, OEW forces are used to selectively remove a previously collected droplet from one of the microfluidic sequestration pens 124, 126, 128, 130.

In some embodiments, DEP and/or OEW forces are combined with other forces, such as flow and/or gravitational force, so as to manipulate, transport, separate and sort micro-objects and/or droplets within the microfluidic circuit 120. For example, the chamber 102 can be tilted (e.g., by tilting device 190) to position the flow path 106 and micro-objects located therein above the microfluidic sequestration pens 124, 126, 128, 130, and the force of gravity can transport the micro-objects and/or droplets into the microfluidic sequestration pens 124, 126, 128, 130. In some embodiments, the DEP and/or OEW forces can be applied prior to the other forces. In other embodiments, the DEP and/or OEW forces can be applied after the other forces. In still other instances, the DEP and/or OEW forces can be applied at the same time as the other forces or in an alternating manner with the other forces.

Figure 18:
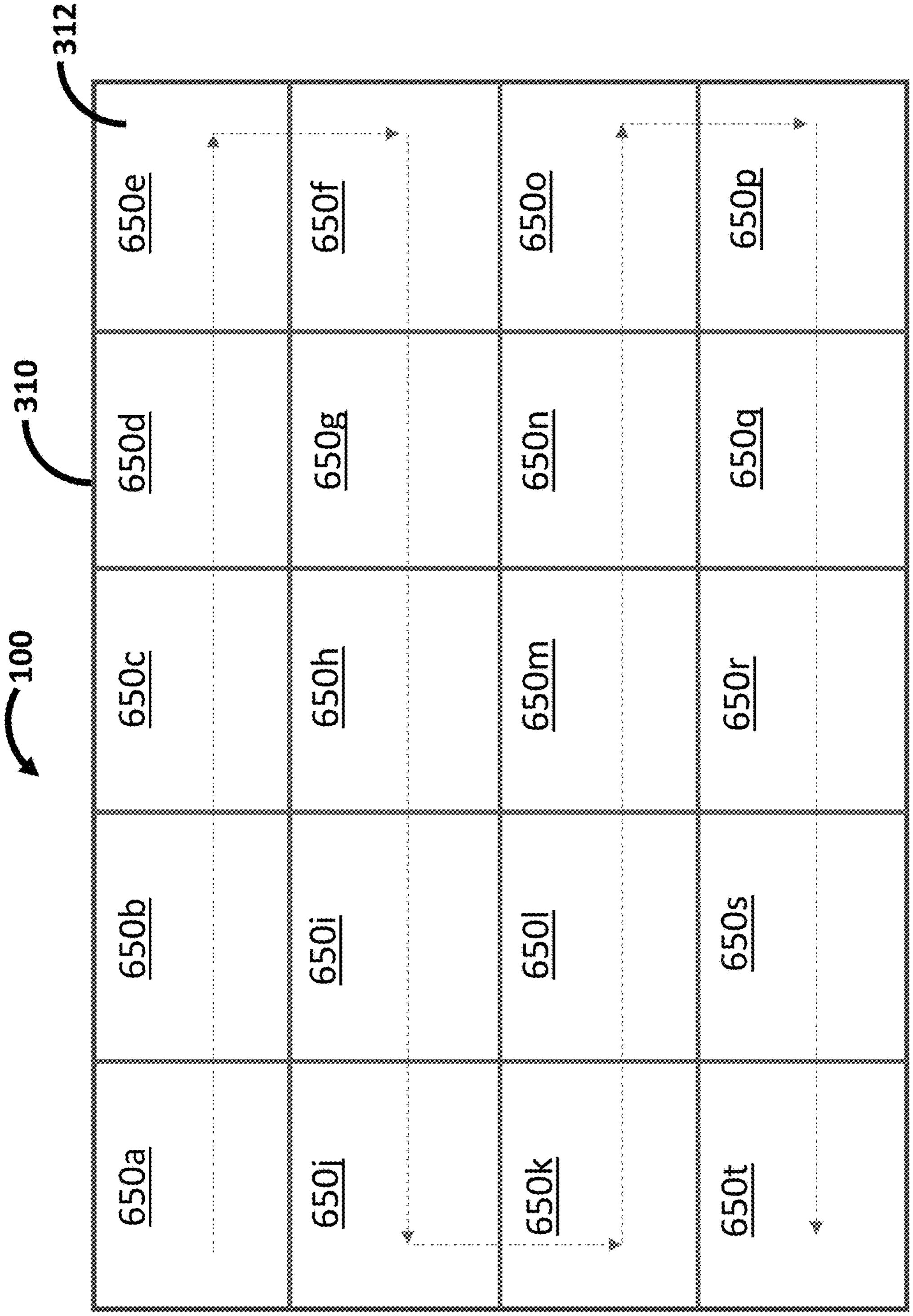
FIG. 18 is a plan view illustrating a plurality of different fields of view (FOVs) of a surface of a circuit substrate of the microfluidic system of FIG. 1.

The microfluidic control system 150, e.g., the motive module 162, is configured to move the nest 500, and thus, the microfluidic device 100 within the nest 500, relative to the light emitting and/or imaging device 148, such that the light emitting and/or imaging device 148 may be selectively positioned at each of a plurality of FOVs of the surface 312 of the circuit substrate 310. For example, as illustrated by the arrow in FIG. 18, the microfluidic control system 150 may sequentially move the nest 500 relative to the light emitting and/or imaging device 148, such that the light emitting and/or imaging device 148 is positioned at a first FOV 650*a* of the surface 312 of the circuit substrate 310; then positioned at a second FOV 650*b* of the surface 312 of the circuit substrate 310; then positioned at a third FOV 650*c* of the surface 312 of the circuit substrate 310, and so forth until the light emitting and/or imaging device 148 has been positioned at all FOVs 650*a*-650*t* of the surface 312 of the circuit substrate 310. It should be appreciated that the nest 500 may be moved relative to the light emitting and/or imaging device 148 in any pattern different from the pattern illustrated in FIG. 18, as long as the light emitting and/or imaging device 148 is positioned over all FOVs 650*a*-650*t* of the surface 312 of the circuit substrate 310.

Figure 19:
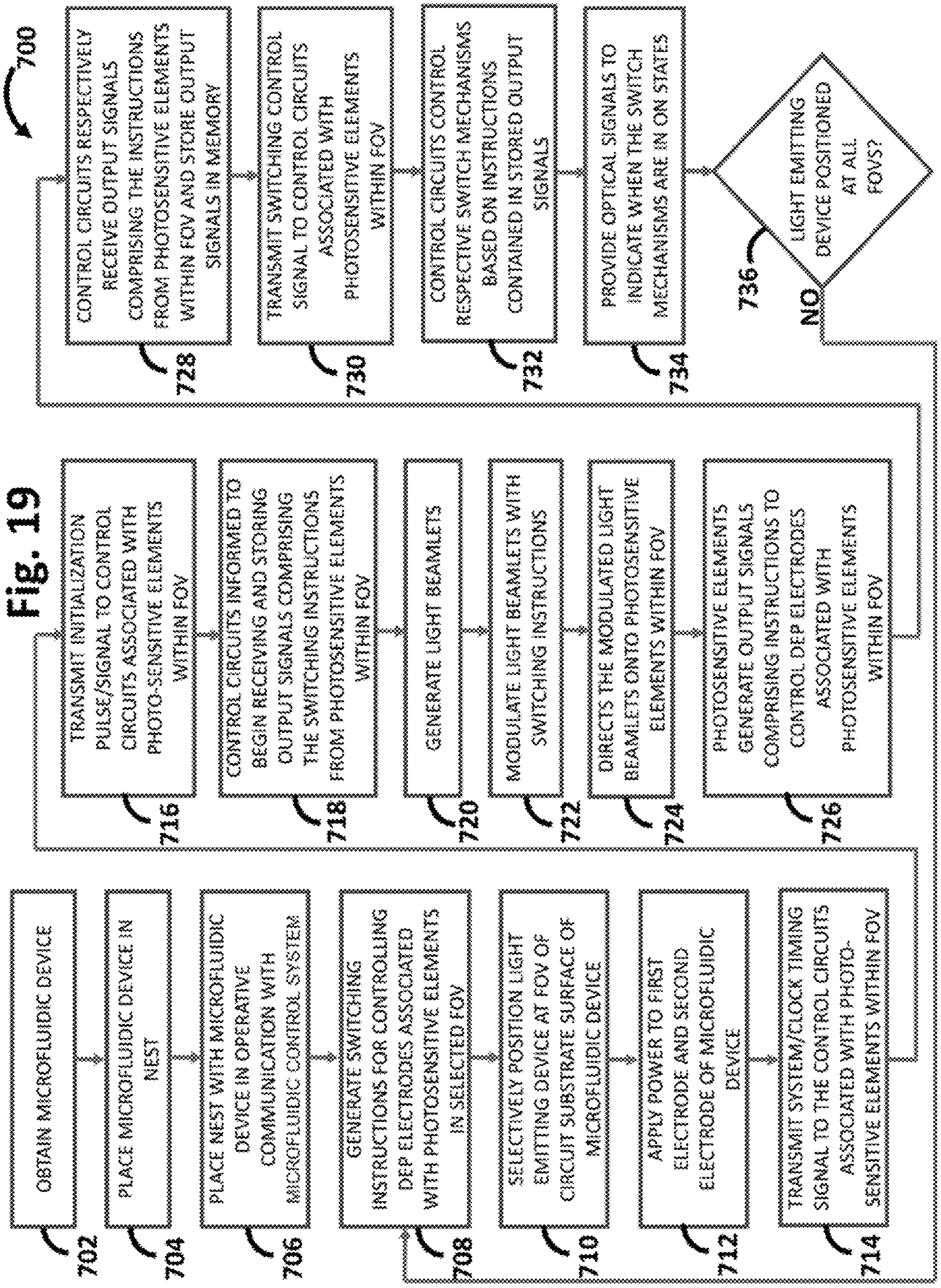
FIG. 19 is a flow diagram illustrating one method of operating the microfluidic system and microfluidic device of FIG. 1.

Having described the structure and arrangement of the microfluidic control system 150 and the microfluidic device 100, one method 700 of operating the microfluidic control system 150 to control the microfluidic device 100 to manipulate, transport, separate, and sort micro-objects and/or droplets within the microfluidic circuit 120 of the microfluidic device 100, will now be described with respect to FIG. 19. First, a microfluidic device 100 is obtained (step 702), although any other microfluidic device, such as the microfluidic devices 230, 250, 280, 290, 300, 400*a*, 400*b*, 400*c*, and 400*d*, can be obtained. Next, the microfluidic device 100 is placed within the nest 500 (shown in FIG. 16) (step 704), and the nest 500 with the microfluidic device 100 is placed in operative communication with the microfluidic control system 150, e.g., on the stage 608 of the microscope 606 (shown in FIG. 17) (step 706). Then, the microfluidic control system 150 (e.g., via the motive module 162) generates switching instructions for controlling the DEP electrodes 320 associated with the photosensitive elements 326 within a selected field of view (FOV) 650 (e.g., the FOV 650*a* in FIG. 18) of the circuit substrate 310 in a manner that manipulates, transports, separates, and sorts micro-objects and/or droplets within the microfluidic circuit 120 of the microfluidic device 100 (step 708). Next, the microfluidic control system 150 (e.g., via the motive module 162) selectively positions the light emitting and/or imaging device 148 at the selected FOV 650 of the surface 312 of the circuit substrate 310 (step 710). The microfluidic control system 150 (e.g., via the power source 192) applies power to the first electrode 314 that is in electrical contact with the fluidic medium 180 in the chamber 178, and the second electrode 316 of the microfluidic device 100 that is insulated from the fluidic medium 180 in the chamber 178 (step 712).

The microfluidic control system 150 (e.g., via the electrical generation subsystem 504 of the nest 500) electrically transmits a system clock/timing signal 404*a* to the control circuits 330 associated with the photosensitive elements 326 within FOV 650 of the surface 312 of the circuit substrate 310 (e.g., via the electrically conductive lead 402*a* (FIG. 12A, 13A, or 14A) (step 714). Alternatively, the microfluidic control system 150 (e.g., via the light source 604 and light modulation subsystem 602) optically transmits the system clock/timing signal 404*a* to the control circuits 330 (e.g., via the photosensitive elements 326' (FIG. 15A)). The microfluidic control system 150 (e.g., via the electrical generation subsystem 504 of the nest 500) electrically transmits an initialization pulse/signal 404*c* to the control circuits 330 (e.g., via the electrically conductive lead 402*c* (FIG. 12A)) (step 716). Alternatively, the microfluidic control system 150 (e.g., via the light source 604 and light modulation subsystem 602) optically transmits the initialization pulse/signal 404*c* to the control circuits 330 associated with the photosensitive elements 326 within FOV 650 of the surface 312 of the circuit substrate 310 (e.g., via the photosensitive elements 326 or 326' (FIG. 13A, 14A, or 15A). These control circuits 330 are then informed to begin receiving and storing switching instructions from the respective photosensitive elements 326 into the respective memory units 332 (step 718).

Then, the microfluidic control system 150 generates light beamlets 356 (e.g., via the light source 604) (step 720), and modulates (e.g., via the light modulating subsystem 602) the light beamlets 356 with the switching instructions (step 722). Then, the microfluidic control system 150 (e.g., via the light emitting and/or imaging device 148) directs the modulated light beamlets 356 onto the photosensitive elements 320 (e.g., the photodiode 362 of FIGS. 5, 6, and 7) within the FOV 650 of the surface 312 of the circuit substrate 310 (step 724). In response, the photosensitive elements 326 generate output signals 404*d* (synchronized to the system clock/timing signal) comprising the instructions for controlling the DEP electrodes 320 associated with the photosensitive elements 326 within the FOV 650 of the surface 312 of the circuit substrate 310 (step 726). Next, the control circuits 330 respectively receive the output signals 404*d* comprising the instructions from the photosensitive elements 326 and store the output signals comprising instructions, at least temporarily, in memory (in this case, the memory devices 332 associated with the photosensitive elements 326) located within the circuit substrate 310 (step 728).

The microfluidic control system 150 (e.g., via the electrical generation subsystem 504 of the nest 500) electrically transmits a switching control signal 404*b* to the control circuits 330 (e.g., via the electrically conductive lead 402*b* (FIG. 12A or 13A) associated with the photosensitive elements 326 within the FOV 650 of the surface 312 of the circuit substrate 310 (step 730). Alternatively, each control circuit 330 derives the switching control signal from the system clock/timing signal 404*a* (see FIG. 14B or 15B).

The control circuits 330 then control (synchronized to the switching control signal 404*b*), based on the instructions contained in the stored output signal, the respective switch mechanisms 324 (e.g., the transistor 366 of FIG. 5, the amplifier 368 of FIG. 6, and the switch 374 and amplifier 372 of FIG. 7) located within the circuit substrate 310, so that each of the switch mechanisms 324 is in one of an OFF state, in which the associated DEP electrode 320 is isolated from the second electrode 316, or an ON state, in which the associated DEP electrode 320 is electrically connected with the second electrode 316, for each time interval of a succession of time intervals defined by the switching control signal 404*b*, thereby manipulating, transporting, separating, and sorting the micro-objects and/or droplets within the microfluidic circuit 120 of the microfluidic device 100 (step 732). Thus, each of the DEP electrodes 320 is selectively activated and deactivated by switching the impedance state of the switching mechanism 324, as discussed above with respect to FIG. 4. That is, when each of the switch mechanisms 324 is in the ON state, an electrical impedance between the corresponding DEP electrode 320 and the second electrode 316 changes from a high impedance that is greater than an impedance of the fluidic medium 180 to a low impedance that is less than said impedance of the fluidic medium 180. Preferably, the succession of time intervals commences after the output signals are stored in the memory.

Optionally, the microfluidic device 100 (via the indicator elements 392) provides optical signals to indicate when the switch mechanisms 324 are in the ON states (step 734). In certain embodiments other information about the device may be conveyed to the microfluidic control system 150 via the indicator elements 392. If the light emitting and/or imaging device 148 has not been positioned at all FOVs 650 of the surface 312 of the circuit substrate 310 (step 736), the microfluidic control system 150 (e.g., via the motive module 162) positions the light emitting and/or imaging device 148 at the next field of view (FOV) 650 (e.g., the FOV 650*b* in FIG. 18) of the surface 312 of the circuit substrate 310 at step 708 and repeats steps 710-736 until the light emitting and/or imaging device 148 has been positioned at all FOVs 650 of the surface 312 of the circuit substrate 310. In various embodiments the steps described in FIG. 19 may be performed in the order shown or performed in any order (including steps happening concurrently) by which the microfluidic system operates to provide for handling, selection, trapping, and/or movement of micro-objects. For example, if the light emitting and/or imaging device 148 has not been positioned at all FOVs 650 of the surface 312 of the circuit substrate 310 (step 736), the microfluidic control system 150 may position the light emitting and/or imaging device 148 at the next field of view (FOV) 650 prior to transmitting the switching control signal 404*b* to control circuits 330 associated with the photosensitive elements 326 within an earlier field of view (650).

Various embodiments are described herein with reference to the figures. It should be noted that the figures are not drawn to scale and that elements of similar structures or functions are represented by like reference numerals throughout the figures. It should also be noted that the figures are only intended to facilitate the description of the embodiment and are not intended as an exhaustive description of the disclosure or as a limitation on the scope of the disclosed inventions, which is defined only by the appended claims and their equivalents. In addition, the respective illustrated embodiments need not each have all the aspects or advantages of features described herein. An aspect or an advantage described in conjunction with a particular embodiment of the disclosure is not necessarily limited to that embodiment and can be practiced in any other embodiments even if not so illustrated. The specification and drawings are, accordingly, to be regarded in an illustrative rather than restrictive sense.

Numbered Embodiments of the Invention

1. A microfluidic device, comprising a circuit substrate made of a semiconductor material in which circuit elements can be formed, the circuit substrate comprising a surface; a chamber defined in part by said circuit substrate surface, wherein said chamber is configured to contain a fluidic medium; a first electrode disposed to be in electrical contact with said fluidic medium; a second electrode disposed to be electrically insulated from said fluidic medium; dielectrophoresis (DEP) electrodes at different locations on or proximate to said circuit substrate surface, each disposed to be in electrical contact with said fluidic medium; switch mechanisms, each disposed between a different corresponding one of said DEP electrodes and said second electrode, wherein each said switch mechanism is switchable between an OFF state in which said corresponding DEP electrode is electrically isolated from said second electrode and an ON state in which said corresponding DEP electrode is electrically connected with said second electrode; photosensitive elements; and control circuits, each operatively connected with a corresponding one of said photosensitive elements and a corresponding one or more of said switch mechanisms, wherein each said corresponding photosensitive element is configured to generate an output signal comprising instructions for controlling said corresponding one or more said switch mechanisms in response to a modulated light beam directed onto said photosensitive element, and each said control circuit comprises or is associated with a memory configured to at least temporarily store said output signal from said corresponding one of said photosensitive elements, and wherein each said control circuit is configured to control whether each said one or more corresponding switch mechanisms is in said OFF state or said ON state for each time interval of a succession of time intervals based on said instructions in the stored output signal.

2. The microfluidic device of embodiment 1, wherein said switch mechanisms comprise CMOS transistors connecting said corresponding DEP electrodes to said second electrode.

3. The microfluidic device of embodiment 1 or 2, wherein said photosensitive elements comprise photodiodes.

4. The microfluidic device of any one of embodiments 1-3, further comprising indicator elements, each configured to indicate whether a corresponding one of said switch mechanisms is in said ON state or said OFF state.

5. The microfluidic device of any one of embodiments 1-4, further comprising one or more electrically conductive leads in the circuit substrate, wherein each control circuit is operatively coupled with at least one of the one or more electrically conductive leads.

6. The microfluidic device of any one of embodiments 1-5, wherein each said control circuit is configured to receive a system clock/timing signal.

7. The microfluidic device of embodiment 6, wherein the respective modulated light beams and output signals generated by said photosensitive elements are synchronized with the system clock/timing signal.

8. The microfluidic device of embodiment 6 or 7, wherein each said control circuit is configured to receive the system clock/timing signal on one of said one or more electrically conductive leads.

9. The microfluidic device of any one of embodiments 1-8, wherein each said control circuit is configured to receive an initialization pulse/signal in response to which said control circuit initiates storing in said memory the output signal generated by said corresponding one of said photosensitive elements.

10. The microfluidic device of embodiment 9, wherein each said control circuit is configured to receive the initialization pulse/signal on a same one of said one or more electrically conductive leads on which said control circuit receives the system clock/timing signal, and, optionally, wherein the initialization pulse/signal comprises or is incorporated into, the system clock/timing signal.

11. The microfluidic device of embodiment 8, wherein each said control circuit is configured to receive the system clock/timing signal on a first one of said one or more electrically conductive leads, and is configured to receive the initialization pulse/signal on a second one of said one or more electrically conductive leads.

12. The microfluidic device of embodiment 8, wherein each said control circuit is configured to receive the initialization pulse/signal from said corresponding one of said photosensitive elements.

13. The microfluidic device of any one of embodiments 5-12, wherein each said control circuit is configured to receive or otherwise generate a switching control signal having a switching control signal frequency that is lower than a frequency of the system clock/timing signal.

14. The microfluidic device of embodiment 13, wherein the switching control signal is derived from the system clock/timing signal.

15. The microfluidic device of embodiment 13, wherein the frequency of the system clock/timing signal is an integer multiple of the switching control signal frequency.

16. The microfluidic device of embodiment 7, wherein each said control circuit is configured to receive a switching control signal on one of said one or more electrically conductive leads, the switching control signal having a switching control signal frequency that is lower than a frequency of the system clock/timing signal.

17. The microfluidic device of embodiment 16, wherein each said control circuit is configured to receive the switching control signal on a same one of said one or more electrically conductive leads on which said control circuit receives the system clock/timing signal.

18. The microfluidic device of embodiment 16, wherein each said control circuit is configured to receive the system clock/timing signal on a first one of said one or more electrically conductive leads, and is configured to receive the switching control signal on a second one of said one or more electrically conductive leads.

19. The microfluidic device of any one of embodiments 13-18, wherein each said control circuit is configured to retrieve the respective stored instructions from the corresponding memory and to control whether each said one or more corresponding switch mechanisms is in said OFF state or said ON state for each time interval of the succession of time intervals, respectively, at the switching control signal frequency.

20. The microfluidic device of any one of embodiments 1-19, wherein at least one of said control circuits is configured to control two or more corresponding switch mechanisms.

21. The microfluidic device of embodiment 20, wherein the output signal generated by said one of said photosensitive elements corresponding to said at least one control circuit comprises instructions for controlling each of said two or more of said switching mechanisms.

22. The microfluidic device of any one of embodiments 1-21, wherein two or more of said control circuits share a memory.

23. The microfluidic device of any one of embodiments 1-22, wherein the memory is a shared memory configured to store the output signals generated by each of two or more of said photosensitive elements.

24. A system including a microfluidic device as recited in any one of embodiments 1-23, and further including a light emitting device, wherein one or both of the light emitting device and the microfluidic device are movable relative to the other one such that the light emitting device may be selectively positioned at each of a plurality of fields of view of the circuit substrate surface.

25. The system of embodiment 24, wherein the light emitting device comprises light emitting elements, each configured to direct a respective modulated light beam onto a corresponding one of said photosensitive elements located within a given field of view of the circuit substrate surface at which the light emitting device is positioned.

26. The system of embodiment 25, wherein the light emitting device is configured so that modulated light beams can be simultaneously transmitted by said light emitting elements and directed onto each of said corresponding ones of said photosensitive elements located within the given field of view.

27. The system of embodiment 25, wherein the system is configured to automatically (a) move one or both of the microfluidic device and the light emitting device relative to the other one so as to position the light emitting device at a first field of view of the circuit substrate surface, (b) direct respective modulated light beams transmitted by said light emitting elements onto said corresponding ones of said photosensitive elements located within the first field of view, (c) deliver an initialization pulse/signal to control circuits corresponding to said photosensitive elements located within the first field of view to thereby synchronize said corresponding control circuits with respective output signals generated by said photosensitive elements, (d) move one or both of the microfluidic device and the light emitting device relative to the other one so as to position the light emitting device at a next field of view of the circuit substrate surface, (e) direct respective modulated light beams transmitted by said light emitting elements onto said corresponding ones of said photosensitive elements located within the next first field of view, (f) deliver an initialization pulse/signal to control circuits corresponding to said photosensitive elements located within the next field of view to thereby synchronize said corresponding control circuits with respective output signals generated by said photosensitive elements, and (g) repeat (d) to (f) until the respective modulated light beams have been directed onto said corresponding photosensitive elements located in all fields of view of the circuit substrate surface.

28. The system of embodiment 27, comprising a plurality of microfluidic devices as recited in any one of embodiments 1-23, wherein the system is configured to automatically perform (a) to (g) for each of the microfluidic devices using the same light emitting device.

29. The system of any one of embodiments 24-28, wherein the system comprises a nest configured to have the microfluidic device mounted thereon, the nest comprising one or more electrically conductive nest contacts that are configured to contact a corresponding one or more electrically conductive device contacts located on the microfluidic device when the microfluidic device is mounted on the nest, wherein the one or more electrically conductive device contacts on the microfluidic device are electrically connected with a corresponding one or more electrically conductive device leads located within the circuit substrate, and wherein the system is configured to transmit the system clock/timing signal via the one or more electrically conductive nest contacts to the one or more electrically conductive device leads, and each said control circuit is configured to receive the transmitted system clock/timing signal on one of said one or more electrically conductive leads.

30. The system of embodiment 29, wherein the system is configured to transmit an initialization pulse/signal via the one or more electrically conductive nest contacts to the one or more electrically conductive device leads, and wherein each said control circuit is configured to receive the transmitted initialization pulse/signal on one of said one or more electrically conductive device leads, in response to which said control circuit initiates storing in said memory the output signal generated by said corresponding one of said photosensitive elements.

31. The system of embodiment 30, wherein each said control circuit is configured to receive the initialization pulse/signal on a same one of said one or more electrically conductive device leads on which said control circuit receives the system clock/timing signal.

32. The system of embodiment 31, wherein the initialization pulse/signal comprises, is incorporated into, or is derived from, respectively, the system clock/timing signal.

33. The system of embodiment 30, wherein each said control circuit is configured to receive the system clock/timing signal on a first one of said one or more electrically conductive device leads, and is configured to receive the initialization pulse/signal on a second one of said one or more electrically conductive device leads.

34. The system of any one of embodiments 29-33, wherein the system is configured to transmit a switching control signal via the one or more electrically conductive nest contacts to the one or more electrically conductive device leads, and wherein each said control circuit is configured to receive the transmitted switching control signal on one of the one or more electrically conductive device leads, and wherein the succession of time intervals is defined by the switching control signal.

35. The system of embodiment 34, wherein said switching control signal has a switching control signal frequency that is lower than a frequency of the system clock/timing signal.

36. The system of embodiment 34 or 35, wherein each said control circuit is configured to receive the switching control signal on a same one of said one or more electrically conductive device leads on which said control circuit receives the system clock/timing signal.

37. The system of embodiment 34 or 35, wherein each said control circuit is configured to receive the system clock/timing signal on a first one of said one or more electrically conductive device leads, and is configured to receive the switching control signal on a second one of said one or more electrically conductive leads.

38. The system of any one of embodiments 34-37, wherein each said control circuit is configured to retrieve the respective stored instructions from the corresponding memory and to control whether each said one or more corresponding switch mechanisms is in said OFF state or said ON state for each time interval of the succession of time intervals, respectively, at the switching control signal frequency.

39. A method of controlling a microfluidic device, the microfluidic device comprising a semiconductor circuit substrate and a chamber containing a fluidic medium disposed on a surface of said circuit substrate, wherein a dielectrophoresis (DEP) electrode is disposed on or proximate to said circuit substrate surface in electrical contact with said fluidic medium, the method comprising: applying alternating current (AC) power to a first electrode and a second electrode of said microfluidic device, wherein said first electrode is in electrical contact with said fluidic medium and said second electrode is electrically insulated from said fluidic medium; directing a modulated light beam onto a photosensitive element in said circuit substrate, wherein said photosensitive element generates, in response to said light beam, an output signal comprising instructions for controlling said DEP; storing, at least temporarily, said output signal in a memory located within said circuit substrate, and controlling, based on said instructions contained in said stored output signal, a switch mechanism located within said circuit substrate so that said switch mechanism is in one of an OFF state, in which said DEP electrode is electrically isolated from said second electrode, or an ON state, in which said DEP electrode is electrically connected with said second electrode, for each time interval of a succession of time intervals.

40. The method of embodiment 39, wherein said succession of time intervals commence after said output signal is stored in said memory.

41. The method of embodiment 39 or 40, wherein said switch mechanism is a CMOS transistor formed in said semiconductor circuit substrate, and wherein said controlling said switch mechanism comprises switching said CMOS transistor between said OFF state and said ON state for each said time interval of the succession of time intervals in accordance with said instructions.

42. The method of any one of embodiments 39-41, wherein said photosensitive element is a photodiode formed in said semiconductor circuit substrate.

43. The method of any one of embodiments 39-42, further comprising providing an optical signal to indicate when said switch mechanisms in said ON state.

44. The method of any one of embodiments 39-43, wherein said memory is a part of or otherwise associated with a control circuit formed in said semiconductor circuit substrate, said control circuit configured to control said switching mechanism.

45. The method of embodiment 44, further comprising transmitting a system clock/timing signal to said control circuit.

46. The method of embodiment 45, wherein said system clock/timing signal is synchronized with said output signal generated by said photosensitive element.

47. The method of embodiment 46, further comprising transmitting an initialization pulse/signal to said control circuit, wherein, in response to receiving said initialization pulse/signal, said control circuit initiates storing the output signal in said memory.

48. The method of embodiment 47, wherein said initialization pulse/signal is generated by said photosensitive element in response to the modulated light beam.

49. The method of embodiment 47, wherein said initialization pulse/signal comprises or is incorporated into said system clock/timing signal.

50. The method of any of embodiments 45-49, wherein said control circuit is configured to generate a switching control signal, and wherein the succession of time intervals is defined by the switching control signal.

51. The method of embodiment 50, wherein said switching control signal has a switching control signal frequency that is lower than a frequency of the system clock/timing signal.

52. The method of embodiment 51, wherein the system clock/timing signal frequency is an integer multiple of the switching control signal frequency.

53. The method of any of embodiments 50-52, wherein said switching control signal is derived from the system clock/timing signal.

54. A method of controlling a microfluidic device, the microfluidic device comprising a circuit substrate and a chamber containing a fluidic medium disposed on a surface of said circuit substrate, wherein dielectrophoresis (DEP) electrodes are disposed on or proximate to said circuit substrate surface in electrical contact with said fluidic medium, the method comprising: (a) positioning a light emitting device at a first field of view of the circuit substrate surface, the light emitting device comprising light emitting elements; (b) directing respective modulated light beams from said light emitting elements onto corresponding photosensitive elements located on or proximate to the circuit substrate surface within the first field of view, wherein each said photosensitive element generates an output signal comprising instructions for controlling a corresponding DEP electrode in response to the respective modulated light beam; (c) delivering an initialization pulse/signal to respective control circuits corresponding to said photosensitive elements located in said first field of view to thereby synchronize said control circuits with the output signals generated by said photosensitive elements; and (d) storing, at least temporarily, said output signals in respective memories of or associated with said control circuits.

55. The method of embodiment 54, further comprising transmitting a system clock signal to said control circuits, wherein said system clock signal is synchronized with said output signals generated by said photosensitive elements.

56. The method of embodiment 55, wherein the initialization pulse/signal is generated by said photosensitive elements in response to the modulated light beams.

57. The method of embodiment 55, wherein said initialization pulse/signal is transmitted on a same conductor as, or incorporated into, said input clock signal.

58. The method of embodiment 54, further comprising (e) applying alternating current (AC) power to a first electrode and a second electrode of said microfluidic device, wherein said first electrode is in electrical contact with said fluidic medium and said second electrode is electrically insulated from said fluidic medium; and (f) controlling, based on said instructions contained in said respective stored output signals, switch mechanisms located within said circuit substrate so that each said switch mechanism is in one of an OFF state, in which a DEP electrode corresponding to said switch mechanism is isolated from said second electrode, or an ON state, in which said corresponding DEP electrode is electrically connected with said second electrode, for each time interval of a succession of time intervals.

59. The method of embodiment 58, further comprising: (g) positioning the light emitting device at a next field of view of the circuit substrate surface; (h) directing respective modulated light beams from said light emitting elements onto corresponding photosensitive elements located on or proximate to the circuit substrate surface within the next field of view, wherein each said photosensitive element generates an output signal comprising instructions for controlling a corresponding DEP electrode in response to the respective modulated light beam; (i) delivering an initialization pulse/signal to respective control circuits corresponding to said photosensitive elements located in said next field of view to thereby synchronize said control circuits with the output signals generated by said photosensitive elements; (j) storing, at least temporarily, said output signals in respective memories of or associated with said control circuits; and (k) repeating steps (g)-(j) until respective modulated light beams have been directed onto said corresponding photosensitive elements located in all fields of view of the circuit substrate surface.

60. A method of controlling a microfluidic device, the microfluidic device comprising a circuit substrate and a chamber containing a fluidic medium and micro-objects disposed on a surface of said circuit substrate, wherein dielectrophoresis (DEP) electrodes are disposed on or proximate to said circuit substrate surface in electrical contact with said fluidic medium, the method comprising: (a) positioning an image acquisition device at a first field of view (FOV) of the circuit substrate surface; (b) acquiring image data of the first FOV of the substrate including micro-objects disposed thereon using the image acquisition device; (c) processing the image data to generate a plan for selectively activating the DEP electrodes in order to move the micro-objects imaged in the first FOV; (d) positioning a light emitting device at the first FOV, the light emitting device comprising light emitting elements; (e) directing respective modulated light beams from said light emitting elements onto corresponding photosensitive elements located on or proximate to the circuit substrate surface within the first FOV, wherein each said photosensitive element generates an output signal in response to the respective modulated light beam, said output signal comprising instructions for controlling selective activation of a corresponding DEP electrode located within the first FOV in accordance with the determined plan; (f) delivering an initialization pulse/signal to respective control circuits corresponding to said photosensitive elements located in said first FOV to thereby synchronize said control circuits with the output signals generated by said photosensitive elements; and (g) in response to said initialization pulse/signal, storing, at least temporarily, said output signals in respective memories of or associated with said control circuits corresponding to said photosensitive elements located in said first FOV.

61. The method of embodiment 60, wherein (a) and (d) are performed simultaneously.

62. The method of embodiment 60 or 61, further comprising transmitting a input clock signal to said control circuits, wherein said system clock signal is synchronized with said output signals generated by said photosensitive elements.

63. The method of embodiment 62, wherein the initialization pulse/signal is generated by said photosensitive elements in response to the modulated light beams.

64. The method of embodiment 62, wherein said initialization pulse/signal is transmitted on a same conductor as, or incorporated into, said input clock signal.

65. The method of any of embodiments 60-64, further comprising (h) controlling, based on said instructions contained in said respective stored output signals, switch mechanisms located within said circuit substrate that activate said DEP electrodes located within said first FOV so that each said switch mechanism is in one of an ON state, in which a DEP electrode corresponding to said switch mechanism is activated, or an OFF state, in which said corresponding DEP electrode is not activated, for each time interval of a succession of time intervals.

66. The method of embodiment 65, further comprising: (i) positioning the image acquisition device at a second FOV of the circuit substrate surface; (j) acquiring image data of the second FOV of the substrate including micro-objects disposed thereon using the image acquisition device; (k) processing the image data to generate a plan for selectively activating the DEP electrodes in order to move the micro-objects imaged in the second FOV; (l) positioning the light emitting device at the second FOV; (m) directing respective modulated light beams from said light emitting elements onto corresponding photosensitive elements located on or proximate to the circuit substrate surface within the second FOV, wherein each said photosensitive element generates an output signal in response to the respective modulated light beam, said output signal comprising instructions for controlling selective activation of a corresponding DEP electrode located within the second FOV in accordance with the determined plan; (n) delivering an initialization pulse/signal to respective control circuits corresponding to said photosensitive elements located in said second FOV to thereby synchronize said control circuits with the output signals generated by said photosensitive elements; and (o) in response to said initialization pulse/signal, storing, at least temporarily, said output signals in respective memories of or associated with said control circuits corresponding to said photosensitive elements located in said second FOV.

67. The method of embodiment 66, wherein (i) to (o) are performed prior to completion of (h).

68. A microfluidic device, comprising:

a circuit substrate comprising a surface;

a chamber defined in part by said circuit substrate surface and configured to contain a fluidic medium;

means for selectively activating respective dielectrophoresis (DEP) electrodes disposed on or proximate to said circuit substrate surface in response to instructions transmitted in respective modulated beams of light directed onto photosensitive elements, each photosensitive element corresponding to a respective one or more of said DEP electrodes, said means configured such that activation of said DEP electrodes is initiated after transmission of the modulated light beams is completed.

What is claimed:

1. A microfluidic device, comprising:

a circuit substrate made of a semiconductor material in which circuit elements can be formed, said circuit substrate comprising a surface;

a chamber defined in part by said circuit substrate surface, wherein said chamber is configured to contain a fluidic medium;

a first electrode disposed to be in electrical contact with said fluidic medium;

a second electrode disposed to be electrically insulated from said fluidic medium;

a plurality of dielectrophoresis (DEP) electrodes at different locations on or proximate to said circuit substrate surface, each disposed to be in electrical contact with said fluidic medium;

a plurality of switch mechanisms, each switch mechanism of said plurality of switch mechanisms disposed between a corresponding one of said DEP electrodes and said second electrode, wherein said each switch mechanism is switchable between an OFF state in which said corresponding DEP electrode is electrically isolated from said second electrode and an ON state in which said corresponding DEP electrode is electrically connected with said second electrode;

a plurality of photosensitive elements; and a plurality of control circuits, each control circuit of said plurality of control circuits operatively connected with a corresponding one photosensitive element of said photosensitive elements and a corresponding one or more switch mechanisms of said switch mechanisms, wherein each said corresponding one photosensitive element is configured to generate an output signal comprising instructions for controlling said corresponding one or more switch mechanisms in response to a modulated light beam directed onto said corresponding one photosensitive element, and said each control circuit comprises or is associated with a memory, said each control circuit configured to receive said output signal from said corresponding one photosensitive element and at least temporarily store said output signal in said memory, and wherein said each control circuit is configured to control whether said corresponding one or more switch mechanisms is in said OFF state or said ON state for each time interval of a succession of time intervals based on said instructions in said stored output signal.

2. The microfluidic device of claim 1, wherein said plurality of switch mechanisms respectively comprise a plurality of complementary metal-oxide semiconductor (CMOS) transistors and/or said plurality of photosensitive elements comprise a plurality of photodiodes, wherein each said switch mechanism connects said corresponding one or more DEP electrodes to said second electrode.

3. The microfluidic device of claim 1, wherein said each control circuit is configured to receive a system clock/timing signal.

4. The microfluidic device of claim 3, wherein said modulated light beam and said output signal generated by said corresponding one photosensitive element are synchronized with said system clock/timing signal.

5. The microfluidic device of claim 1, wherein said each control circuit is configured to receive an initialization pulse/signal in response to which said each control circuit initiates storing in said memory said output signal generated by said corresponding one photosensitive element.

6. The microfluidic device of claim 5, wherein said each control circuit is configured to receive said initialization pulse/signal from said corresponding one photosensitive element.

7. The microfluidic device of claim 1, wherein said each control circuit is configured to receive or otherwise generate a switching control signal having a switching control signal frequency, and wherein said each control circuit is configured to retrieve said instructions in said stored output signal from said memory and to control whether said corresponding one or more switch mechanisms is in said OFF state or said ON state for each time interval of said succession of time intervals, respectively, at said switching control signal frequency based on said retrieved instructions.

8. The microfluidic device of claim 7, wherein said each control circuit is configured to receive a system clock/timing signal.

9. The microfluidic device of claim 1, wherein a control circuit of said plurality of control circuits is configured to control a corresponding two or more switch mechanisms of said plurality of switch mechanisms.

10. The microfluidic device of claim 9, wherein said output signal generated by said corresponding one photosensitive element comprises instructions for controlling each switching mechanism of said corresponding two or more switching mechanisms.

11. The microfluidic device of claim 1, wherein two or more control circuits of said plurality of control circuits share said memory.

12. The microfluidic device of claim 1, wherein said memory is a shared memory configured to store said output signals generated by each photosensitive element of two or more photosensitive elements of said plurality of photosensitive elements.

13. A system including a microfluidic device as recited in claim 3, and further including a light emitting device, wherein one or both of said light emitting device and said microfluidic device are movable relative to the other one such that said light emitting device may be selectively positioned at each of a plurality of fields of view of said circuit substrate surface.

14. The system of claim 13, wherein said light emitting device comprises a plurality of light emitting elements configured to direct a plurality of light beamlets of said modulated light beam onto corresponding photosensitive elements of said plurality of photosensitive elements located within a given field of view of said circuit substrate surface at which said light emitting device is positioned, and wherein said light emitting device is configured so that said plurality of light beamlets of said modulated light beam can be simultaneously transmitted by said plurality of light emitting elements and directed onto said corresponding photosensitive elements located within said given field of view.

15. The system of claim 14, wherein said system is configured to automatically (a) move said microfluidic device and said light emitting device relative to each other so as to position said light emitting device at a first field of view of said circuit substrate surface, (b) direct said light beamlets of said modulated light beam transmitted by said plurality of light emitting elements onto a first set of photosensitive elements of said plurality of photosensitive elements located within said first field of view, (c) deliver an initialization pulse/signal to a first set of control circuits of said plurality of control circuits corresponding to said first set of photosensitive elements located within said first field of view to thereby synchronize said first set of control circuits with respective output signals generated by said first set of photosensitive elements, (d) move said microfluidic device and said light emitting device relative to each other so as to position said light emitting device at a next field of view of said circuit substrate surface, (e) direct said light beamlets of said modulated light beam transmitted by said plurality of light emitting elements onto a second set of photosensitive elements of said plurality of photosensitive elements located within said next field of view, and (f) deliver an initialization pulse/signal to a second set of control circuits of said plurality of control circuits corresponding to said second set of photosensitive elements located within said next field of view to thereby synchronize said second set of control circuits with respective output signals generated by said second set of photosensitive elements.

16. The microfluidic device of claim 8, wherein said switching control signal has a switching control signal frequency that is lower than a frequency of said system clock/timing signal.

17. The microfluidic device of claim 16, wherein said system clock/timing signal frequency is an integer multiple of said switching control signal frequency.

18. The microfluidic device of claim 17, wherein said each control circuit is configured to derive said switching control signal from said system clock/timing signal.

19. The microfluidic device of claim 7, further comprising a plurality of external electrical terminals, wherein said each control circuit is configured to receive one or both of said system clock/timing signal and said switching control signal from a corresponding one or more external electrical terminals of said plurality of external electrical terminals.

20. The microfluidic device of claim 19, wherein said each control circuit is configured to receive both of said system clock/timing signal and said switching control signal from said corresponding one or more external electrical terminals.

21. The microfluidic device of claim 20, further comprising a plurality of electrical leads located in said circuit substrate, wherein a corresponding one or more electrical leads of said plurality of electrical leads are connected between said each control circuit and said corresponding one or more external electrical terminals, wherein said each control circuit is configured to receive both of said system clock/timing signal and said switching control signal on said corresponding one or more electrical leads.

22. The microfluidic device of claim 21, wherein said corresponding one or more electrical leads comprises corresponding two electrical leads, and wherein said each control circuit is configured to receive both of said system clock/timing signal and said switching control signal on different ones of said corresponding two electrical leads.

23. The microfluidic device of claim 21, wherein said each control circuit is configured to receive both of said system clock/timing signal and said switching control signal on a same one electrical lead of said corresponding one or more electrical leads.

24. The microfluidic device of claim 8, further comprising an additional plurality of photosensitive elements, wherein said each control circuit is configured to receive one or both of said system clock/timing signal and said switching control signal from a corresponding one photosensitive element of said additional plurality of photosensitive elements.

25. The microfluidic device of claim 24, wherein said each control circuit is configured to receive both of said system clock/timing signal and said switching control signal from said corresponding one additional photosensitive element.

26. The microfluidic device of claim 24, wherein said each control circuit is configured to receive said switching control signal from said corresponding one additional photosensitive element.

27. The microfluidic device of claim 24, wherein said plurality of photosensitive elements and said additional plurality of photosensitive elements are responsive to different frequencies, such that said each control circuit is configured for concurrently receiving said instructions from said corresponding one photosensitive element and said one or both of said clock/timing signal and said switching control signal from said corresponding one additional photosensitive element in response to a single beamlet of said modulated light beam directed onto said corresponding one photosensitive element and said corresponding one additional photosensitive element.

28. The microfluidic device of claim 24, wherein said plurality of photosensitive elements and said plurality of additional photosensitive elements are spatially separated, such that said each control circuit is configured for concurrently receiving said instructions from said corresponding one photosensitive element and said one or both of said clock/timing signal and said switching control signal from said corresponding one additional photosensitive element in response to different beamlets of said modulated light respectively directed onto said corresponding one photosensitive element and said corresponding one additional photosensitive element.

29. The system of claim 13, further comprising a nest configured to have said microfluidic device mounted thereon, said nest comprising one or more electrically conductive nest contacts that are configured to contact a corresponding one or more electrically conductive device contacts located on said microfluidic device when said microfluidic device is mounted on said nest, wherein said corresponding one or more electrically conductive device contacts are electrically connected with a corresponding one or more electrically conductive device leads located within said circuit substrate, and wherein the system is configured to transmit said system clock/timing signal via said corresponding one or more electrically conductive nest contacts to said corresponding one or more electrically conductive device leads, and said each control circuit is configured to receive said transmitted system clock/timing signal on one electrically conductive lead of said corresponding one or more electrically conductive leads.

* * * * *